United States Patent [19]
Chen et al.

[11] Patent Number: 5,761,478
[45] Date of Patent: Jun. 2, 1998

[54] PROGRAMMABLE MEMORY INTERFACE FOR EFFICIENT TRANSFER OF DIFFERENT SIZE DATA

[75] Inventors: Chein C. Chen, Sugar Land; John C. Cooper; David E. Francis, both of Houston; Joseph A. Coomes, Missouri City; Jerald G. Leach, Houston, all of Tex.

[73] Assignee: Texas Instruments Incorporated, Dallas, Tex.

[21] Appl. No.: 653,220

[22] Filed: May 24, 1996

Related U.S. Application Data

[62] Division of Ser. No. 354,182, Dec. 12, 1994, abandoned.
[51] Int. Cl.$^6$ .................................................. G06F 12/02
[52] U.S. Cl. ............................ 395/497.03; 395/497.02
[58] Field of Search .................. 395/497.02, 497.03, 395/497.01, 497.04, 401, 412, 421.02, 421.09, 481

[56] References Cited

U.S. PATENT DOCUMENTS

| | | | |
|---|---|---|---|
| 4,888,687 | 12/1989 | Allison et al. | 395/405 |
| 5,404,445 | 4/1995 | Matsumoto | 395/162 |

*Primary Examiner*—Eddie P. Chan
*Assistant Examiner*—Kevin L. Ellis
*Attorney, Agent, or Firm*—J. Dennis Moore; James C. Kesterson; Richard L. Donaldson

[57] ABSTRACT

A memory interface unit for coupling a microprocessor to a memory external to the microprocessor, the memory being utilized for the storage of data therein and the retrieval of data therefrom, and the memory being provided in one or more memory banks, each of the banks being provided with a set of address lines and a byte enable line, data being transferring to and from each of the memory banks on a group of data lines, and the memory banks being provided in one or more banks whereby the group or groups of data lines, as the case may be, provide a memory data path having a physical transfer width for transfer of data to and from the memory, and the data being stored and retrieved over the memory data path in two or more data types, each type having a different size, the memory interface unit being provided with a set of address pins and a set of strobe pins, comprising. The unit includes a first element for providing an indication of a physical transfer width of a memory coupled to the memory interface unit. Also provided is a second element for providing an indication of a data type to be transferred to or from the memory. A third element, responsive to the first element and the second element, depending on the data type indication, provides to the address pins an address, shifted in position, with at least some of the address lines being for coupling to the address lines of the one or more banks of memory, as the case may be, and with one or more of the address pins being for activation of the byte enable line or lines, as the case may be, for data to be transferred, or, alternatively, providing to the address pins an address, unshifted in position, for coupling to the address lines of the one or more banks of memory, as the case may be, for addressing data to be transferred. Depending on the physical transfer width indication, the third element also causes one or more of the strobe pins to be used as additional address pins.

1 Claim, 52 Drawing Sheets

FIG. 1

| DATA TYPE SIZE | EXTERNAL MEMORY WIDTH | | |
|---|---|---|---|
| | 8 | 16 | 32 |
| 8 | ◆ BYTE CHAR | ◆ | ◆ |
| 16 | ✻ | ◆ SHORT FLOAT INT | ◆ |
| 32 | ✥ | ✻ | ◆ FLOAT LONG INT |

◆ SINGLE-CYCLE READ
✻ TWO-CYCLE READ
✥ FOUR-CYCLE READ

FIG. 2

| 31 16 | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|
| xx | PRGW STATUS | INT CONFIG | GIE | CC | CE | CF | xx | RM | OVM | LUF | LV | UF | N | Z | V | C |
| R | | R/W | R/W | R/W | R/W | R/W | | R/W | R/W | R/W | R/W | R/W | R/W | R/W | R/W | R/W |

FIG. 3

| ADDRESS | REGISTER |
|---|---|
| 808060h | IOSTRB CONTROL |
| 808061h | RESERVED |
| 808062h | RESERVED |
| 808063h | RESERVED |
| 808064h | STRB0 CONTROL |
| 808065h | RESERVED |
| 808066h | RESERVED |
| 808067h | RESERVED |
| 808068h | STRB1 CONTROL |
| 808069h | RESERVED |
| ... | ... |
| 80806Fh | RESERVED |

| 31 23 | 22 | 21 | 20 | 19 18 | 17 16 |
|---|---|---|---|---|---|
| RESERVED | STRB SWITCH | STRB CONFIG | SIGN EXT/ ZERO FILL | PHYSICAL MEMORY WIDTH | DATA TYPE SIZE |
| | R/W | R/W | R/W | R/W | R/W |

| 15 13 | 12 8 | 7 5 | 4 3 | 2 | 1 | 0 |
|---|---|---|---|---|---|---|
| RESERVED | BNKCMP | WTCNT | SWW | HIZ | NOHOLD | HOLDST |
| | R/W | R/W | R/W | R/W | R/W | R |

| 31 21 | 20 | 19 18 | 17 16 | 15 13 | 12 8 | 7 5 | 4 3 | 2 0 |
|---|---|---|---|---|---|---|---|---|
| RESERVED | SIGN EXT/ ZERO FILL | PHYSICAL MEMORY WIDTH | DATA TYPE SIZE | RESERVED | BNKCMP | WTCNT | SWW | RESERVED |
| | R/W | R/W | R/W | | R/W | R/W | R/W | |

| 31 8 | 7 5 | 4 3 | 2 0 |
|---|---|---|---|
| RESERVED | WTCNT | SWW | RESERVED |
| | R/W | R/W | |

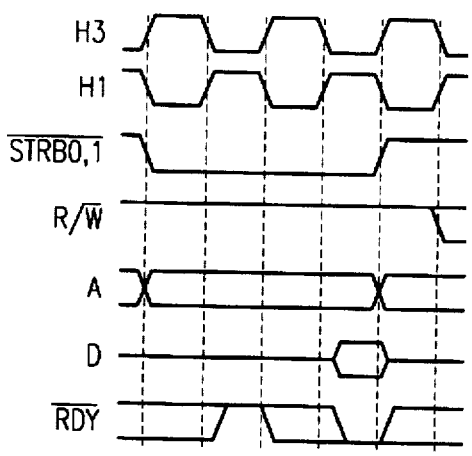
FIG. 22  EXTRA CYCLE
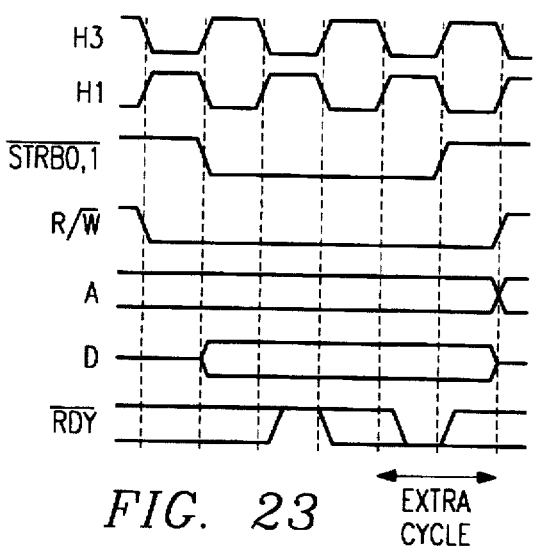
FIG. 23  EXTRA CYCLE
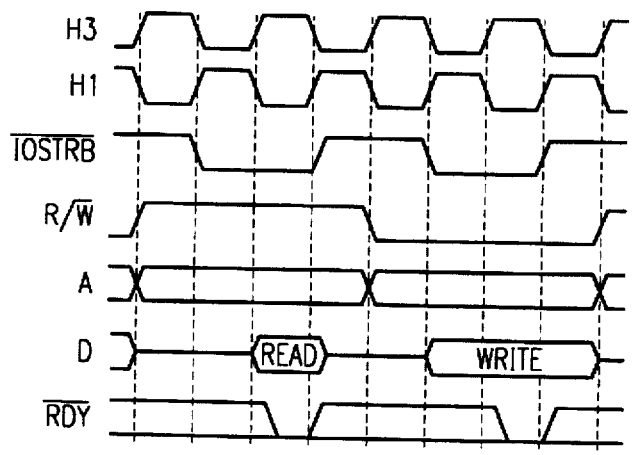
FIG. 24
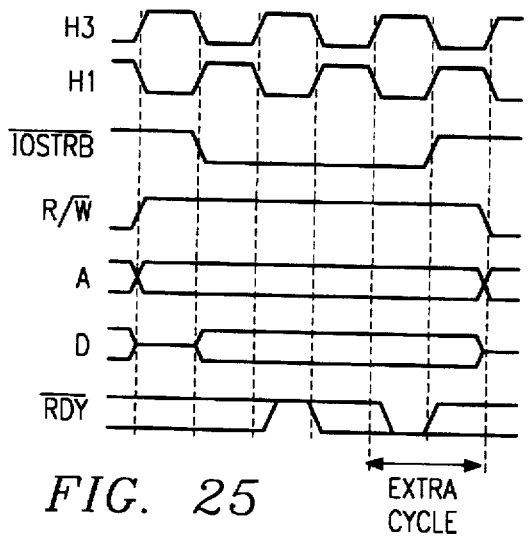
FIG. 25  EXTRA CYCLE
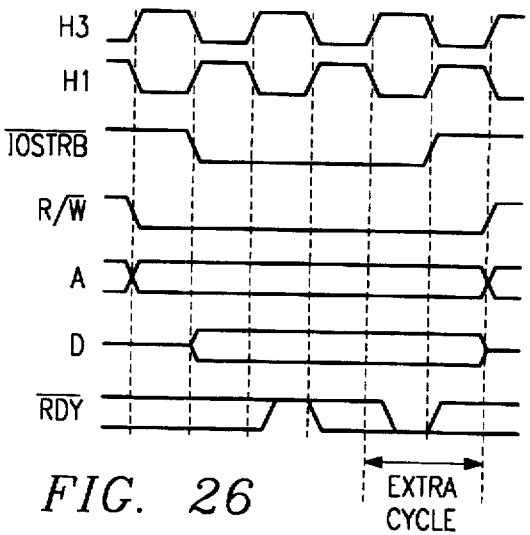
FIG. 26  EXTRA CYCLE

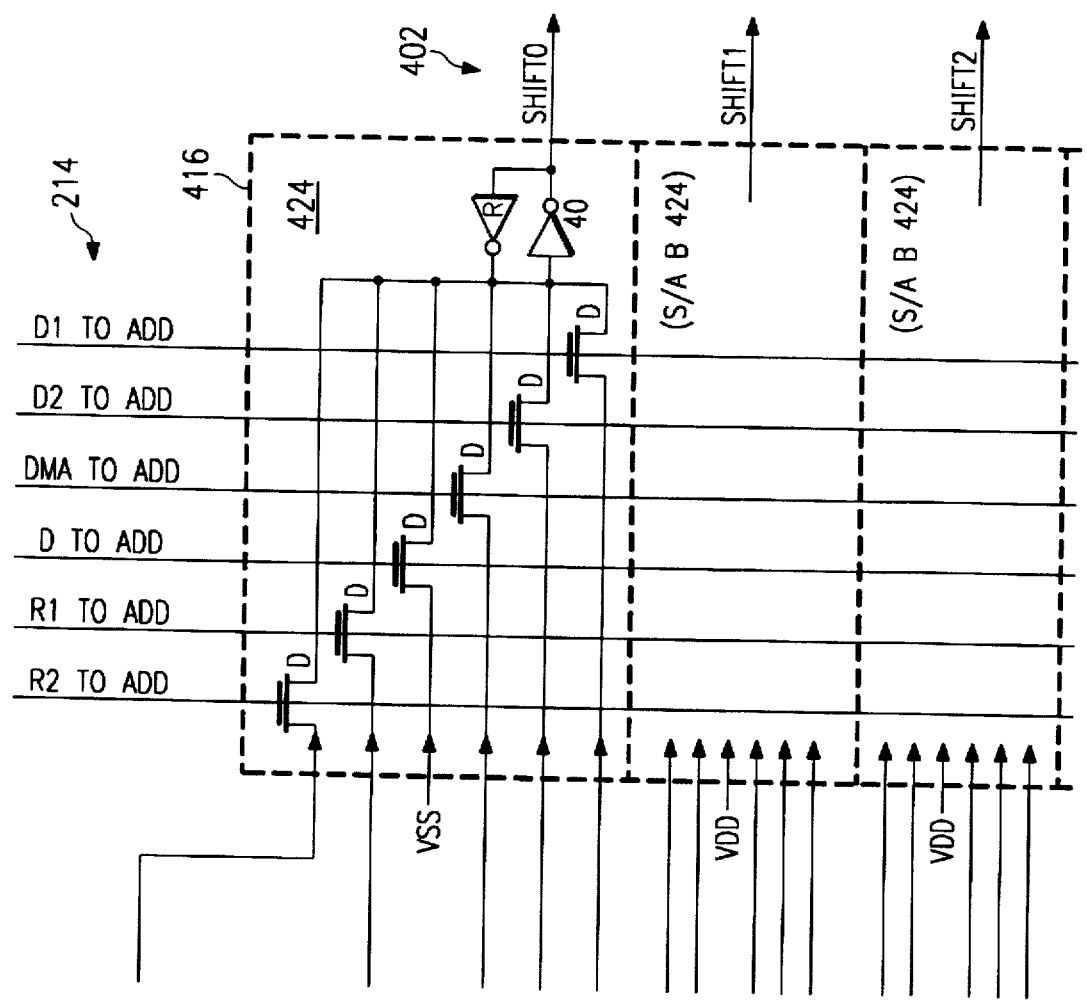

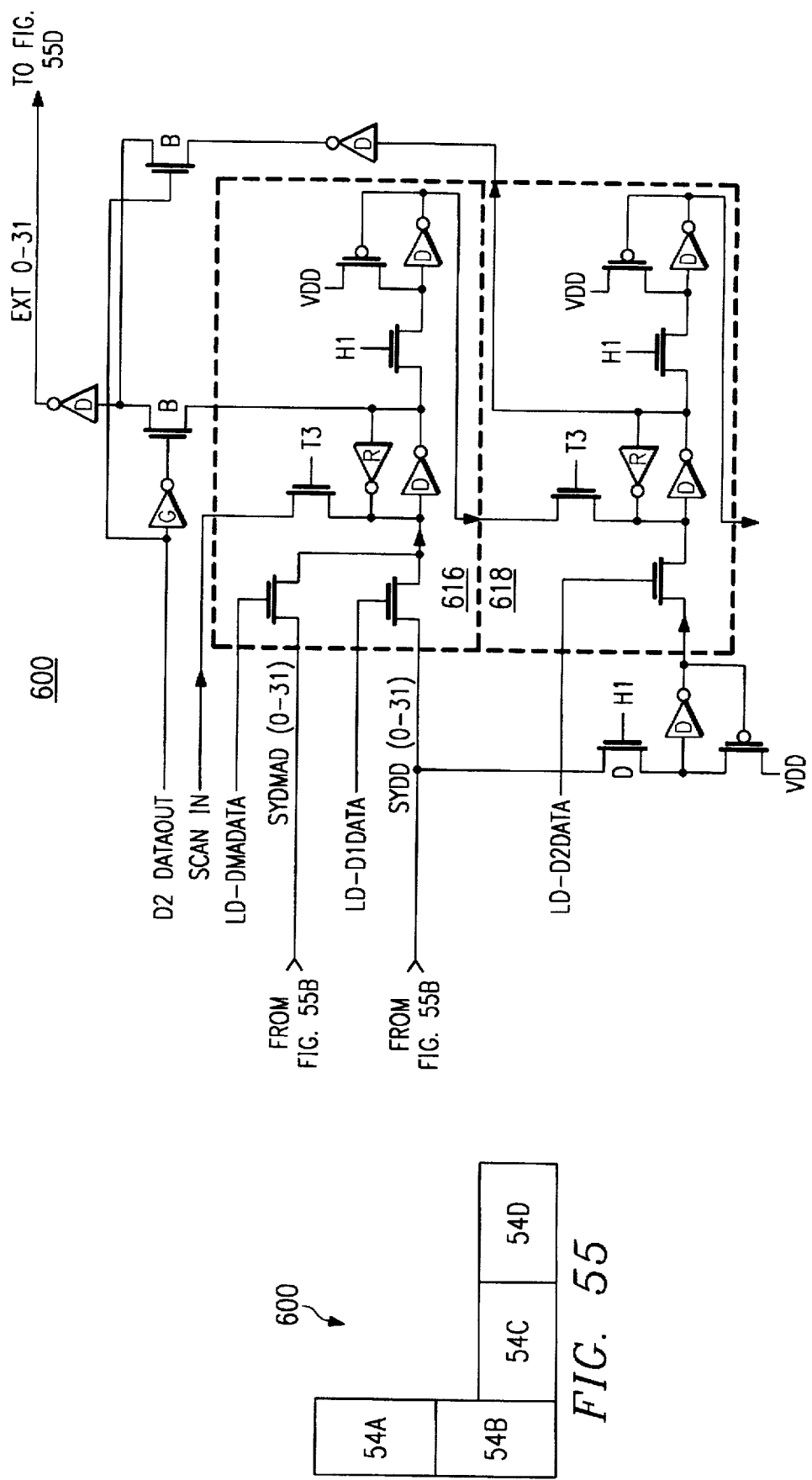

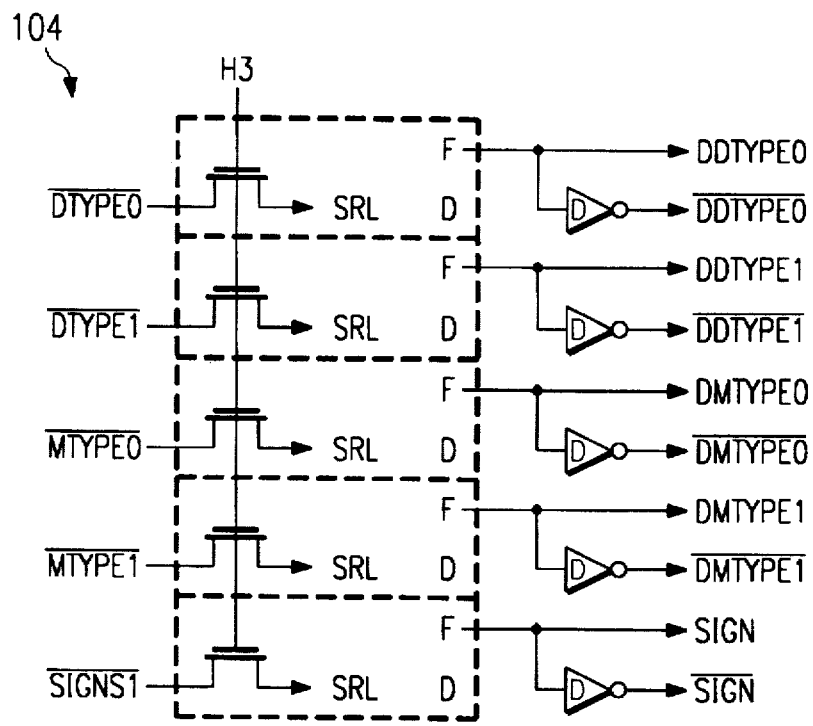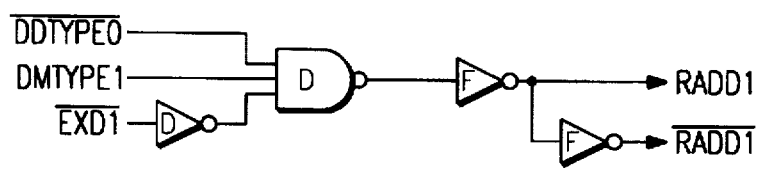
*FIG. 59*

PROGRAMMABLE MEMORY INTERFACE FOR EFFICIENT TRANSFER OF DIFFERENT SIZE DATA

This is a division of application Ser. No. 08/354,182, filed Dec. 12, 1994 now abandoned.

TECHNICAL FIELD OF THE INVENTION

This invention relates to arrangements for interfacing a microprocessor with memory external thereto, and more particularly relates to such arrangements wherein the data size and the width of the interface both may vary.

BACKGROUND OF THE INVENTION

Microprocessors, including general purpose microprocessors as well as special purpose processors such as digital signal processors, process data by executing instructions. Both instructions and data are stored in memory external to the microprocessor, and the microprocessor fetches the instructions and data as it operates, in the sequence mandated by a group of such instructions, which can include data, called a program.

Microprocessors are constructed with a specific internal bus width that determines the size of data and instruction units with which the processor deals in its operations. The microprocessor can have a different size internal data bus and internal instruction bus, although they are usually the same size. For example, the Texas Instruments TMS320C30 digital signal processor was designed with 32 bit instruction and 32 bit data operations.

Memory is typically provided in the form of a packaged integrated circuit device containing a random access memory ("RAM") array having a particular total capacity, which is the number of individual memory cells addressable in the array. Such devices come in sizes of, for example, 1 megabits, 4 megabits, 16 megabits, etc. The data are organized in such devices in groups of bits. Common sizes of such groupings are eight bits (byte), sixteen bits (half-word) and thirty-two bits (word). In addition, independent of grouping size, the data are addressable via address busses of differing size. Common sizes of such busses are also eight bits, sixteen bits and thirty-two bits.

A microprocessor with 32 bit instruction and data operations has many advantages, including a high degree of parallelism and provisions for a good C compiler. However, such microprocessors can require a 32 bit wide external memory even when the data may only require 8 or 16 bit data memory. In addition, more memory chips may be required to be utilized if the designer is limited to only those memory chips having 32 bit wide physical addressability, than if the designer is permitted to use memory chips having 16, or even 8 bit wide physical addressability.

It is desirable, therefore, to have a microprocessor memory interface controller with flexibility to allow a microprocessor having full-width internal instruction and data operations to interface with data memory and physical addressability having a range of widths.

SUMMARY OF THE INVENTION

According to the present invention, a memory interface unit is provided, for coupling a microprocessor to a memory external to the microprocessor, the memory being utilized for the storage of data therein and the retrieval of data therefrom, and the memory being provided in one or more memory banks, each of the banks being provided with a set of address lines and a byte enable line, data being transferring to and from each of the memory banks on a group of data lines, and the memory banks being provided in one or more banks whereby the group or groups of data lines, as the case may be, provide a memory data path having a physical transfer width for transfer of data to and from the memory, and the data being stored and retrieved over the memory data path in two or more data types, each type having a different size, the memory interface unit being provided with a set of address pins and a set of strobe pins, comprising. The unit includes a first element for providing an indication of a physical transfer width of a memory coupled to the memory interface unit. Also provided is a second element for providing an indication of a data type to be transferred to or from the memory. A third element, responsive to the first element and the second element, depending on the data type indication, provides to the address pins an address, shifted in position, with at least some of the address lines being for coupling to the address lines of the one or more banks of memory, as the case may be, and with one or more of the address pins being for activation of the byte enable line or lines, as the case may be, for data to be transferred, or, alternatively, providing to the address pins an address, unshifted in position, for coupling to the address lines of the one or more banks of memory, as the case may be, for addressing data to be transferred. Depending on the physical transfer width indication, the third element also causes one or more of the strobe pins to be used as additional address pins.

These and other features of the invention that will be apparent to those skilled in the art from the following detailed description of the invention, taken together with the accompanying drawings.

DESCRIPTION OF THE DRAWINGS

FIG. 1 is a chart showing the supported external memory widths and data types sizes for the preferred embodiment of the present invention.

FIG. 2 is a diagram depicting all of the bit fields of the CPU status register of the preferred embodiment.

FIG. 3 is a diagram depicting the external interface control memory map for the preferred embodiment.

FIG. 22 is a signal timing diagram in conjunction with a one wait-state read sequence for STRB0,1 active.

FIG. 23 is a signal timing diagram in conjunction with a one wait-state write sequence for STRB0,1 active.

FIG. 24 is a signal timing diagram in conjunction with a zero wait-state read and write sequence for IOSTRB active.

FIG. 25 is a signal timing diagram in conjunction with a one wait-state read sequence for IOSTRB active.

FIG. 26 is a signal timing diagram in conjunction with a one wait-state write sequence for IOSTRB active.

DETAILED DESCRIPTION OF THE INVENTION

Figures 4, 5, 6, 7:
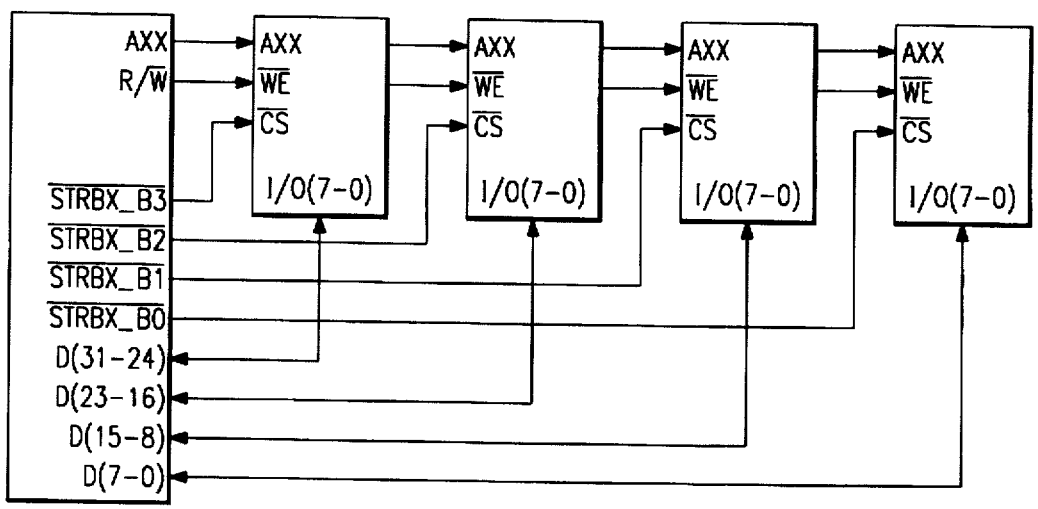
FIG. 4 is a diagram depicting the STRB0 control register.
FIG. 5 is a diagram depicting the STRB1 control register.
FIG. 6 is a diagram depicting the IOSTRB control register.
FIG. 7 is a block diagram depicting one configuration of the preferred embodiment connected to banks of an external memory.

The following detailed description of the preferred embodiment of the present invention is presented in four sections. Section 1 presents a general overview of the preferred embodiment, including general aspects of structure and operation, by way of introduction. Section 2 presents a more detailed discussion of the principles of operation. Section 3 describes principles of application useful in understanding in detail how to use the preferred embodiment. Finally, Section 4 describes the details of construction of the embodiment, i.e., the circuit is presented in detail.

1. General Overview

The preferred embodiment of the present invention is a memory interface arrangement adapted for use with a microprocessor having 32 bit instruction and 32 bit data operations, such as the Texas Instruments TMS320C30 mentioned above. It overcomes the limitations of the prior art by providing the flexibility to address 8, 16 or 32 bit data independently of the external memory width. In this way, the chip count and size of external memory is reduced, as compared with prior art arrangements. The number of external memory chips can be further reduced by the preferred embodiment's ability to allow code execution from 16 or 32 bit wide memories. The preferred embodiment's memory interface also reduces the total amount of RAM by allowing the physical data memory to be 8, 16 or 32 bits wide. It will be understood, however, that the preferred embodiment described herein could readily be enhanced to allow code execution from 8 bit wide memories or, indeed 64, 128 or other size memories, but that the widths so accommodated were selected in accordance with practical decisions based on current technologies, which decisions are well within the scope of those having ordinary skill in the art areas to which the invention pertains. Indeed such decisions were made with respect to data memory widths, as well, and those widths may similarly be adjusted, once the principles of the present invention set forth herein are understood.

Note that internally the preferred embodiment is designed for use with a 32 bit internal architecture microprocessor.

Therefore, the programmer can treat a microprocessor device including the preferred embodiment as a 32 bit device regardless of the physical external memory width. The external memory interface handles the conversion between external memory width and the microprocessor's internal 32 bit architecture.

A microprocessor using the preferred embodiment can execute code from either 16 or 32 bit wide memories. When connected to 32 bit memories, program execution is straightforward as described below. When connected to 16 bit zero wait state memory, the preferred embodiment takes two instruction cycles to fetch a single 32 bit instruction. During the first cycle, the preferred embodiment fetches the lower 16 bits. During the second cycle, it fetches the upper 16 bits and concatenates them with the previously fetched lower 16 bits. This process occurs entirely within the memory interface and is transparent to a user of the microprocessor. An external pin, PRGW, dictates the external program memory width.

The preferred embodiment can load and store 8, 16 and 32 bit data units into external memory and convert them into an internally equivalent 32 bit representation. The external memory interface accomplishes this added functionality without changing the microprocessor instruction set. FIG. 1 depicts the supported external memory widths and data types sizes.

To access 8/16/32 bit data units from 8/16/32 bit wide memory, the memory interface utilizes either of two strobes, STRB0 and STRB1, depending on the address location within the memory map. (Note that in this document when signals are italicized, as STRB0 is, for example, this means that the signal is the inverse of the non-italicized signal of the same designation, i.e., in this case, STRB0.) Each strobe consists of four pins for byte enables and/or additional address. For 32 bit memory interface, all four pins are used as strobe-byte enable pins. These strobe-byte enable pins select one or more bytes of the external memory. For 16 bit memory interface, the preferred embodiment uses one of these pins as an additional address pin while using two pins as strobe byte enable pins. For 8 bit memory interface, the preferred embodiment uses two of these pins as additional address pins while using one pin as a strobe pin. The preferred embodiment manipulates the behavior of these pins according to the contents of certain registers, described hereinbelow, called the Bus Control Registers, wherein there is one control register per strobe. By setting a small number of bit fields in this register, the programmer indicates the data type size and external memory width.

2. Principles of Operation

The preferred embodiment utilizes the following features. One external pin, PRGW, configures the external program memory width to 16 or 32 bits. Two sets of memory strobes, STRB0 and STRB1, and one I/O strobe, IOSTRB, allow zero glue logic interface to two banks of memory and one bank of external peripherals. Separate bus control registers for each STRB control wait state generation, external memory width, and data type size. STRB0 and STRB1 handle 8, 16 or 32 bit external data accesses (reads and writes). Multi-processor support through the HOLD and HOLDA signals is valid for all the STRBs.

External Interface Operation Overview

The following description describes examples, control register setups, and restrictions necessary to fully understand the operation and functionality of the external memory interface of the preferred embodiment.

Program memory access. The preferred embodiment supports program execution from 16 or 32 bit external memory width. The PRGW pin configures the width of the external program memory. When this pin is pulled high, the preferred embodiment will execute from 16 bit wide memory. When this pin is pulled low, the preferred embodiment will execute from 32 bit wide memory. For 16 bit wide zero wait-state memory, the preferred embodiment takes two instruction cycles to fetch a single 32 bit instruction. During the first cycle the lower 16 bits of the instruction are fetched. During the second cycle, the upper 16 bits are fetched and concatenated with the lower 16 bits. 32 bit memory fetches are conventional.

The PRGW Status bit field of the CPU Status (ST) register reflects the setting of the PRGW pin. FIG. 2 depicts all the bit fields of the CPU Status (ST) register.

The status of the PRGW pin also affects the reset value of the Physical Memory Width bit fields of the STRB0 and STRB1 bus control registers. The Physical Memory Width will be set to 32 bit memory width if the PRGW pin is logic low after the device reset. The Physical Memory Width will be set to 16 bit memory width if the PRGW pin is logic high after the device reset (See below for more information).

Data memory access. The preferred embodiment can load and store 8, 16, or 32 bit data quantities from and into memory. Since the CPU has a 32 bit architecture, the device internally handles all 8, 16, or 32 bit data quantities as a 32-bit value. Hence, the external memory interface handles the conversion between 8 and 16 bit data quantities to the internal 32 bit representation. The external memory interface also handles the storage of 32, 16, or 8 bit data quantities into 32, 16, or 8 bit wide memories.

The preferred embodiment supports 8, 16 or 32 bit integer data quantities. When 8 or 16 bit integers are read from external memory, the value is loaded into the least significant bits of the register with the most significant bits sign-extended or zero-filled. The polarity of the Sign Ext/ Zero Fill bit field of the corresponding STRB control register controls the sign extension or zero fill. 32 bit integer data access is conventional.

The preferred embodiment supports 16 or 32 bit floating point data quantities. For 16 bit floating-point reads, the eight most significant bits are the signed exponent and the eight least significant bits are the signed mantissa. When a 16 bit floating-point value is loaded into a 40 bit register, the external memory interface zero-fills the least significant 24 bits of the register. When a 16 bit floating-point value is used as a 32 bit on-chip input operand, the external memory interface zero-fills the 16 least significant bits of the 32 bit input operand. 32 bit floating-point data access is conventional.

External Memory Interface Mechanics

To access 8, 16, or 32 bit data quantities (types) from 8, 16, or 32 bit wide memory, the memory interface of the preferred embodiment's device utilizes either strobe STRB0 or STRB1 with four pins each. These pins serve as byte enable and/or additional address pins. In conjunction with a shifted version of the internal address presented to the external address, the preferred embodiment can select a single byte from one external memory location or combine up to four bytes from contiguous memory locations. The behavior of these pins is controlled by the external memory width and the data type size. The selected data size also determines the amount of internal to physical address shift. The programmer communicates these values to the preferred embodiment's memory interface through bit fields in the Bus Control registers.

External Interface Control Registers.

The following describes the Bus Control registers used to manipulate the byte addressability features of the preferred embodiment. FIG. 3 depicts the external interface control memory map.

The STRB0 control register, shown in FIG. 4, is a 32 bit register that contains the control bits for the portion of the external bus memory space that is mapped to STRB0. FIG. 4 shows the register bits with the bit names and functions. At the system reset, 0F10F8h is written to the STRB0 control register if PRGW pin is logic low and 0710F8h is written to the STRB0 control register if PRGW pin is logic high.

The STRB1 control register, shown in FIG. 5, is a 32 bit register that contains the control bits for the portion of the external bus memory space that is mapped to STRB1. FIG. 5 shows the register bits with the bit names and functions. At the system reset, 0F10F8h is written to the STRB1 control register if PRGW pin is logic low and 0710F8h is written to the STRB1 control register if PRGW pin is logic high.

The IOSTRB control register, shown in FIG. 6, is a 32 bit register that contains the control bits for the portion of the external bus memory space that is mapped to IOSTRB. Unlike the STRB0 and STRB1, there is no byte enable signal for the IOSTRB. The data access through the IOSTRB is always 32-bit. FIG. 6 shows the register bits with the bit names and functions. At the system reset, 0F8h is written to the IOSTRB control register. The IOSTRB timing is identical to the preferred embodiment's IOSTRB.

The Data Type Size fields indicates the size of the data type written in memory. This field can have the values shown in the following Table 1. The reset value is the last entry:

TABLE 1

| Bit 17 | Bit 16 | Data Type Size |
| --- | --- | --- |
| 0 | 0 | 8 bit |
| 0 | 1 | 16 bit |
| 1 | 0 | Reserved |
| 1 | 1 | 32 bit |

The Physical Memory Width fields indicates the size of the physical memory connected to the device. The reset value is dependent on the status of the PRGW pin. If PRGW pin is logic low, the physical memory width is configured to 32 bit (=11$_b$). If PRGW pin is logic high, the physical memory width is configured to 16 bit (=01$_b$). This field can have the values shown in the following Table 2:

TABLE 2

| Bit 19 | Bit 18 | Physical Memory Width |
| --- | --- | --- |
| 0 | 0 | 8 bit |
| 0 | 1 | 16 bit |
| 1 | 0 | Reserved |
| 1 | 1 | 32 bit |

Figure 8:
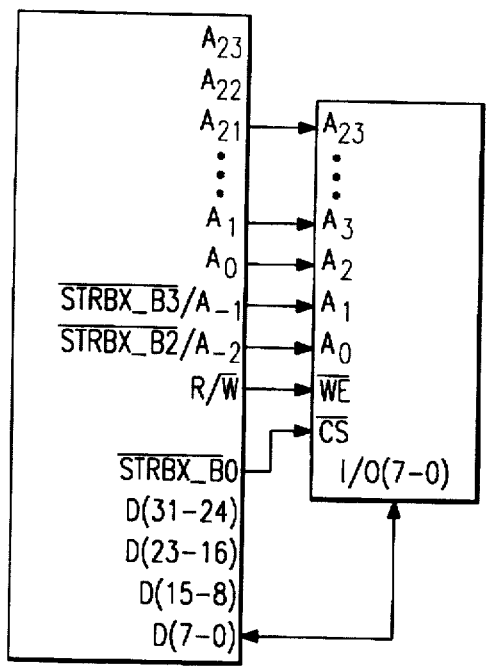
FIG. 8 is another configuration of the preferred embodiment with external memory.

Setting the Physical Memory Width field of the STRB0 or STRB1 control registers changes the functionality of the STRB0 or STRB1 signals. When the Physical Memory Width field is configured to 32 bits, the corresponding STRBX_B0–STRBX_B3 signals are configured as byte enable pins, as is shown in FIG. 7. When the Physical Memory Width field is configured to 16 bits, the corresponding STRBX_B3 signal is configured as an address pin while STRBX_B0 and STRBX_B1 signals are configured as byte enable pins (refer to FIG. 12). When the Physical Memory Width field is configured to 8 bits, the STRBX_B3 and STRBX_B2 is configured as address while STRBX_B0 is configured as byte enable pin, as is shown in FIG. 8. Note that once a STRBX_BX signal is configured as an address pin it will be an address during all external memory access (STRB0, STRB1, IOSTRB, or external program fetch).

The Sign Ext/Zero Fill field selects the method of converting 8 and 16 bit integer data to 32 bit integer data when transferring data from external memory to an internal register or memory location. This field can have the values shown in Table 3 the reset value is bit 20=0:

TABLE 3

| Bit 20 | Sign Ext/Zero Fill Function Description |
| --- | --- |
| 0 | 8 or 16 bit integer reads are sign-extended to 32-bits |
| 1 | The most significant bits of an 8 or 16 bit integer reads are zero-filled to make the number 32-bits |

Note that 8 and 16 bit integer loads are stored in the least significant bits of the preferred embodiment registers/memory with the most significant bits sign-extended or zero-filled according to the setting of this bit field.

The STRB Config field indicates if the STRB0_BX signals are active when accessing data from either STRB0 or STRB1 memory spaces. This mode is useful when accessing a single external memory bank that stores two different data types, each mapped to a different STRB. Examples are presented in Section 3 of this Detailed Description. This field can have the values shown in the following Table 4 the reset value is bit 21=0:

TABLE 4

| Bit 21 (STRB0 only) | STRB Config Function Description |
| --- | --- |
| 0 | STRB0_BX signals are active for address locations 0h-7FFFFFh and 880000h-8FFFFFh. STRB1_BX signals are active for address locations 900000h-FFFFFFh. |
| 1 | STRB0_BX signals are active for address locations 0h-7FFFFFh, 880000h-8FFFFFh, and 900000h. FFFFFFh. STRB_BX signals are active for address locations 900000h-FFFFFFh. |

The STRB Switch field defines whether a single cycle is inserted between back-to-back reads when crossing STRB0 to STRB1 or STRB1 to STRB0 boundaries (switching STRBs). The extra cycle toggles the strobe signal during back-to-back reads. Otherwise, the strobe will remain low during back-to-back reads. This field can have the values shown in the following Table 5 the reset value is bit 22=0:

TABLE 5

| Bit 22 (STRB0 only) | STRB Switch Function Description |
|---|---|
| 0 | Does not insert a single cycle between back-to-back reads that switch from STRB0 to STRB1 or vice versa. |
| 1 | Inserts a single cycle between back-to-back reads when switching from STRB0 to STRB1 or vice versa. |

EXAMPLE

For example, consider a preferred embodiment device connected to two banks of external memory. In this configuration, one bank is mapped to STRB0 while the other bank is mapped to STRB1. The STRB0 bank of memory is 32 bits wide and stores 32 bit data types. The STRB1 bank of memory is 16 bits wide and stores 16 bit data types. The programmer informs this configuration to the preferred embodiment by setting the Physical Memory Width and Data Type Size fields of the respective STRB0 and STRB1 Control Registers. Also, the programmer must set the STRB Config bit feld to zero since the banks are separate memories. Note that preferred embodiment's address pins Size of 32-bit, the external address referring to STRB0 location will be identical to the internal address used by the preferred embodiment CPU. On the other hand, setting the bit fields of the STRB1 Bus Control register with a Physical Memory Width of 16-bit and a Data Type Size of 16-bit, the address presented by the preferred embodiment's external pins is the internal address shifted right by one bit with $A_{23}$ driving $A_{23}$ and $A_{22}$. Since STRB1 memory bank address pins $A_{23}A_{22}A_{21} \ldots A_1A_0$ are connected to the preferred embodiment's address pins $A_{22}A_{21} \ldots A_1A_0A_1$, the address seen by the STRB1 memory bank is identical to the preferred embodiment's CPU internal address.

TABLE 6

| Instruction # | Internal Address | External Address | Active Strobe | Data Accessed | External Memory | |
|---|---|---|---|---|---|---|
| (2) | 4000h | 4000h | STRB0_B0/B1/B2/B3 | Data 0 | 4000h | 31                 0<br>Data 0 |
| (3) | 4001h | 4001h | STRB0_B0/B1/B2/B3 | Data 1 | 4001h | Data 1 |
| (4) | 4002h | 4002h | STRB0_B0/B1/B2/B3 | Data 2 | 4002h | Data 2 |
| (5) | 4003h | 4003h | STRB0_B0/B1/B2/B3 | Data 3 | 4003h | Data 3 |
| (8) | 900000h | C80000h | STRB1_B0/B1 and STRB1_B3/$A_1$ = 0 | Data 4 | 900000h | 15                 0<br>Data 4<br>Data 5 |
| (9) | 900001h | C80000h | STRB1_B0/B1 and STRB1_B3/$A_1$ = 1 | Data 5 | | |

$A_{23}A_{22}A_{21} \ldots A_1A_0$ are connected to the STRB0 memory bank address pins $A_{23}A_{22}A_{21} \ldots A_1A_0$. But, preferred embodiment's address pins $A_{22}A_{21} \ldots A_1A_0A_1$ are connected to the STRB1 memory bank address pins $A_{23}A_{22}A_{21} \ldots A_1A_0$.

Executing the following code on this device results in the data access sequence shown in Table 6:

```
1) LDI    *4000h, AR1  ; AR1 = 4000h
2) LDI    *AR1++, R2   ; R2 = *4000h and AR1 = AR1 + 1
3) ADDI   *AR1++, R2   ; R2 = R2 + *4001h and AR1 = AR1 + 1
4) ADDI   *AR1++, R2   ; R2 = R2 + *4002h and AR1 = AR1 + 1
5) ADDI   *AR1++, R2   ; R2 = R2 + *4003h and AR1 = AR1 + 1
6) LDI    900h, AR2    ; AR2 = 900h
7) LSH    12, AR2      ; AR2 = 900000h
8) LDI    *AR2++, R3   ; R3 = *900000h and AR2 = AR2 + 1
9) ADDI   *AR2, R3     ; R3 = R3 + 900001h
```

By setting the bit fields of the STRB0 Bus Control register with a Physical Memory Width of 32-bit and a Data Type The preferred embodiment's ability to select a single byte from a single external memory location or combinations of bytes from several contiguous memory locations, dictates that the internal address seen by the CPU corresponds to a shifted version of the address presented to the external pins. The preferred embodiment's external memory interface handles this conversion automatically as long as the programmer configures the Bus Control register to match the external memory configuration present in his hardware implementation.

The preferred embodiment handles nine different memory access cases. The following discusses these cases in detail.

32 Bit Wide Memory Interface

The preferred embodiment's memory interface to 32 bit wide external memory utilizes STRBX_B3 through STRBX_B0 pins as strobe-byte enable pins as shown in FIG. 7. In this manner, the preferred embodiment can read/write a single 32, 16, or 8 bit value from the external 32 bit wide memory.

Case 1: 32-bit Wide Memory with 8-bit Data Type Size

Figure 9:
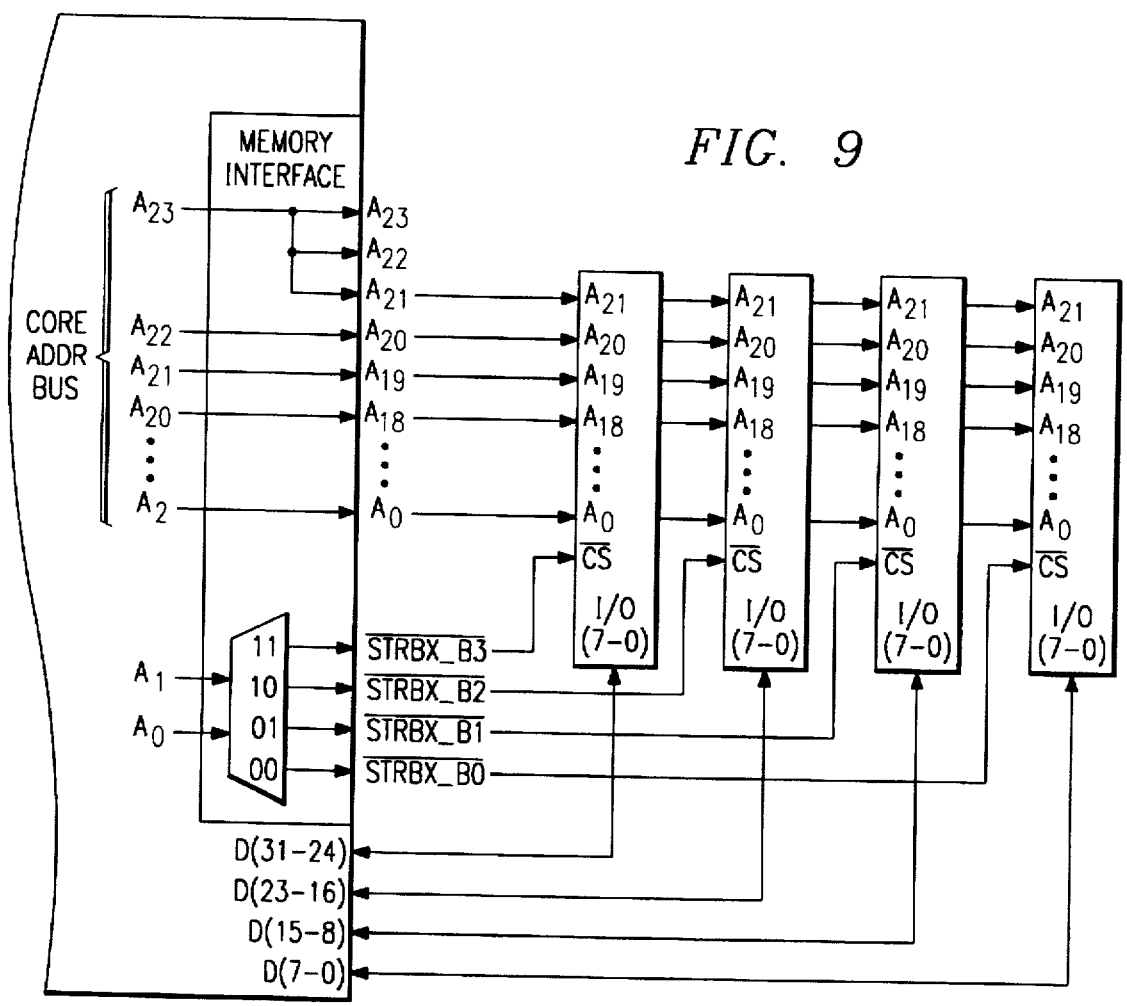
FIG. 9 is yet another configuration of the preferred embodiment with external memory.

When the data type size is 8 bit, the preferred embodiment shifts the internal address two bits to the right before presenting it to the external address pins. In this shift, the memory interface copies the value of the internal address $A_{23}$ to the external address pins $A_{23}$, $A_{22}$, and $A_{21}$. Also, the memory interface activates the STRBX_B3 through STRBX_B0 pins according to the value of the internal address bits $A_1$ and $A_0$ as shown in Table 7. FIG. 9 depicts a functional diagram of the memory interface for 32-bit wide memory with 8-bit data type size.

TABLE 7

| Internal $A_1$ | Internal $A_0$ | Active Strobe-Byte Enable |
|---|---|---|
| 0 | 0 | STRBX_B0 |
| 0 | 1 | STRBX_B1 |
| 1 | 0 | STRBX_B2 |
| 1 | 1 | STRBX_B3 |

For example, reading or writing to memory locations 904000h to 904004h behaves as shown in the following Table 8:

TABLE 8

| Internal Address Bus | External Address Pins | Active Strobe-Byte Enable | Accessed Data Pins |
|---|---|---|---|
| 904000h | E41000h | STRB1_B0 | $D_{7-0}$ |
| 904001h | E41000h | STRB1_B1 | $D_{15-8}$ |
| 904002h | E41000h | STRB1_B2 | $D_{23-16}$ |
| 904003h | E41000h | STRB1_B3 | $D_{31-24}$ |
| 904004h | E41001h | STRB1_B0 | $D_{7-0}$ |

Case 2: 32-bit Wide Memory with 16-bit Data Type Size.

Figure 10:
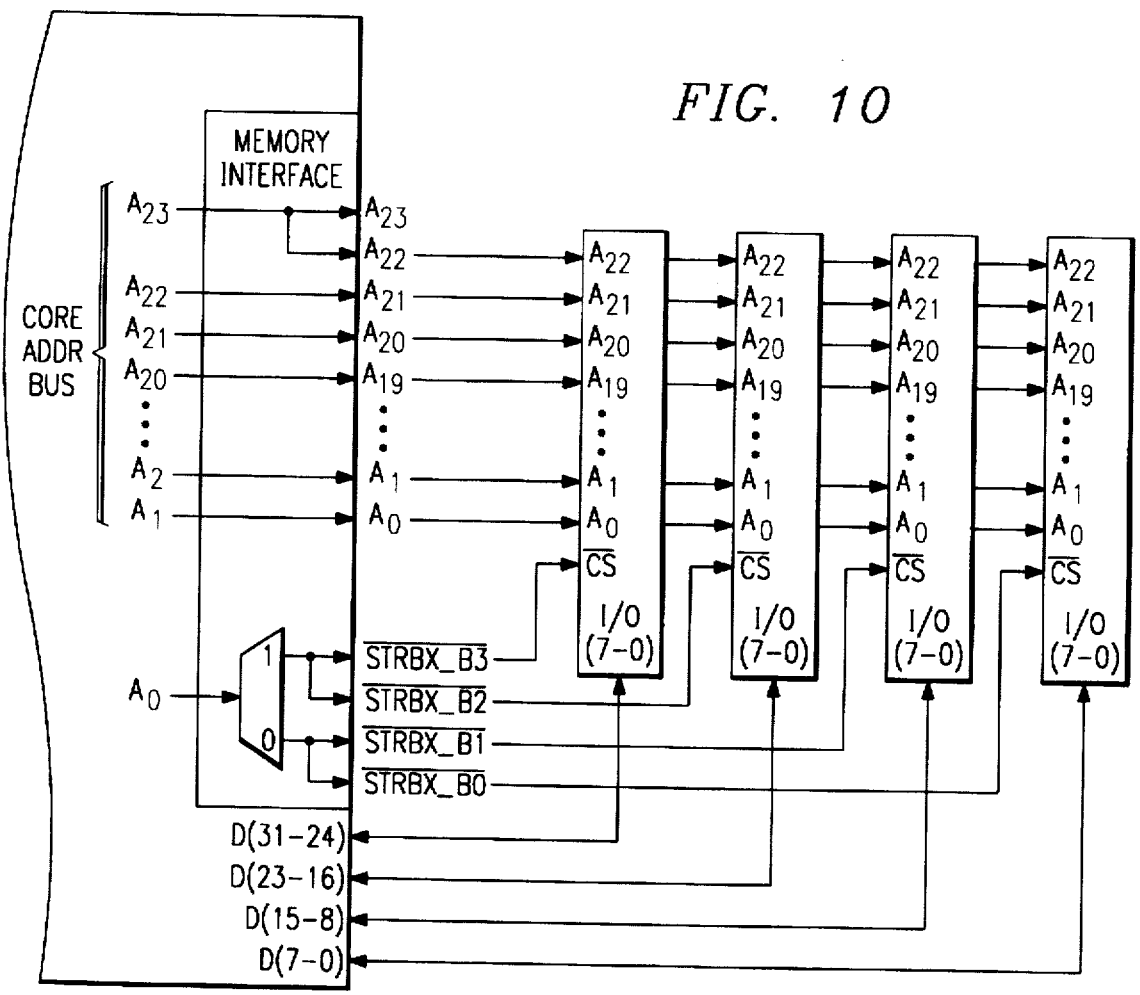
FIG. 10 is yet another configuration of the preferred embodiment with external memory.

When the data type size is 16 bit, the preferred embodiment shifts the internal address one bit to the right before presenting it to the external address pins. In this shift, the memory interface copies the value of the internal address $A_{23}$ to the external address pins $A_{23}$ and $A_{22}$. Also, the memory interface activates the STRBX_B3 through STRBX_B0 pins according to the value of the internal address bit $A_0$ as shown in Table 9. FIG. 10 depicts a functional diagram of the memory interface for 32-bit wide memory with 16-bit data type size.

TABLE 9

| Internal $A_0$ | Active Strobe-Byte Enable |
|---|---|
| 0 | STRBX_B1 and STRBX_B0 |
| 1 | STRBX_B3 and STRBX_B2 |

For example, reading or writing to memory locations 904000h to 904004h behaves as shown in the following Table 10:

TABLE 10

| Internal Address Bus | External Address Pins | Active Strobe-Byte Enable | Accessed Data Pins |
|---|---|---|---|
| 904000h | C82000h | STRB1_B1 and STRB1_B0 | $D_{15-0}$ |
| 904001h | C82000h | STRB1_B3 and STRB1_B2 | $D_{31-16}$ |
| 904002h | C82001h | STRB1_B1 and STRB1_B0 | $D_{15-0}$ |
| 904003h | C82001h | STRB1_B3 and STRB1_B2 | $D_{31-16}$ |
| 904004h | C82002h | STRB1_B1 and STRB1_B0 | $D_{15-0}$ |

Figures 11, 12:
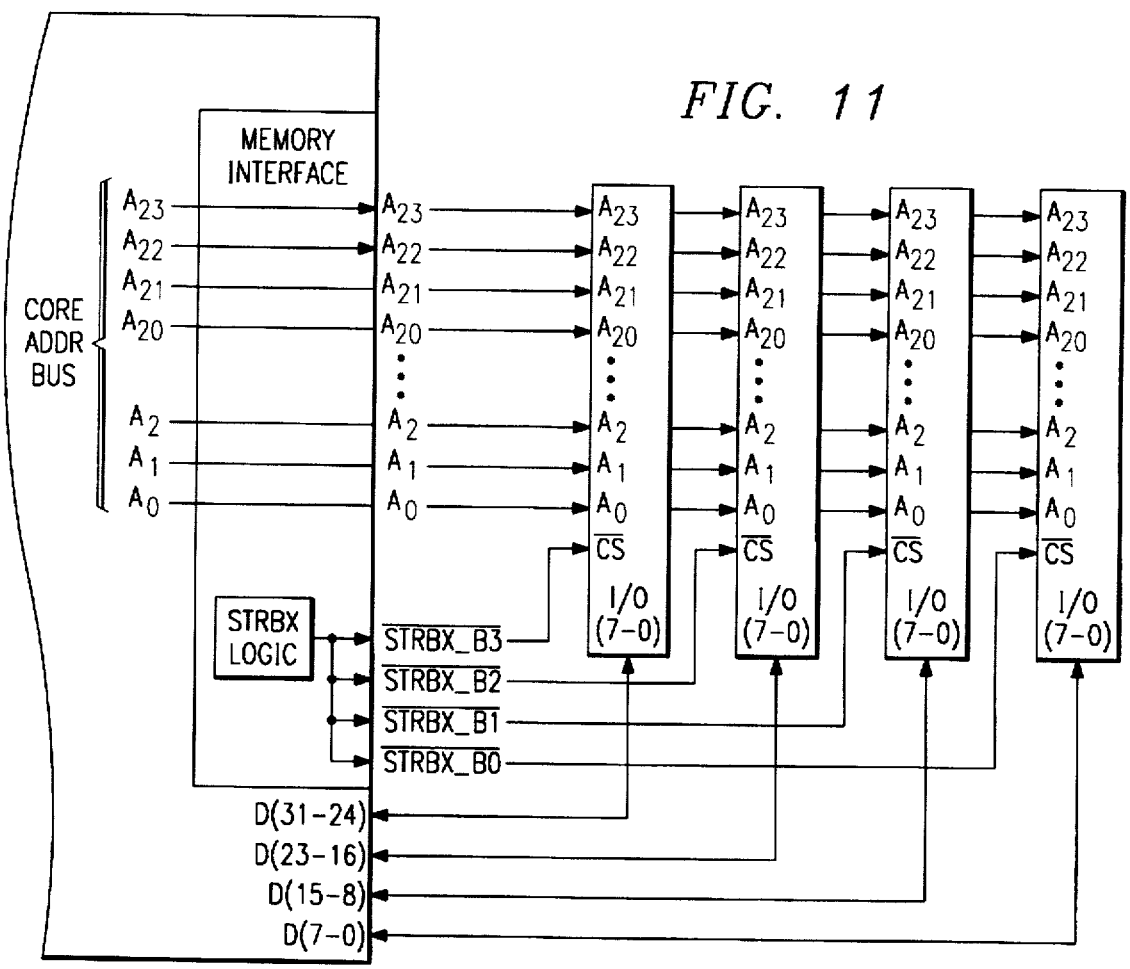
FIG. 11 is yet another configuration of the preferred embodiment with external memory.
FIG. 12 is yet another configuration of the preferred embodiment with external memory.

Case 3: 32-bit Wide Memory with 32-bit Data Type Size
When the data type size is 32 bit, the preferred embodiment does not shift the internal address before presenting it to the external address pins. In this case, the memory interface copies the value of the internal address bus to the respective external address pins. Also, the memory interface activates STRBX_B3 through STRBX_B0 pins during accesses. FIG. 11 depicts a functional diagram of the memory interface for 32-bit wide memory with 32-bit data type size.

For example, reading or writing to memory locations 904000h to 904004h behaves as shown in the following Table 11:

TABLE 11

| Internal Address Bus | External Address Pins | Active Strobe-Byte Enable | Accessed Data Pins |
|---|---|---|---|
| 904000h | 904000h | STRB1_B0, STRB1_B1, STRB1_B2 and STRB1_B3 | $D_{31-0}$ |
| 904001h | 904001h | STRB1_B0, STRB1_B1, STRB1_B2 and STRB1_B3 | $D_{31-0}$ |
| 904002h | 904002h | STRB1_B0, STRB1_B1, STRB1_B2 and STRB1_B3 | $D_{31-0}$ |
| 904003h | 904003h | STRB1_B0, STRB1_B1, STRB1_B2, and STRB1_B3 | $D_{31-0}$ |
| 904004h | 904004h | STRB1_B0, STRB1_B1, STRB1_B2 and STRB1_B3 | $D_{31-0}$ |

16 Bit Wide Memory Interface

The preferred embodiment's memory interface to 16 bit wide external memory utilizes STRBX_B3 in as an additional address pin, $A_{-1}$, while using STRBX_B0 and STRBX_B1 as strobe-byte enable pins as shown in FIG. 12. Note that the external memory address pins are connected to the preferred embodiment's address pins $A_{22}A_{21} \ldots A_1A_0A_{-1}$. In this manner, the preferred embodiment can read/write a single 32, 16, or 8 bit value from the external 16 bit wide memory.

Case 4: 16-bit Wide Memory with 8-bit Data Type Size

Figure 13:
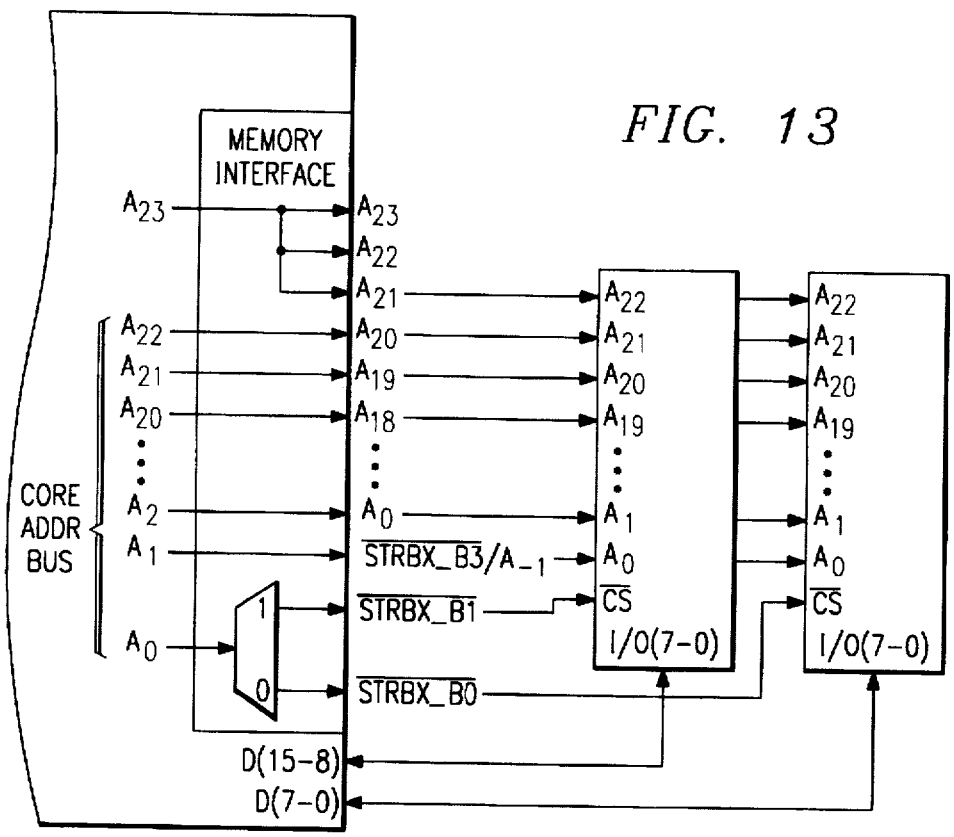
FIG. 13 is yet another configuration of the preferred embodiment with external memory.

When the data type size is 8 bits, the preferred embodiment shifts the internal address two bits to the right before presenting it to the external address pins. In this shift, the memory interface copies the value of the internal address $A_{23}$ to the external address pins $A_{23}$, $A_{22}$, and $A_{21}$. The memory interface also copies the value of the internal address $A_1$ to the external STRBX_B3/$A_{-1}$ pin. Furthermore, the memory interface activates the STRBX_B1 and STRBX_B0 pins according to the value of the internal address bit $A_0$ as shown in Table 12. FIG. 13 depicts a functional diagram of the memory interface for 16-bit wide memory with 8-bit data type size.

TABLE 12

| Internal $A_0$ | Active Strobe-Byte Enable |
|---|---|
| 0 | STRBX_B0 |
| 1 | STRBX_B1 |

For example, reading or writing to memory locations 4000h to 4004h behaves as shown in the following Table 13:

TABLE 13

| Internal Address Bus | External Address Pins | STRB0_B3/A$_{-1}$ | Active Strobe-Byte Enable | Accessed Data Pins |
|---|---|---|---|---|
| 4000h | 1000h | 0 | STRB0_B0 | $D_{7-0}$ |
| 4001h | 1000h | 0 | STRB0_B1 | $D_{15-8}$ |
| 4002h | 1000h | 1 | STRB0_B0 | $D_{7-0}$ |
| 4003h | 1000h | 1 | STRB0_B1 | $D_{15-8}$ |
| 4004h | 1001h | 0 | STRB0_B0 | $D_{7-0}$ |

Case 5: 16-bit Wide Memory with 16-bit Data Type Size

Figure 14:
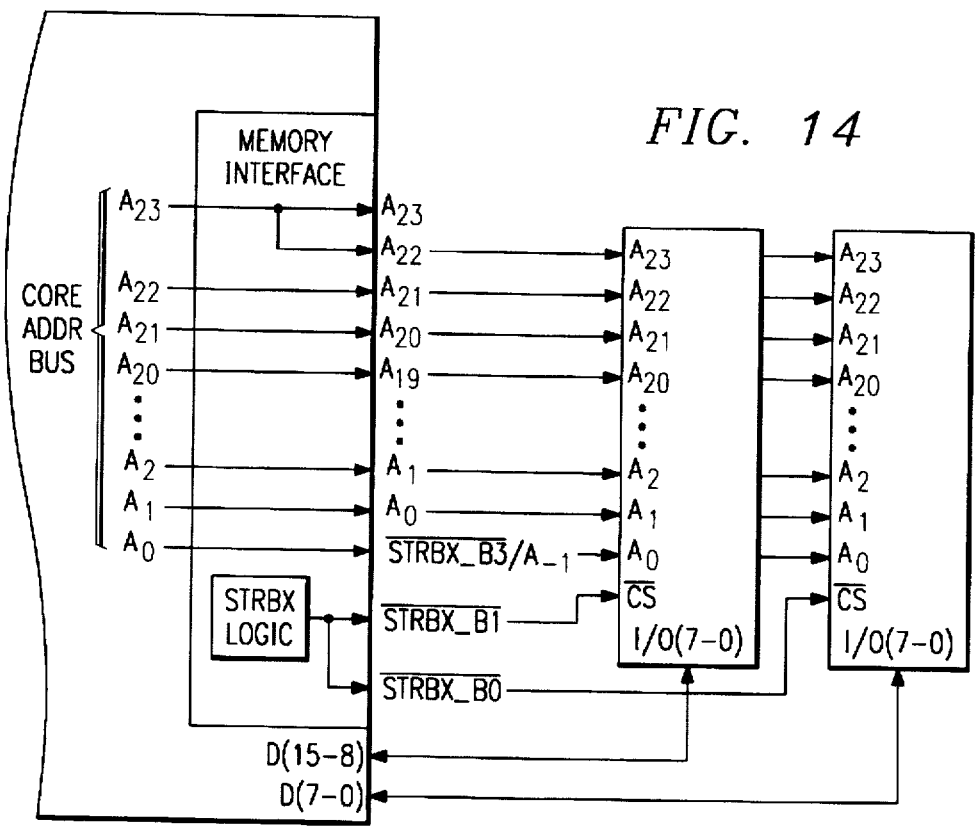
FIG. 14 is yet another configuration of the preferred embodiment with external memory.

When the data type size is 16 bit, the preferred embodiment shifts the internal address one bit to the right before presenting it to the external address pins. In this shift, the memory interface copies the value of the internal address $A_{23}$ to the external address pins $A_{23}$ and $A_{22}$. Also, the memory interface copies the value of the internal address $A_1$ to the external STRBX_B3/A$_{-1}$ pin. Moreover, the memory interface activates the STRBX_B1 and STRBX_B0 during accesses. FIG. 14 depicts a functional diagram of the memory interface for 16-bit wide memory with 16-bit data type size.

For example, reading or writing to memory locations 4000h to 4004h behaves as shown in the following Table 14:

Case 6: 16-bit Wide Memory with 32-bit Data Type Size

Figure 15:
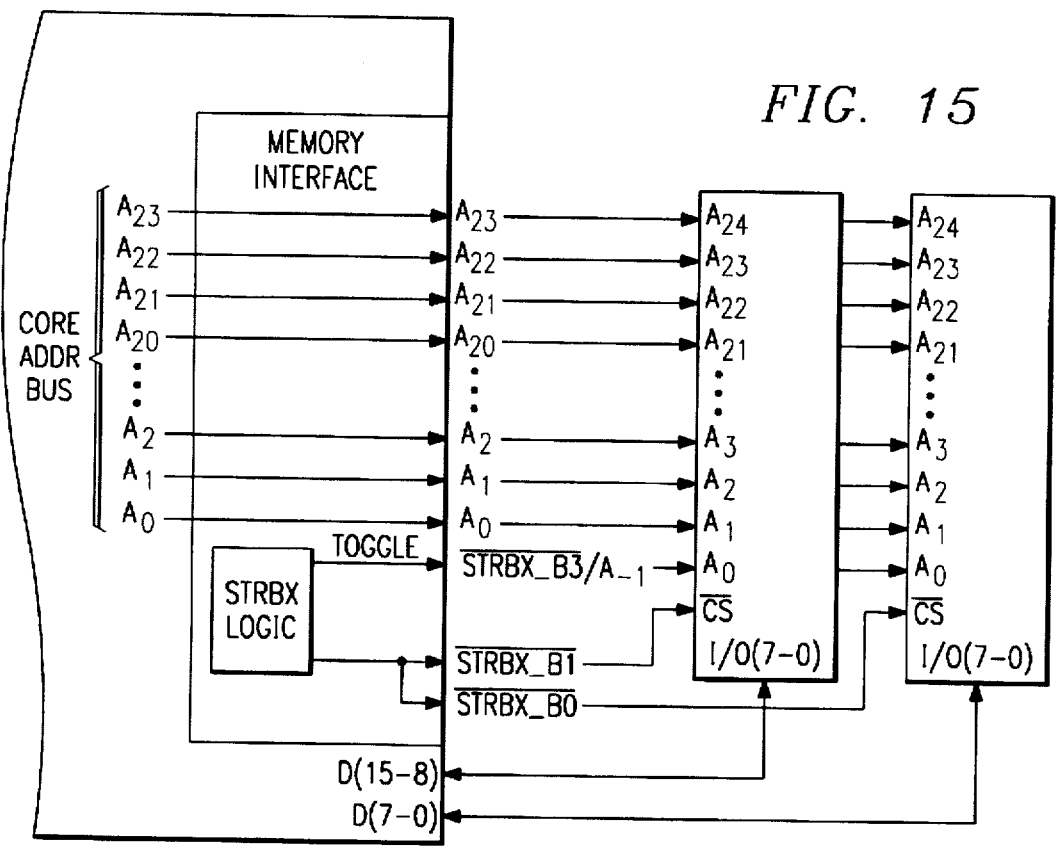
FIG. 15 is yet another configuration of the preferred embodiment with external memory.

When the data type size is 32 bit, the preferred embodiment does not shift the internal address before presenting it to the external address pins. In this case, the memory interface copies the value of the internal address bus to the respective external address pins. The memory interface also toggles STRBX_B3/A$_{-1}$ twice to perform two 16 bit memory accesses. In the consecutive memory accesses, the memory interface activates STRBX_B1 and STRBX_B0. In summary, the memory interface adds one wait state to the 32-bit data access. FIG. 15 depicts a functional diagram of the memory interface for 16-bit wide memory with 32-bit data type size.

For example, reading or writing to memory locations 4000h to 4004h behaves as shown in the following Table 15:

TABLE 14

| Internal Address Bus | External Address Pins | STRB0_B3/A$_{-1}$ | Active Strobe-Byte Enable | Accessed Data Pins |
|---|---|---|---|---|
| 4000h | 2000h | 0 | STRB0_B0 and STRB0_B1 | $D_{15-0}$ |
| 4001h | 2000h | 1 | STRB0_B0 and STRB0_B1 | $D_{15-0}$ |
| 4002h | 2001h | 0 | STRB0_B0 and STRB0_B1 | $D_{15-0}$ |
| 4003h | 2001h | 1 | STRB0_B0 and STRB0_B1 | $D_{15-0}$ |
| 4004h | 2002h | 0 | STRB0_B0 and STRB0_B1 | $D_{15-0}$ |

TABLE 15

| Internal Address Bus | External Address Pins | STRB0_B3/A$_{-1}$ | Active Strobe-Byte Enable | Accessed Data Pins |
|---|---|---|---|---|
| 4000h | 4000h | 0 | STRB0_B0 and STRB0_B1 | $D_{15-0}$ |
| | 4000h | 1 | STRB0_B0 and STRB0_B1 | $D_{15-0}$ |
| 4001h | 4001h | 0 | STRB0_B0 and STRB0_B1 | $D_{15-0}$ |
| | 4001h | 1 | STRB0_B0 and STRB0_B1 | $D_{15-0}$ |
| 4002h | 4002h | 0 | STRB0_B0 and STRB0_B1 | $D_{15-0}$ |
| | 4002h | 1 | STRB0_B0 and STRB0_B1 | $D_{15-0}$ |
| 4003h | 4003h | 0 | STRB0_B0 and STRB0_B1 | $D_{15-0}$ |
| | 4003h | 1 | STRB0_B0 and STRB0_B1 | $D_{15-0}$ |

TABLE 15-continued

| Internal Address Bus | External Address Pins | STRB0_B3/A_$-1$ | Active Strobe-Byte Enable | Accessed Data Pins |
|---|---|---|---|---|
| 4004h | 4004h | 0 | STRB0_B0 and STRB0_B1 | $D_{15-0}$ |
|  | 4004h | 1 | STRB0_B0 and STRB0_B1 | $D_{15-0}$ |

8 Bit Wide Memory Interface

The preferred embodiment's memory interface to 8 bit wide external memory utilizes STRBX_B3 and STRBX_B2 pins as an additional address pins, $A_{-1}$ and $A_{-2}$, respectively, while using STRBX_B0 as strobebyte enable pin as shown in FIG. 8. Note that the external memory address pins are connected to the preferred embodiment's address pins $A_{21}A_{20} \ldots A_1A_0A_{-1}A_{-2}$. In this manner, the preferred embodiment can read/write a single 32, 16, or 8 bit value from the external 8 bit wide memory.

Case 7: 8-bit Wide Memory with 8-bit Data Type Size.

Figure 16:
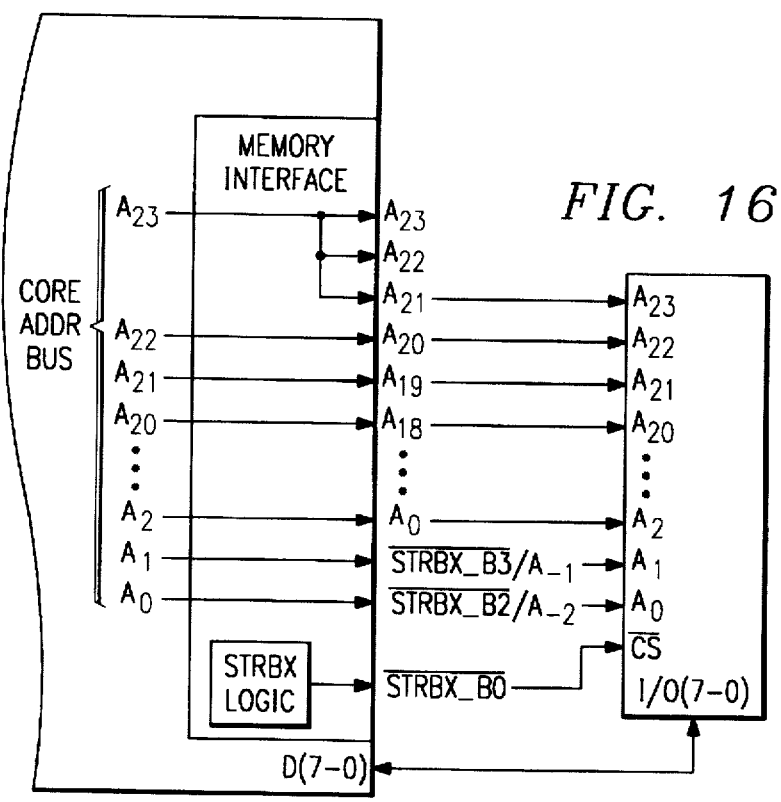
FIG. 16 is yet another configuration of the preferred embodiment with external memory.

Similar to Case 4, the preferred embodiment shifts the internal address two bits to the right before presenting it to the external address pins when the data type is 8 bit. As in Case 4, the memory interface copies the value of the internal address $A_{23}$ to the external address pins $A_{23}$, $A_{22}$, and $A_{21}$. But in Case 7, the memory interface also copies the value of the internal address $A_1$ to the external STRBX_B3/A_$-1$ pin and the value of $A_0$ to the external STRBX_B2/A_$-2$. Moreover, the memory interface only actives the STRBX_B0 pin during the external memory access. FIG. 16 depicts a functional diagram of the memory interface for 8-bit wide memory with 8-bit data type size.

For example, reading or writing to memory locations A04000h to A04004h behaves as shown in the following Table 16:

TABLE 16

| Internal Address Bus | External Address Pins | STRB1_B3/A_$-1$ | STRB1_B3/A_$-1$ | Active Strobe-Byte Enable | Accessed Data Pins |
|---|---|---|---|---|---|
| A04000h | E81000h | 0 | 0 | STRB1_B0 | $D_{7-0}$ |
| A04001h | E81000h | 0 | 1 | STRD1_B0 | $D_{7-0}$ |
| A04002h | E81000h | 1 | 0 | STRB1_B0 | $D_{7-0}$ |
| A04003h | E81000h | 1 | 1 | STRB1_B0 | $D_{7-0}$ |
| A04004h | E81001h | 0 | 0 | STRB1_B0 | $D_{7-0}$ |

Case 8: 8-bit Wide Memory with 16-bit Data Type Size

Figure 17:
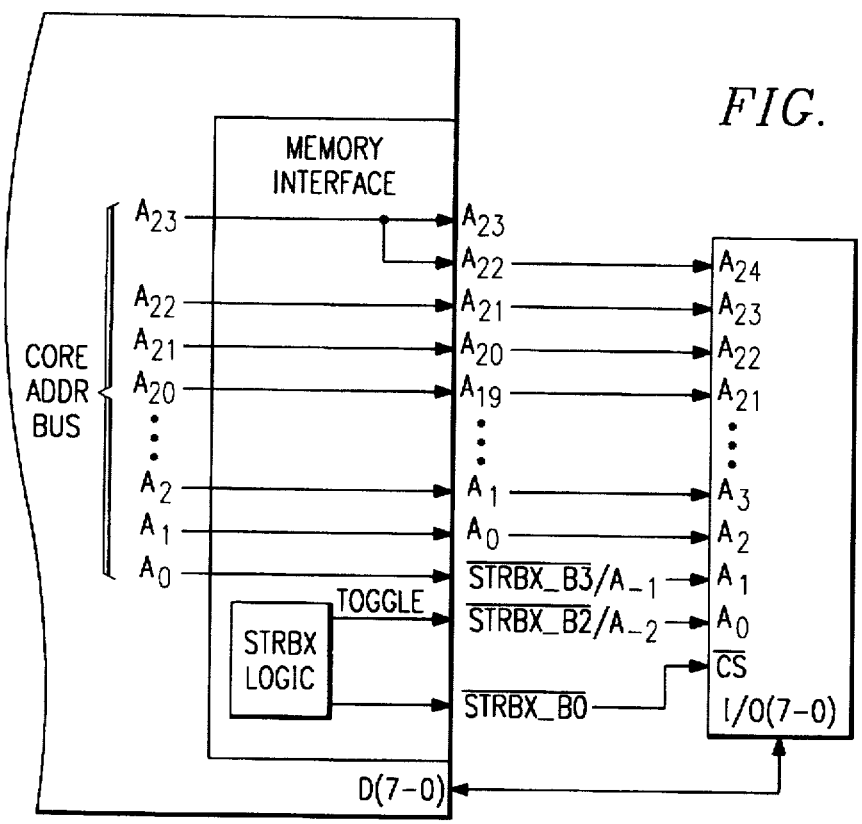
FIG. 17 is yet another configuration of the preferred embodiment with external memory.

When the data type size is 16 bit, the preferred embodiment shifts the internal address one bit to the right before presenting it to the external address pins. In this shift, the memory interface copies the value of the internal address $A_{23}$ to the external address pins $A_{23}$ and $A_{22}$. Also, the memory interface copies the value of the internal address $A_0$ to the external STRBX_B3/A_$-1$ pin. Furthermore, the memory interface toggles STRBX_B2/A_$-2$ twice to perform two 8 bit memory accesses. Moreover, the memory interface activates the STRBX_B1 and STRBX_B0 during accesses. In summary, the memory interface adds one wait state to the 16-bit data access. FIG. 17 depicts a functional diagram of the memory interface for 8-bit wide memory with 16-bit data type size.

For example, reading or writing to memory locations A04000h to A04002h behaves as shown in the following Table 17:

TABLE 17

| Internal Address Bus | External Address Pins | STRB1_B3/A_$-1$ | STRB1_B3/A_$-1$ | Active Strobe-Byte Enable | Accessed Data Pins |
|---|---|---|---|---|---|
| A04000h | D02000h | 0 | 0 | STRB1_B0 | $D_{7-0}$ |
|  | D02000h | 0 | 1 | STRB1_B0 | $D_{7-0}$ |
| A04001h | D02001h | 1 | 0 | STRB1_B0 | $D_{7-0}$ |
|  | D02001h | 1 | 1 | STRB1_B0 | $D_{7-0}$ |
| A04002h | D02002h | 0 | 0 | STRB1_B0 | $D_{7-0}$ |
|  | D02002h | 0 | 1 | STRB1_B0 | $D_{7-0}$ |

Case 9: 8-bit Wide Memory with 32-bit Data Type Size

Figure 18:
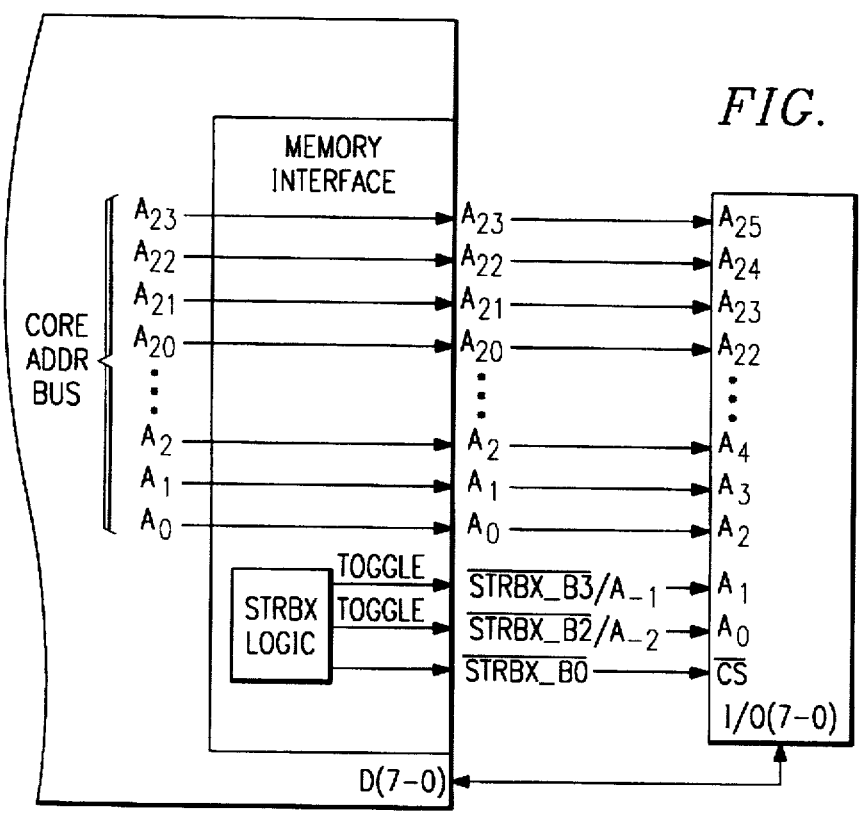
FIG. 18 is yet another configuration of the preferred embodiment with external memory.

When the data type size is 32 bit, the preferred embodiment does not shift the internal address before presenting it to the external address pins. In this case, the memory interface copies the value of the internal address bus to the respective external address pins. The memory-interface also toggles STRBX_B3/A_$-1$ and STRBX_B2/A_$-2$ to perform four 8 bit memory accesses. In the consecutive memory accesses, the memory interface activates STRBX_B0. In summary, the memory interface adds three wait states to the 32-bit data access. FIG. 18 depicts a functional diagram of the memory interface for 8-bit wide memory with 32-bit data type size.

For example, reading or writing to memory locations A04000h to A04001h behaves as shown in the following Table 18:

TABLE 18

| Internal Address Bus | External Address Pins | STRB1_B3/A_1 | STRB1_B3/A_1 | Active Strobe-Byte Enable | Accessed Data Pins |
|---|---|---|---|---|---|
| A04000h | A04000h | 0 | 0 | STRB1_B0 | $D_{7-0}$ |
|  | A04000h | 0 | 1 | STRB1_B0 | $D_{7-0}$ |
|  | A04000h | 1 | 0 | STRB1_B0 | $D_{7-0}$ |
|  | A04000h | 1 | 1 | STRB1_B0 | $D_{7-0}$ |
| A04001h | A04001h | 0 | 0 | STRB1_B0 | $D_{7-0}$ |
|  | A04001h | 0 | 1 | STRB1_B0 | $D_{7-0}$ |
|  | A04001h | 1 | 0 | STRB1_B0 | $D_{7-0}$ |
|  | A04001h | 1 | 1 | STRB1_B0 | $D_{7-0}$ |

External ready timing improvement

Figure 19:
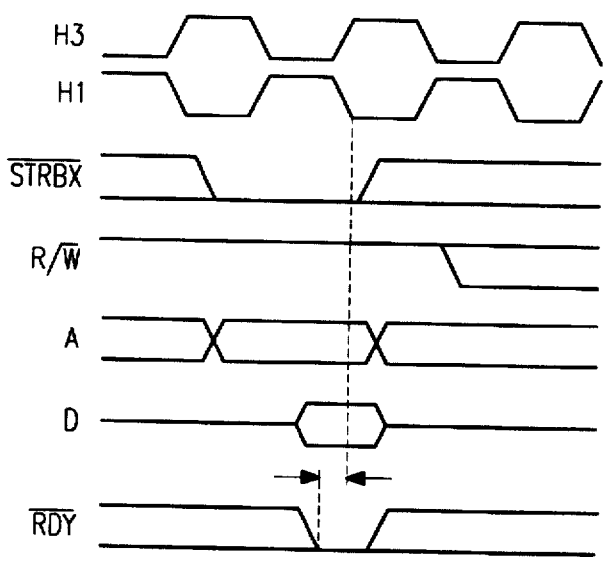
FIG. 19 is a signal timing diagram in conjunction with RDY timing.

The RDY timing should reference to the H1 low signal as shown in FIG. 19. This is equivalent to the preferred embodiment's ready timing which increases the time between valid address and the sampling of RDY. This facilitates the memory hardware interface by increasing the address decode circuit response time to generate a ready signal.

External Memory Interface. This section discusses functional timing of operations on the external memory bus. The timing of STRB0 and STRB1 bus cycles are identical and discussed collectively hereinbelow. The acronym STRB0,1 is used in references that pertain equally to STRB0 and STRB1. The IOSTRB bus cycles are timed differently and are discussed separately hereinbelow.

STRB0 and STRB1 Bus Cycles

All bus cycles comprise integral numbers of H1 clock cycles. One H1 cycle is defined from one falling edge of H1 to the next falling edge of H1. For full speed (zero wait-state) accesses on STRB0 and STRB1, writes consume two H1 cycles and reads consume one cycle. However, if the read immediately follows a write, the read consumes two cycles. Note that writes to internal memory consume one cycle if no other accesses to that interface are in progress. The following discussion pertains to zero wait-state accesses unless otherwise specified.

The STRB0,1 signal is low for the active portion of both reads and writes (one H1 cycle). Additionally, before and after the active portions of writes only (STRB0,1 low), there is a transition of one H1 cycle. During this transition cycle the following might occur:

STRB0,1 is high.

If required, R/W changes state on the rising edge of H1.

If required, address changes on the rising edge of H1 if the previous H1 cycle performed a write. If the previous H1 cycle performed a read, address changes on the falling edge of H1.

Figure 20:
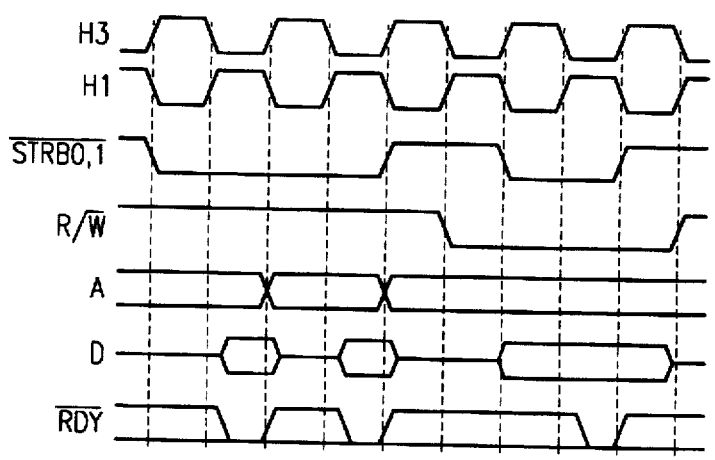
FIG. 20 is a signal timing diagram in conjunction with zero wait-state and read/write sequence for STRB0,1 active.

FIG. 20 illustrates a zero wait-state read-read-write sequence for STRB0,1 active. The data is read as late in the cycle as possible to allow for the maximum access time from address valid. Note that although external writes consume two cycle, writes to internal memory consume one cycle if no other accesses to that interface are in progress. Similar to typical external interfaces, the R/W does not change until the STRB0 and STRB1 are inactivated.

Figure 21:
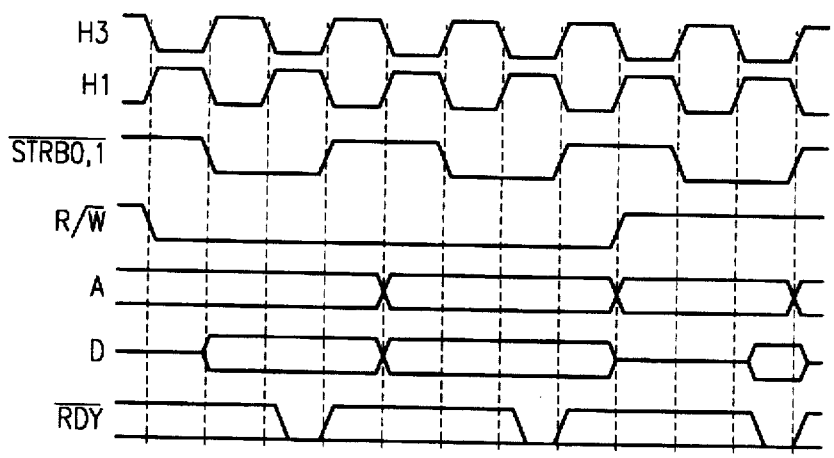
FIG. 21 is a signal timing diagram in conjunction with a zero wait-state write/write/read for STRB0,1 active.

FIG. 21 illustrates a zero wait-state write-write-read sequence for STRB0,1 active. During back to back writes, the data is valid approximately one-half cycle after STRB0,1 changes for the first write, but for subsequent writes the data is valid when STRB0,1 changes.

FIG. 22 illustrates a one wait-state read sequence for STRB0,1 active. On the first H1 cycle RDY is high therefore, the read sequence is extended for one extra cycle. On the second H1 cycle RDY is low and the read sequence is terminated.

FIG. 23 illustrates a one wait-state write sequence for STRB0,1 active. On the first H1 cycle RDY is high therefore, the write sequence is extended for one extra cycle. On the second H1 cycle RDY is low and the write sequence is terminated.

IOSTRB Bus Cycles

In contrast to STRB0 and STRB1 bus cycles, IOSTRB full speed (zero wait-state) reads and writes consume two H1 cycles. During these cycles, the IOSTRB signal is low from the rising edge of the first H1 cycle to the rising edge of the second H1 cycle. Also, the address changes on the falling edge of the first H1 cycle and R/W changes state on the falling edge of H1. This provides a valid address to peripherals that may change their status bits when read or written while IOSTRB is active. Moreover, the IOSTRB signal is high between IOSTRB read and write cycles.

FIG. 24 illustrates a zero wait-state read and write sequence for IOSTRB active. During writes, the data is valid when IOSTRB changes.

FIG. 25 depicts a one wait-state read sequence for IOSTRB active. FIG. 26 shows a one wait-state write sequence for IOSTRB active. For each wait-state added, IOSTRB, R/W, and A are extended for one extra clock cycle. Writes hold the data on the bus for one extra clock cycle. RDY is sampled on each extra cycle and the sequenced is terminated when RDY is low.

Figure 27:
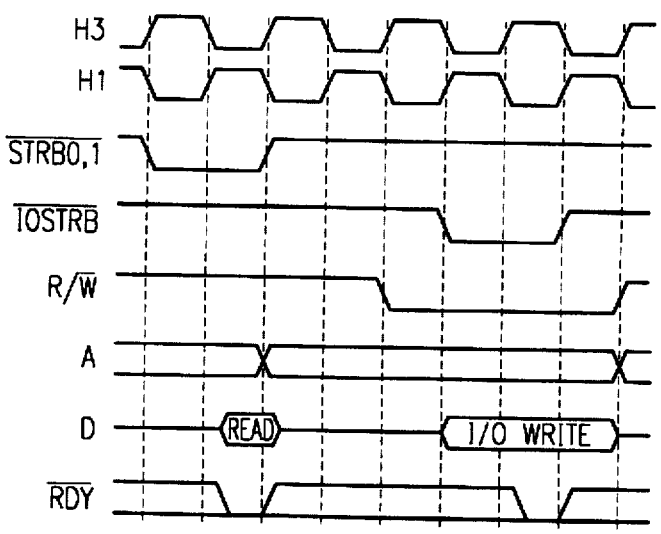
FIG. 27 is a signal timing diagram illustrating the transitions between STRB0,1 reads and IOSTRB writes.
Figure 28:
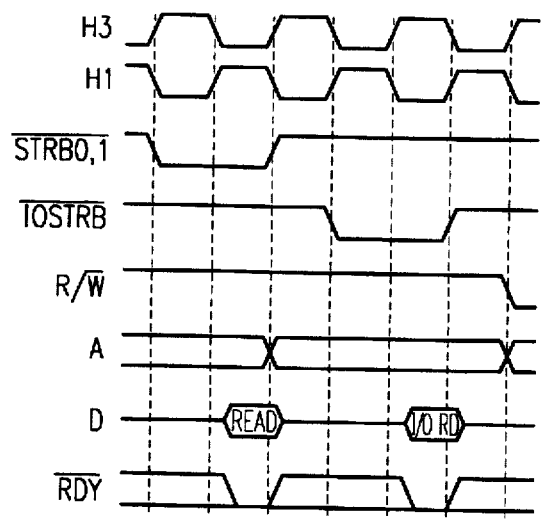
FIG. 28 illustrates the transitions between STRB0,1 reads and IOSTRB reads.

FIG. 27 and FIG. 28 illustrate the transitions between STRB0,1 reads and IOSTRB writes and reads, respectively. In these transitions, the address changes on the falling edge of the H1 cycle.

Figure 29:
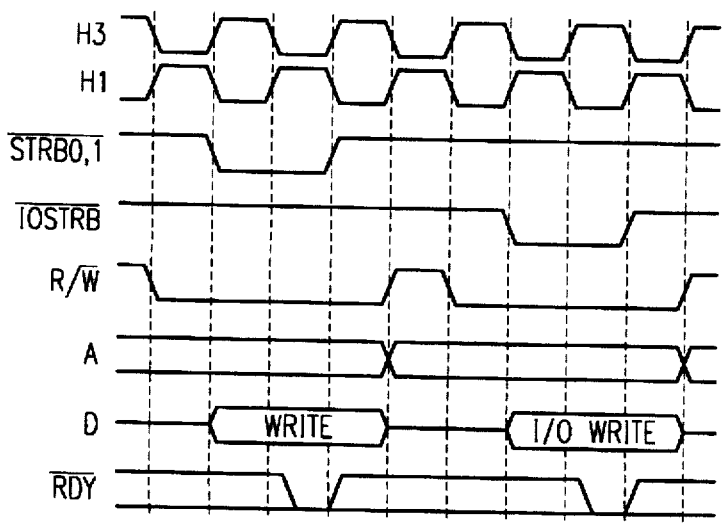
FIG. 29 is a signal timing diagram illustrating the transitions between STRB0,1 writes and IOSTRB writes.
Figure 30:
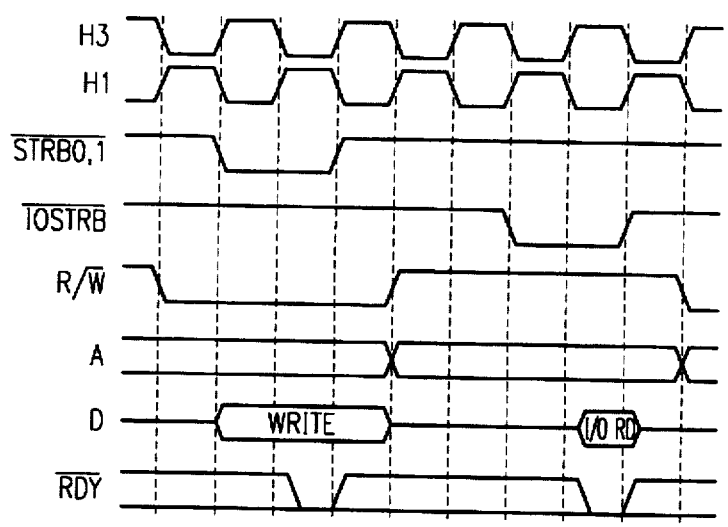
FIG. 30 is a signal timing diagram illustrating the transitions between STRB0,1 writes and IOSTRB reads.
Figure 31:
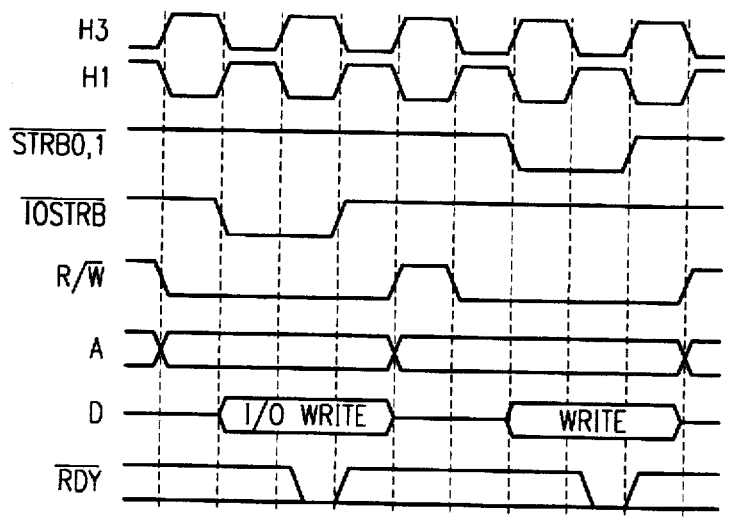
Figure 32:
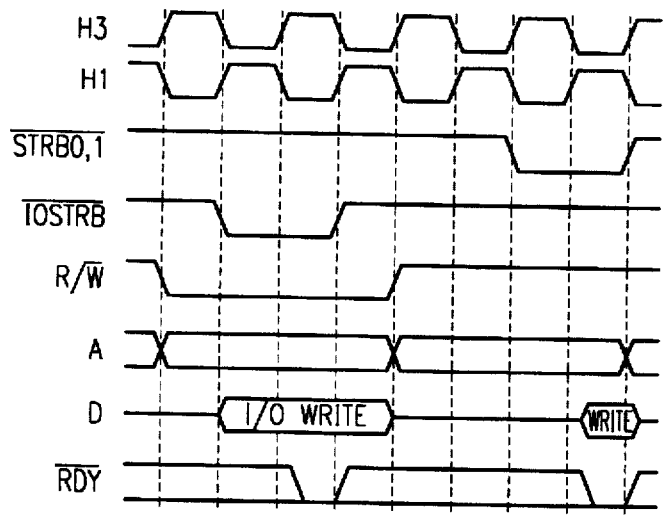
FIG. 32 is a second diagram illustrating a transition between IOSTRB write/reads and STRB0,1 writes/reads.
Figure 33:
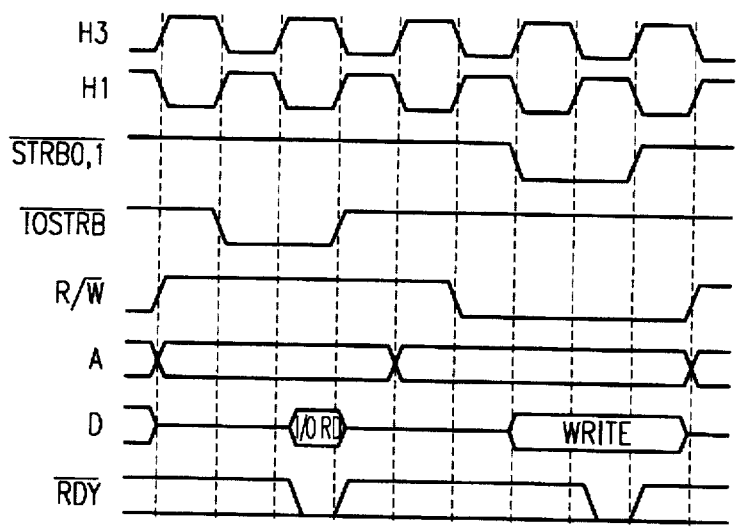
FIG. 33 is a third diagram illustrating a transition between IOSTRB write/reads and STRB0,1 writes/reads.
Figure 34:
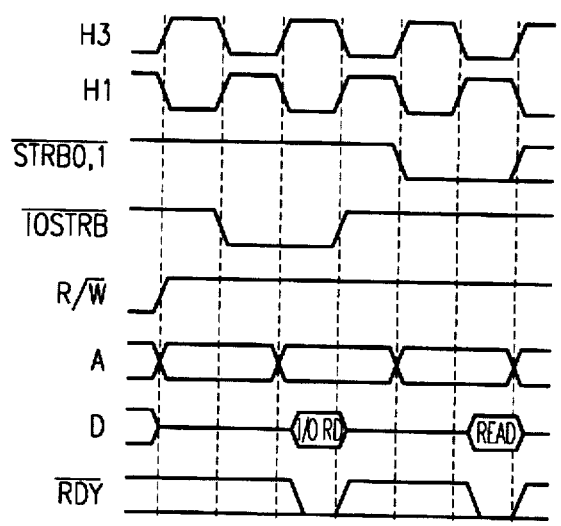
FIG. 34 is a fourth diagram illustrating a transition between IOSTRB write/reads and STRB0,1 writes/reads.

FIG. 29 and FIG. 30 illustrate the transitions between STRB0,1 writes and IOSTRB writes and reads, respectively. In these transitions, the address changes on the falling edge of the H3 cycle.

FIG. 31 through FIG. 34 depict the transitions between IOSTRB writes/reads and STRB0,1 writes/reads. In these transitions, the address changes on the rising edge of the H3 cycle.

Figure 35:
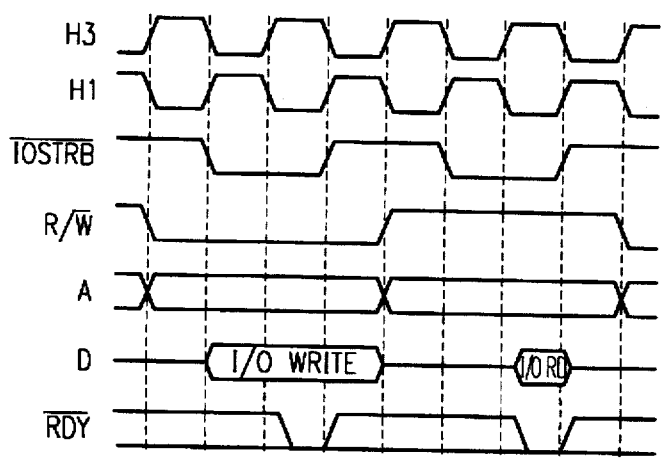
FIG. 35 is a first signal timing diagram illustrating the transitions between IOSTRB reads and writes.
Figure 36:
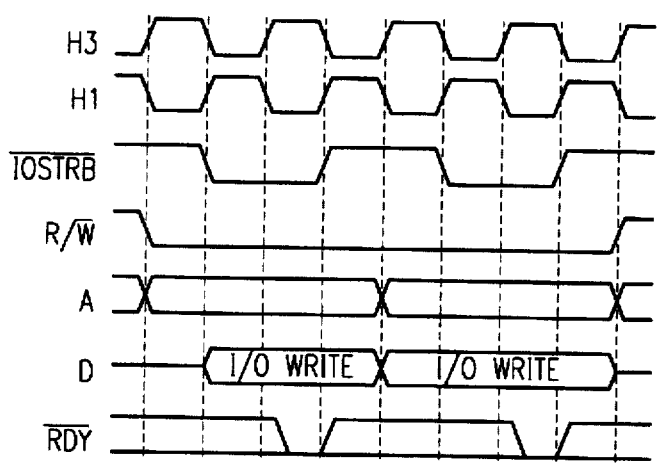
FIG. 36 is a second signal timing diagram illustrating the transitions between IOSTRB reads and writes.
Figure 37:
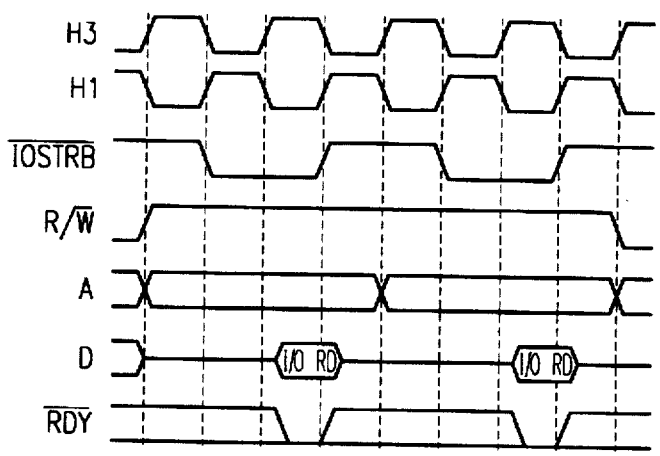
FIG. 37 is a third signal timing diagram illustrating the transitions between IOSTRB reads and writes.

FIG. 35 through FIG. 37 illustrate the transitions between IOSTRB reads and writes.

Inactive Bus States

Figure 38:
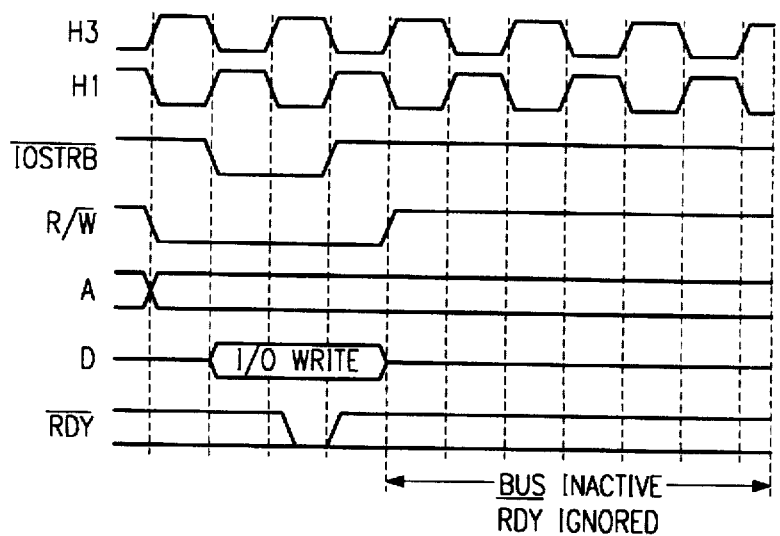
FIG. 38 is a signal timing diagram depicting the signal states when a bus becomes inactive after an IOSTRB.
Figure 39:
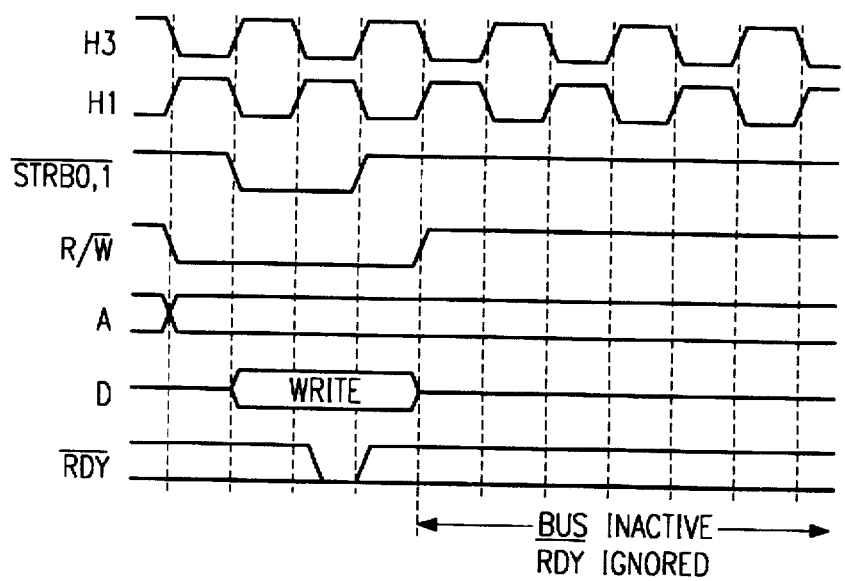
FIG. 39 is a signal timing diagram depicting the signal states when a bus becomes inactive after an STRB0,1.

FIG. 38 and FIG. 39 depict the signal states when a bus becomes inactive after an IOSTRB or STRB0,1, respectively. The strobes (STRB0, STRB1, IOSTRB, and R/W) are deasserted going to a high level. The address bus preserves the last value and the ready signal (RDY) is ignored.

3. Principles of Application

The preferred embodiment's enhanced memory interface design can be used to implement a wide variety of system configurations without additional logic. Its external bus provides a parallel 8, 16 or 32-bit interface to external memories and peripherals. By judiciously grouping data type sizes of equal length into a particular memory strobe section, the preferred embodiment can mix two data type sizes with zero wait-state accesses. This section describes examples that exploit these techniques to achieve maximum performance and to minimize memory storage.

Maximum Performance

Figure 40:
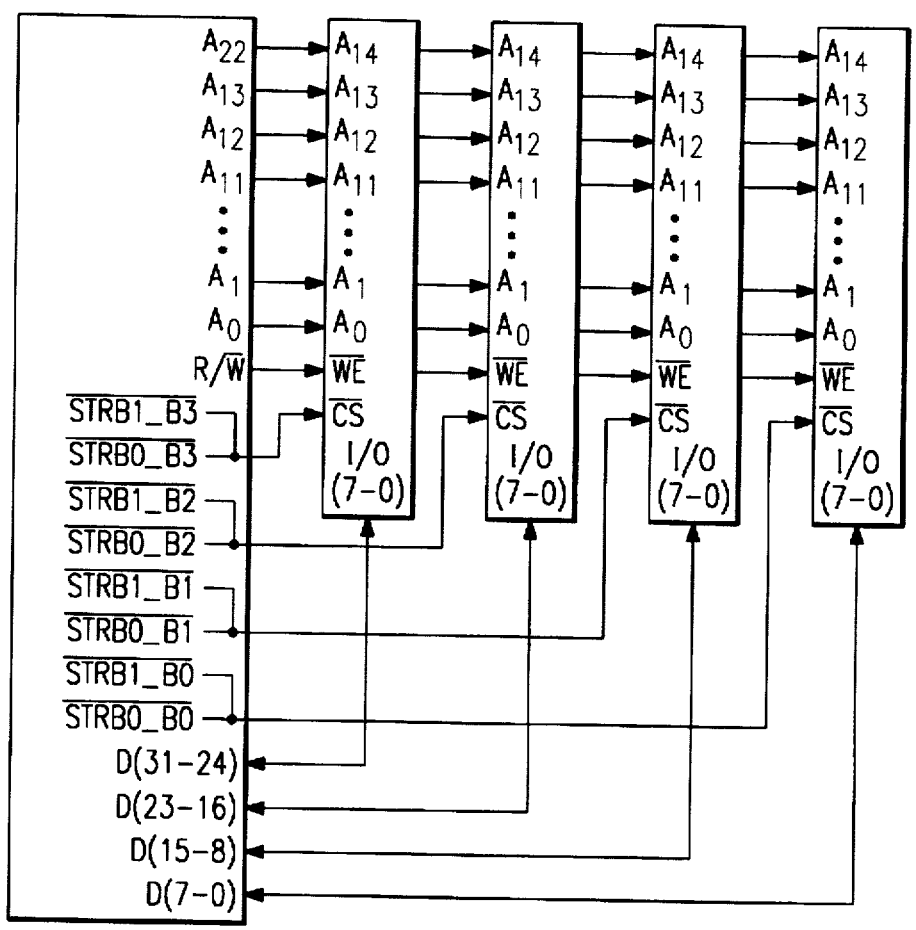
FIG. 40 is a block diagram depicting a configuration of the preferred embodiment with external memory.

The preferred embodiment will operate at its maximum performance when executing code from 32 bit wide memory. The rest of the memory can be utilized to store two different data type sizes. For example, a typical audio compression application written in C language will require a 32 bit data for system stack and 16 bit data for the audio buffers. In this case the programmer must interface the preferred embodiment as shown in FIG. 40. This examples assumes a 32 K of 32-bit words external memory that contains 8 K of 32-bit words of stack, 8 K of 32-bit words of program, and 32 K of 16-bit words data buffers. This interface requires the programmer to set the STRB0 Control Register Physical Memory Width to 32 bits, Data Type Size to 32 bits, and set the STRB Config bit field to 1(STBR0 Control Register=002F0000h). It also requires the programmer to set the STRB1 Control Register Physical Memory Width to 32 bits and the Data Type Size to 16 bits (STBR1 Control Register=000D0000h). Moreover, the PRGW pin must be pulled low to indicate 32 bit program memory width. In essence, this example combines Case 3: 32-bit Wide Memory with 32-bit Data Type Size and Case 2: 32-bit Wide Memory with 16-bit Data Type Size discussed hereinabove.

Note that the external memory address pins, $A_{14}A_{13} \ldots A_1A_0$, are mapped to the preferred embodiment's $A_{22}A_{13}A_{12} \ldots A_1A_0$. This mapping was chosen to place the system stack following the preferred embodiment's internal RAM, thus improving performance by placing the top of the stack in internal RAM and allowing it to grow into external RAM. With this mapping, external memory accesses in the range 4000h through 7FFFh will read or write 16 bit data while memory accesses in the range 0h through 3FFFh reads or writes 32 bit data. The PRGW pin controls the program fetches.

Figure 41:
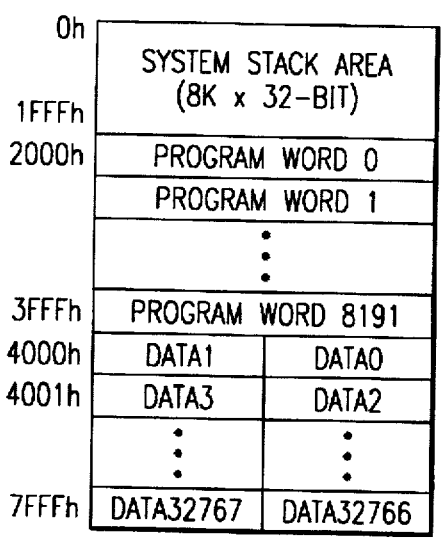
FIG. 41 is a diagram showing the contents of external memory in one memory configuration.
Figure 42:
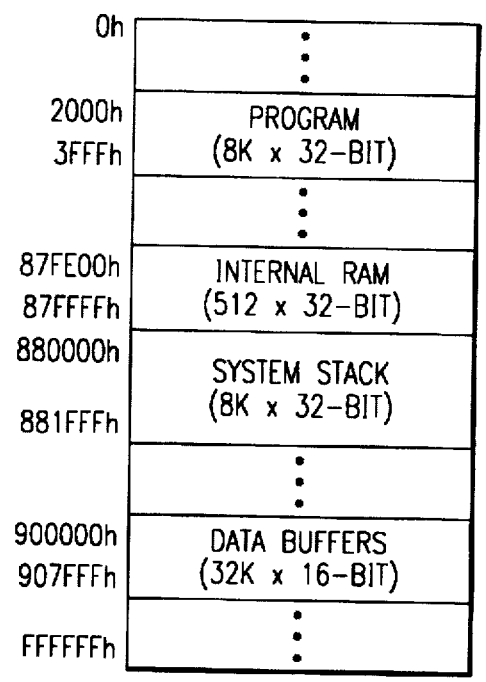
FIG. 42 is a diagram depicting the memory map of the memory depicted in FIG. 41, illustrating the shift occasion by the operation of the preferred embodiment.

FIG. 41 shows the contents of the external memory. Due to the address shift of the preferred embodiment's external memory interface, the memory map seen by the preferred embodiment's CPU is slightly different. FIG. 42 depicts this memory map. Note that since the STRB1 is configured for 16 bit data type size, the external address presented on preferred embodiment's pins is shifted right by one bit.

Minimum Memory

Figure 43:
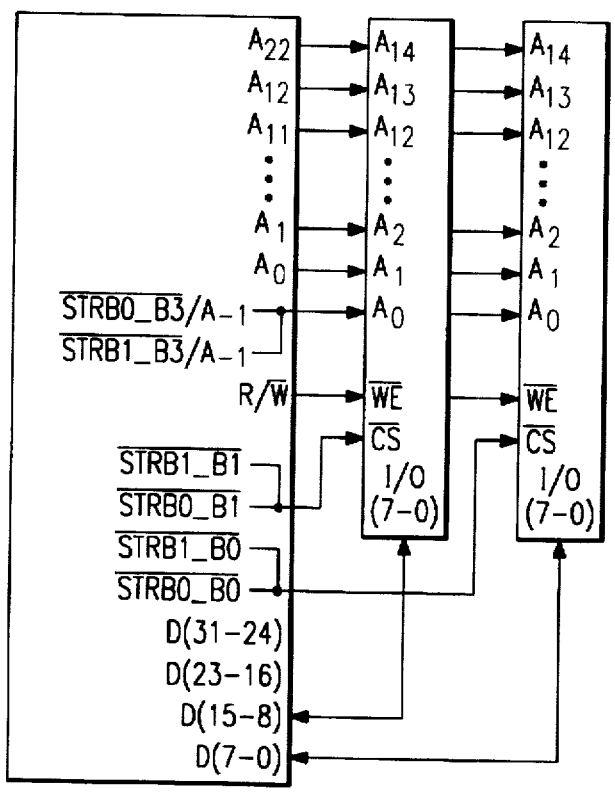
FIG. 43 is a block diagram showing another configuration of preferred embodiment with external memory.

To minimize system cost, the preferred embodiment can trade the amount of external memory chips with lower performance by utilizing a zero wait-state 16 bit wide external memory. In this configuration, external program accesses and 32 bit data type accesses have an additional wait-state, while memory chip count is halved. FIG. 43 shows this configuration.

In this figure, a 32 K of 16-bit words external memory that contains 4 K of 32-bit words of stack, 4 K of 32-bit words of program, and 16 K of 16-bit words data buffers and tables. For this example, the programmer must set the STRB0 Control Register Physical Memory Width to 16 bits, Data Type Size to 32 bits, and set the STRB Config bit field to 1 (STRB0 Control Register=00270000h). It also requires the programmer to set the STRB1 Control Register Physical Memory Width to 16 bits and the Data Type Size to 16 bits (STRB1 Control Register=00050000h). Furthermore, the PRGW pin must be pulled high to indicate 16 bit program memory width. In essence, this example combines Case 5: 16-bit Wide Memory with 16-bit Data Type Size and Case 6: 16-bit Wide Memory with 32-bit Data Type Size discussed hereinabove.

Figures 44, 45, 46:
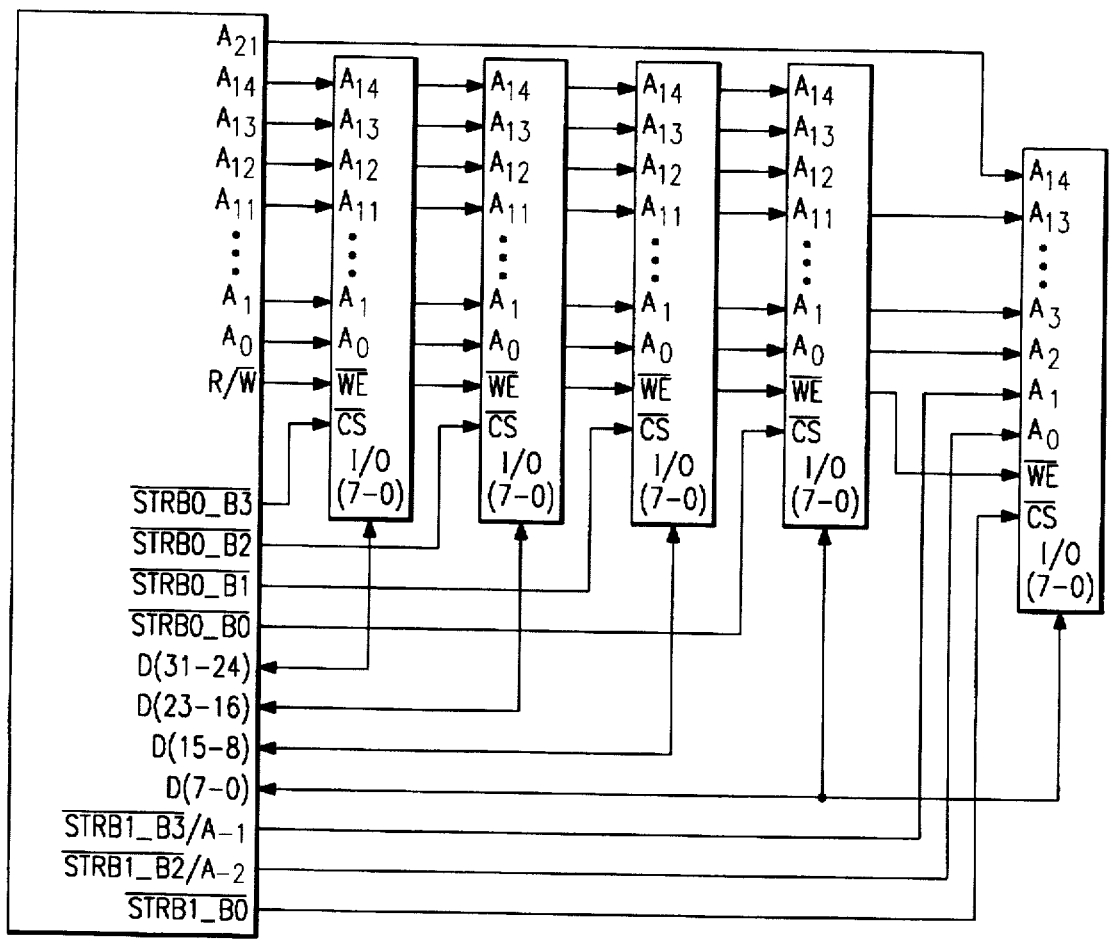
FIG. 44 shows the contents of external memory in another configuration.
FIG. 45 is a diagram illustrating a memory map for memory having the configuration shown in FIG. 44.
FIG. 46 is a block diagram showing a Final configuration of the preferred embodiment with external memory.

As described in the previous section, this example maps the system stack contiguous with the preferred embodiment's internal RAM. To achieve this, the external memory address pins, $A_{14}A_{13} \ldots A_1A_0$, are mapped to the preferred embodiment's $A_{22}A_{12} \ldots A_1A_0A_1$. FIG. 44 shows how the contents of the external memory. Due to the address shift of the preferred embodiment's external memory interface, the memory map seen by the preferred embodiment's CPU is shown in FIG. 45. Note that since STRB1 is configured for 16 bit data type size, the external address presented on the preferred embodiment's pins is shifted right by one bit. Since STRB0 is configured for 32 bit data size, the STRB0__B3/A$_{-1}$ pin is used to decode the low and high bytes of the word. With this mapping, external memory accesses in the range 4000h through 7FFFh will read or write 16 bit data while memory accesses in the range 0h through 3FFFh performs two consecutive reads or writes to retrieve or store 32 bit data. The PRGW pin controls the program fetches.

Two External Memory Banks

The preferred embodiment's external memory interface allows the use of two zero wait state external memory banks with different widths without incurring in any access penalty and additional logic. This allows the programmer the flexibility in trading off performance versus system cost (amount of memory chips). For instance, the programmer could execute code from 32 bit wide memory while storing data in 8-bit memory, as shown in FIG. 46. This would be an advantage to applications with large amounts of 8 bit data that require execution at the fastest speed of the device.

In this example, a band of 32 K by 32 bit is mapped to STRB0 while a bank of 32 K by 8 bit is mapped to STRB1. For this configuration, the programmer must set the STRB0 Control Register Physical Memory Width to 32 bits, Data Type Size to 32 bits, and the STRB Config bit field to zero since the banks are separate memories (STRB0 Control Register=000F0000h). Also, the programmer must set the STRB1 Control Register Physical Memory Width to 8 bits and the Data Type Size to 8 bits (STRB1 Control Register= 00000000h).

This example maps the external memory address pins of the 32 bit wide bank, $A_{14}A_{13} \ldots A_1A_0$, to the preferred embodiment's $A_{14}A_{13}A_{12} \ldots A_1A_0$. On the other hand, the 8 bit wide bank memory address pins, $A_{14}A_{13} \ldots A_1A_0$, are mapped to the preferred embodiment's $A_{21}A_{13}A_{12} \ldots A_1A_0A_1$. Note that since STRB1 is configured for 8 bit memory width, the external address presented on the preferred embodiment's pins is shifted right by two bits. With this mapping, external memory accesses in the range 0h through 7FFFh read/write 32 bit data to the 32 bit wide bank (STRB0) while memory accesses in the range 900000h through 907FFFh read/write 8 bit data to the 8 bit wide bank (STRB1).

Note that two banks of different memory widths should not be connected to the same STRB without external decode logic. Different memory widths require STRBX_BX signals to be configured as address pins. These address pins are active for any external memory access (STRB0, STRB1, IOSTRB, and program fetches).

4. Details of Construction

Having thus described one particular embodiment of the invention, various alterations, modifications and improvements will readily occur to those skilled in the art. Such alterations, modifications and improvements as are made obvious by this disclosure are intended to be part of this description though not expressly stated herein, and are intended to be within the spirit and scope of the invention. Accordingly, the foregoing description is by way of example only, and not limiting. The invention is limited only as defined in the following claims and equivalents thereto.

Figure 47:
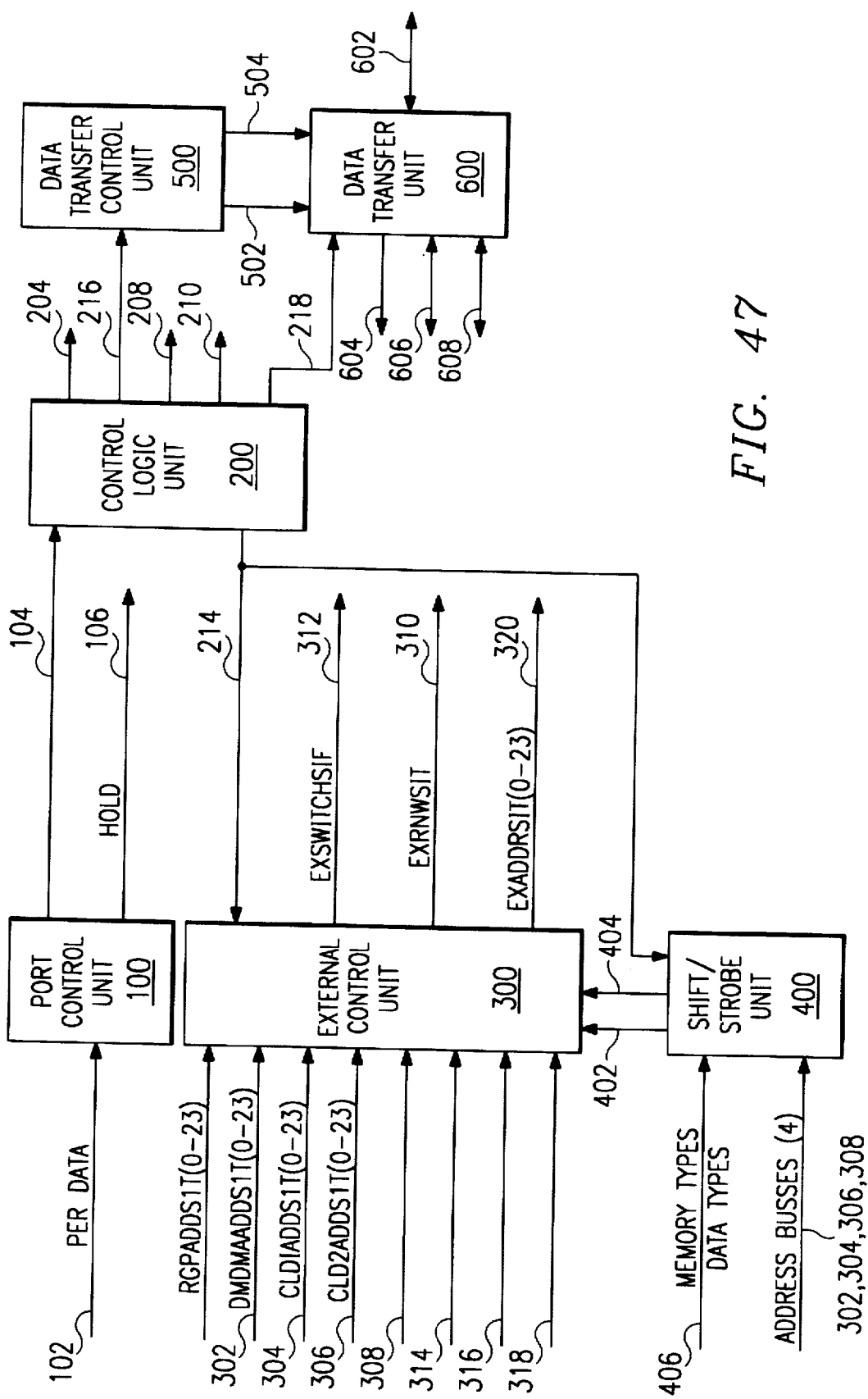
FIG. 47 is a block diagram of the structure of the preferred embodiment.

FIG. 47 shows a block diagram of the preferred embodiment. As an initial matter, numerous signal lines are described in the following discussion, as the description hereinbelow is comprehensive. It should be noted that certain conventions have been adopted in conjunction with the labeling of these signal lines. "SIGN" signifies sign extend form of data representation. S0 and S1 signify STROBE 0 and STROBE 1, respectively. "ADD" signifies "address". DATA signifies data. SY signifies that the signals originate from the system, that is, from the microprocessor. "PER" signifies peripheral bus, as this embodiment is utilized in conjunction with a microprocessor having an additional internal bus for peripherals such as timers, serial port and the like. MTYPE and DTYPE signify memory type and data type, respectively. RNW signifies read/not write. Finally, as is conventional, a line over a signal label signifies the inverse of that signal.

Returning now to FIG. 47, the preferred embodiment is comprised of the following major functional units: a Port Control Unit 100, a Control Logic Unit 200, an External Control Unit 300, a Shift/Strobe Unit 400, a Data Transfer Control Unit 500 and a Data Transfer Unit 600.

The above-described IOSTRB, STRB0 and STRB1 control registers are contained in the Port Control Unit 100. They are loaded from an internal data bus 102, such as a peripheral data bus PER DATA, as shown. Signals representing Sign, Memory Type 0, Memory Type 1, Data Type 0, Data Type 1 and Software Wait State (0–2) are provided to the Control Logic Unit 200 on signal lines 104. In addition, Port Control Unit 100 contains logic, described in detail below, that generates a HOLD signal that is used in conjunction with the tri-stating of the I/O buffers, provided on output signal line 106.

The Control Logic Unit 200 receives the aforementioned signals on lines 104. It generates, in a Strobe Control Logic portion 202 the above-described strobe signals, namely STRB0__B0F through STRB0__B3F, STRB1__B0F through STRB1__B$_3$F and IOSTRB, which are provided on output lines 204. Unit 200 also generates signals TRIPADS, EXDATAOUT, EXDATAIN, RNWPAD, H1ADDRESS and H3ADDRESS, which control the timing and direction of data and address pads and are provided on signal lines 208. Unit 200 generates a ready signal, RDY, provided on signal line 210. Unit 200 generates selection signals, provided on signal lines 214, that identify the kind of operation the current operation is, as will be described in more detail below. Finally, additional control signals, described in more detail below, are generated by Control Logic Unit 200 that are provided on lines 216 and 218 for use by the Data Transfer Control Unit 500 and Data Transfer Unit 600, respectively.

The preferred embodiment is designed for use with a microprocessor having, internally, a separate program memory bus, a DMA bus and two data memory busses. It will be appreciated that this is but one of many internal bus arrangements that can be accommodated by the provision of a programmable memory interface in accordance with the present invention. The External Control Unit 300 receives as inputs on lines 302, 304, 306 and 308, the four address busses RGPADDS1T(0–23), DMDMAADDS1T(0–23), CLD1ADDS1T(0–23) and CLD2ADDS1T(0–23), respectively. These are the internal address busses for, respectively, the program memory address, DMA address, Data 1 memory address and Data 2 memory address. The External Control Unit 300 selects the appropriate one of these busses under control of the selection signals on signal lines 214, performs the appropriate shifting, if any, of the address lines in accordance with the principals described hereinabove, under control of the signals on lines 402 and 404 from Shift/Strobe Unit 400, and passes the resulting address signals, EXADDRS1T(0–23), out on lines 320. The External Control Unit 300 also compares the current address with the previous address to determine whether a memory bank switch is occurring, and provides signal EXSWITCHS1F on signal line 312 if it is. This is used by other logic, described below, to generate a one cycle wait state to accommodate delays associated with such a bank switch that occur externally to the microprocessor chip. Finally, read/write control signals associated with the four busses described above are provided as inputs on signal lines 314, 316 and 318. DMRNWS1T (the R/W signal for the DMA data bus) being provided on line 314, CLRWD1S1T (the R/W signal for the Data 1 bus) being provided on line 316 and CLRWD2S1T (the R/W signal for the Data 2 bus) being provided on line 318. Note that no R/W signal is provided for the program data bus, as program data is always read only in the microprocessor arrangement for which the preferred embodiment was designed. Thus, a read signal is always selected for program data transactions, which is provided by hard wiring, as is described in more detail hereinbelow. The selected R/W signal is provided as an output on signal line 320.

The aforementioned control signals on lines 402 and 404 are generated in the Shift/Strobe unit 400 in response to the signals from Port Control Unit 100 informing as to memory types and data types, as well as to the aforementioned four internal address busses and the selection signals on lines 214.

The Data Transfer Control Unit 500 generates, in response to the aforementioned control signals on lines 216, two further sets of control signals, called the "A" signals and the "S" signals, that are applied to the Data Transfer Unit 600 on lines 502 and 504, respectively. These signals on lines 502 and 504 are used by the Data Transfer Unit 600 to effect external/internal data signal line re-routing as appropriate to accommodate the transfer operation being performed, between the external bus lines 602 and the internal data bus lines, namely the program data bus lines 604, the DMA data bus lines 606 and the Data 1 and Data 2 bus lines 608. This re-routing can be understood by reference to FIG. 47A.

Figures 47A, 47B:
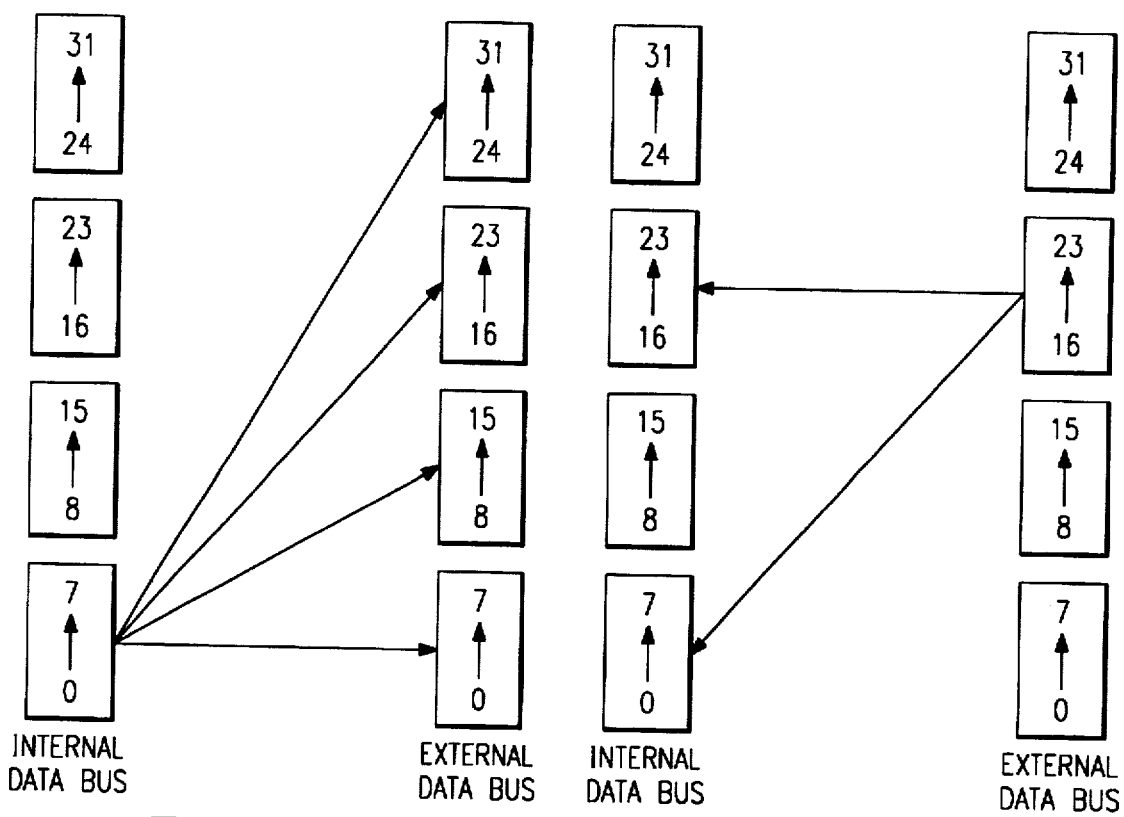
FIG. 47A is a first diagram illustrating signal rerouting performed by the data transfer unit 600 of FIG. 47.
FIG. 47B is a second diagram illustrating signal rerouting performed by the data transfer unit 600 of FIG. 47.

FIGS. 47A and 47B show representations of the four eight bit portions of the internal data bus, on the left of the diagram, and of the external data bus, on the right of the diagram. Bit positions increase in number from bottom to top. The box on the bottom left of the diagram, for example, represents the bit positions 0 through 7 of the internal data bus. It will be appreciated that in any given transfer cycle, data may be coming into or going out of the microprocessor, and that the data may be in portions of eight, sixteen or thirty-two bits. Those skilled in the art will appreciate that to properly route data for appropriate utilization by the microprocessor, or, alternatively, for appropriate storage in memory, it is necessary to be able to route any given portion of eight bits, wherever it appears on one bus (internal or external) to the corresponding position of that portion on the other bus, as well as one or more other positions for eight bits on the other bus. FIG. 47A shows the paths for routing the lowest eight order bits of the internal data bus to all four of the eight bit positions on the external bus, while FIG. 47B shows the paths for routing bits 16–23 of the external bus to two of the eight bit positions on the internal bus, to show but two examples. The Data Transfer Unit 600 performs this re-routing under control of the signals on lines 502 and 504, as will be described in more detail below.

Figure 48:
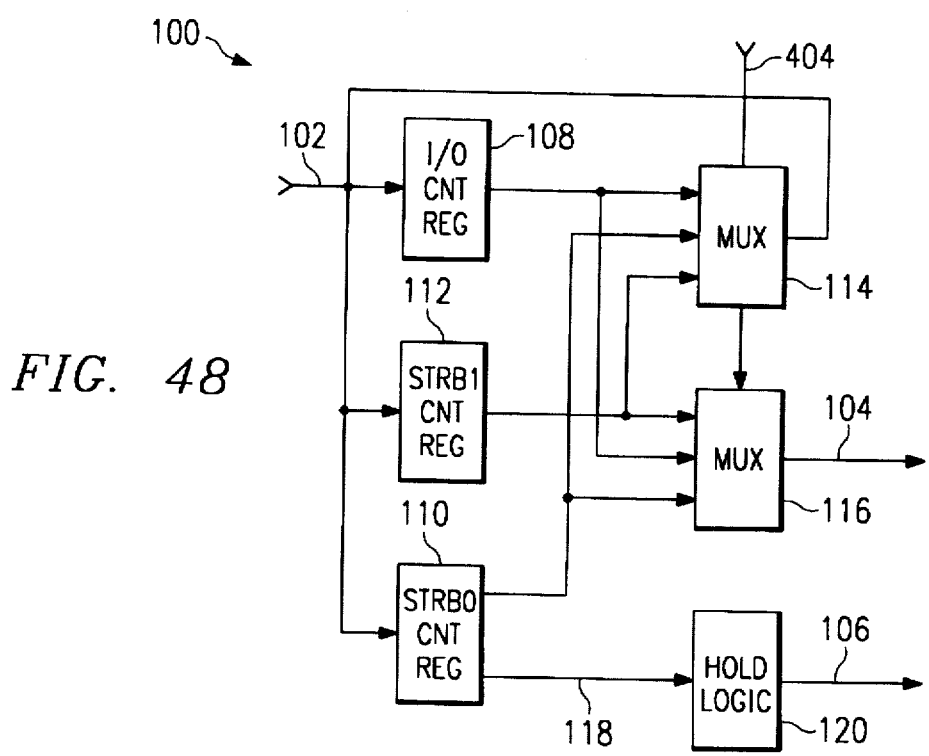
FIG. 48 is block diagram of the port control unit 100 of FIG. 47.

Turning now to FIG. 48, there is shown a block diagram of the Port Control Unit 100. The above-described IOSTRB, STRB0 and STRB1 registers, 108, 110 and 112, respectively, can be seen, each having as an input thereto lines 102, the PER DATA bus. The output of each register is applied as one of three inputs to both of two multiplexers, 114 and 116, as shown. These MUXs select among these inputs under control of the signals on lines 404, which are, as described above, STRB0, STRB1 and IOSTRB. MUX 116 directs the output to lines 104, which transmit the output to Control Logic Unit 200 (FIG. 47), while MUX 114 directs the output to lines 102 to enable a read operation of registers 108, 110 and 112 on the PER DATA bus 102. The lowest order bit position of register 110 is also provided on line 118, is utilized in conjunction with the generation of the HOLD signal in Hold Logic 120, as is described in more detail below, and the resultant HOLD signal is provided on line 106.

Figure 49:
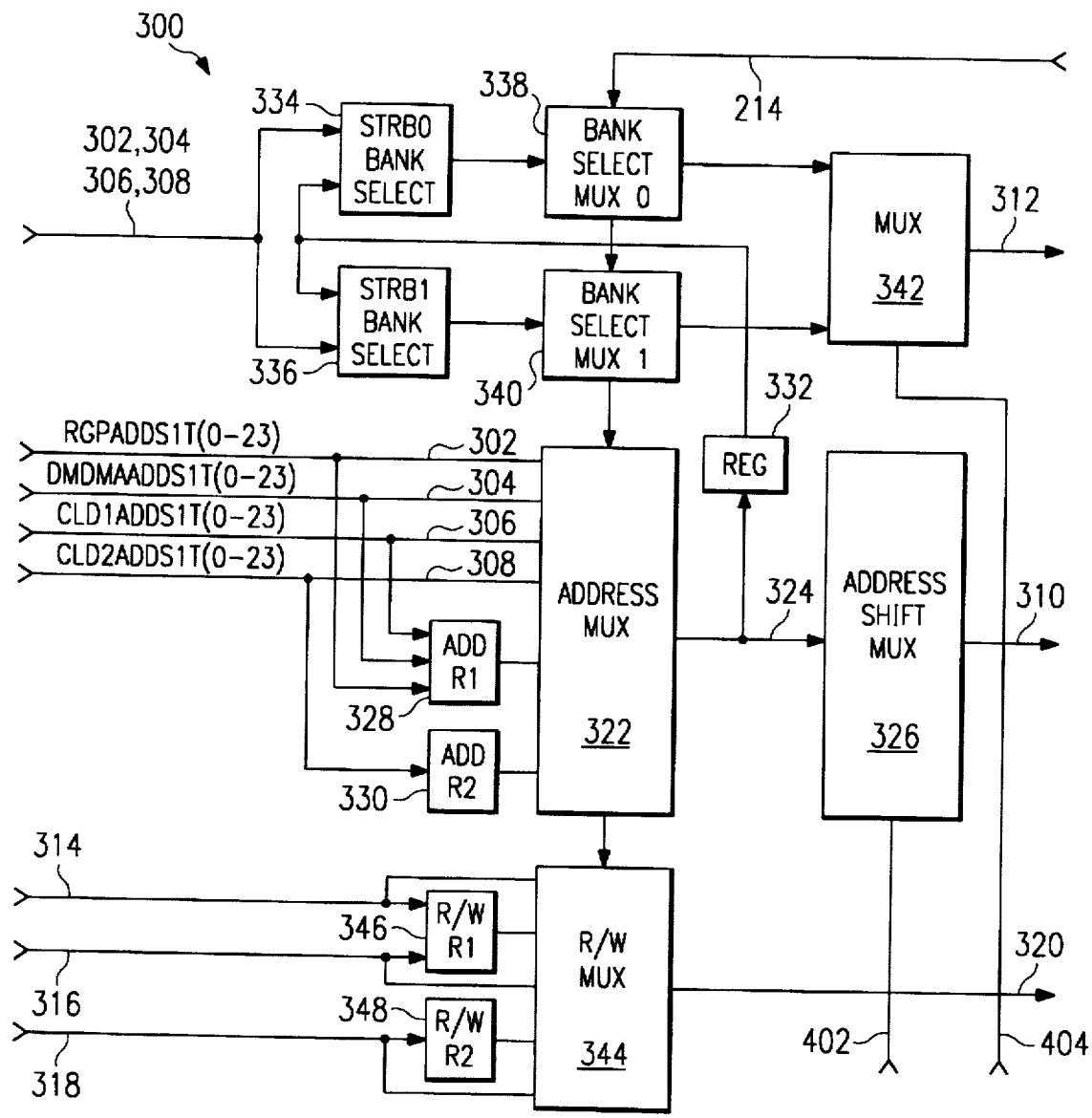
FIG. 49 is a block diagram of the external control unit 300 of FIG. 47.

FIG. 49 shows a block diagram of the External Control Unit 300 of FIG. 47. As an initial matter, the internal arrangement of Unit 300, as with other units described herein, implements a technique often referred to as Bank Select, which is used in order to accommodate the tight timing requirements of modern technologies. In this technique, where logic selects among two or more signals, or sets of signals, generated in intermediate logical operations, conditional intermediate logical operations are performed on all of the sets of signals at the beginning of the cycle to generate a set of intermediate signals, with the selection of the correct signals from the intermediate signals thus generated being performed using a multiplexer controlled by a control signal, generated more or less in parallel with the generation of these intermediate signals, that represents the selection choice determined for the operation. This is a known technique that assures that the signals are generated within the short time of a single cycle.

Returning now to FIG. 49, the four address busses RGPADDSIT(0–23), DMDMAADDSIT(0–23), CLD1ADDSIT(0–23) and CLD2ADDSIT(0–23), mentioned above, can be seen provided on lines 302, 304, 306 and 308, respectively. These lines are provided as inputs of an Address MUX 322 which, under control of the selection signals on lines 214, selects among them in a Bank Select operation. The output of MUX 322 is provided on line 324 as an input to an Address Shift MUX 326.

Note also that two registers, ADD R1 register 328 and ADD R2 register 330, are provided to receive lines 302, 304, 306 and 308, to accommodate two multicycle memory access.

The selected address on lines 324 is, as mentioned above, provided as an input to the Address Shift MUX, which performs the appropriate shift, if any, of the address in accordance with the principles described hereinabove, under control of the signals on line 402. The resultant set of address signals, labeled EXADDRS1T(0–23), is provided as an output on lines 310.

The selected address on lines 324 is also stored in register 332, where it is available for a comparison operation performed in two units, the STRB0 Bank Select Unit 334 and the STRB1 Bank Select Unit 336. This comparison operation is to determine if the current operation requires a Bank Switch, that is, if the current operation involves a memory operation in a memory bank different from that in which the previous operation was performed. Thus, again using a Bank Select technique, the address in register 332 is compared against all of the addresses, provided to Bank Select Units 335 and 336, as shown, for intermediate result generation for the possibilities that Strobe 0 or Strobe 1 will be used in the present operation. The results are provided to, respectively, a Bank Select MUX 0 and a Bank Select MUX 1, blocks 338 and 340, respectively, as shown, where selection based on the selection signals on lines 214 is performed. The outputs of MUXs 338 and 340 are provided to the inputs of a further MUX 342 where final selection of the signal is done under control of the strobe select signal on lines 404. The finally selected signal, EXSWITCHS1P, is provided on output line 312.

Finally, in another Bank Select operation, the read/write signals on lines 314, 316 and 318, described above in connection with FIG. 47, are provided to R/W MUX 344 and to Multiple Memory Access registers R/W R1 346 and R/W R2 348, as shown, for selection under control of the selection signals on lines 214. The resultant signal is provided as an output on line 320.

Figure 50:
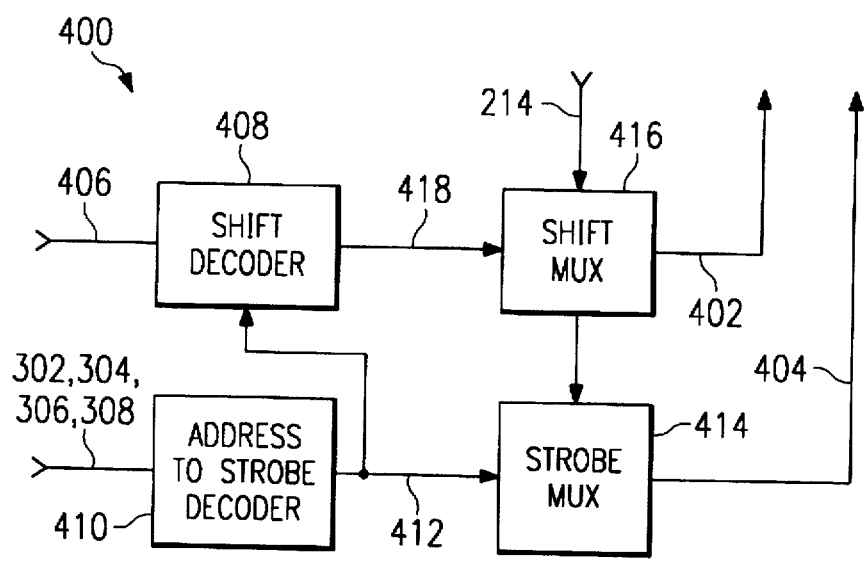
FIG. 50 is a block diagram of the shift/strobe unit 400 of FIG. 47.

FIG. 50 shows a block diagram of the Shift/Strobe Unit 400, which also is constructed on Bank Select principles. As mentioned hereinabove, the Memory Types and Data Types signals, extracted from lines 104 (FIG. 48), are provided as inputs on lines 406 to a Shift Decoder 408. In addition, the four address busses 302, 304, 306 and 308 are provided as inputs to an Address to Strobe Decoder 410 which decodes each of these addresses to determine, intermediately for each bus, the strobe signal active in the current operation. These signals are provided as an output on line 412, by which they are provided as inputs to the Shift Decoder 408 and to a Strobe MUX 414. The Strobe MUX 414 selects the appropriate strobe signal under control of the selection signals on lines 214, as shown, and provides the selected signal, STRB0, STRB1 or IOSTRB, as an output on signal lines 404. The Shift Decoder 408 determines the shift, if any, to be provided to the address, for each of the four address busses, based on the current address and on the intermediately determined strobe signal, and provides the intermediately determined shift control signal, SHIFT 0, SHIFT 1 or SHIFT 2, for all possible bus selections, to Shift MUX 416 on line 418. Shift MUX 416 selects the appropriate shift control signal under control of the selection signals on lines 214, and provides the selected signal as an output on lines 402, as shown.

Figure 51:
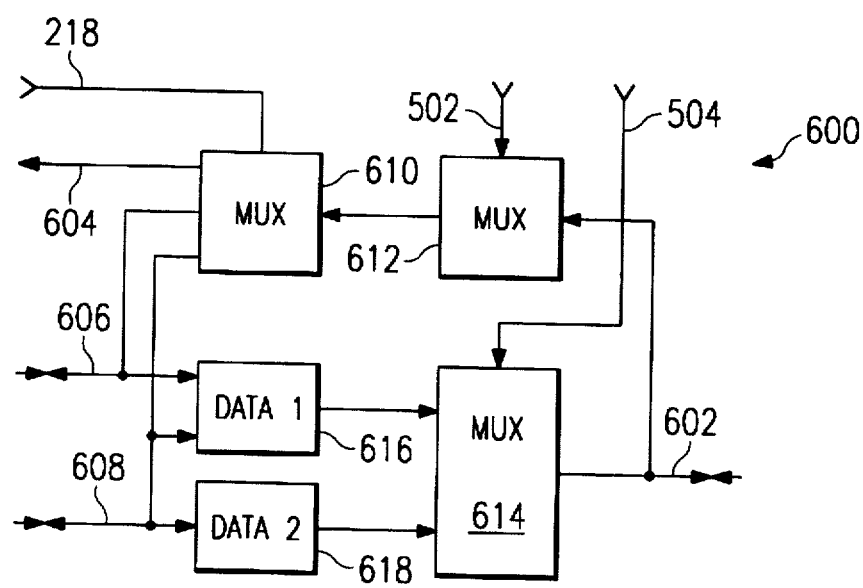
FIG. 51 is a block diagram of the data transfer unit 600 of FIG. 47.

FIG. 51 is a block diagram of the Data Transfer Unit 600. The general function of this unit is described above in connection with FIG. 47 and FIG. 47A. The above-described re-routing is performed by MUXs 610, 612 and 614, MUX 610 being controlled by the control signals on lines 218, MUX 612 being controlled by the control signals on lines 502 and MUX 614 being controlled by the control signals on lines 504. Recall that lines 608 comprise multiplexed internal Data 1 and Data 2 busses, SYDDS0T(0–31), lines 606 comprise the DMA internal data bus SYDMAS3T(0–31), while lines 604 comprise internal program data bus SYPDSOT(0–31). Lines 602 comprise the external data bus EXDATAS3T(0–31). DATA 1 register 616 and DATA 2 register 618 latch data to be stored into external memory. Two registers are needed, since two stores can be in queue at the same time.

FIGS. 52 through 58 are detailed circuit diagrams of the functional blocks 100, 200, 300, 400, 500 and 600 described above, provided for thoroughness of disclosure. Detailed discussion of each interconnection is omitted in the interest of clarity, as the components and connections are, clearly, numerous. All of the concepts and principles necessary to practice the invention have already been described hereinabove. Nonetheless, the full details of the preferred embodiment are considered instructional for those of skill in the art, who would benefit from the techniques revealed by the study of these circuit diagrams. Terminology conventions utilized in these diagrams additional to those described hereinabove are now presented. DDTYPE1 and DDTYPE1 signify Data Type 0 and Data Type 1, respectively, after the strobe is resolved. Similarly, DMTYPE 0 and DMTYPE 1 signify Memory Type 0 and Memory Type 1, after the strobe is resolved. INTB signifies an integer operation. INTMULT signifies an integer operation wherein the timing is one pipeline stage later than INTB. FP signifies a floating point operation. Four cycles are signified, Cycles 0–3, as there are up to four cycles for, e.g., a thirty-two bit fetch from an eight bit memory. SIGN signifies perform Sign Extend of data (bit 20 of the Configuration Register). As mentioned above, RDY signifies a ready signal. RDYALL signifies that a complete multicycle operation is finished. WTCNT0-2 corresponds to bits WTCNT5-7 in the STRBn Control Register. CL signifies that a signal is from microprocessor control logic.

The various blocks described above in connection with FIGS. 48 through 51 are identified in FIGS. 52 through 58 by dashed lines surrounding the circuitry comprising the blocks, with the same reference numerals being used to identify the solid blocks as are used to identify the corresponding dashed blocks.

Figure 52A:
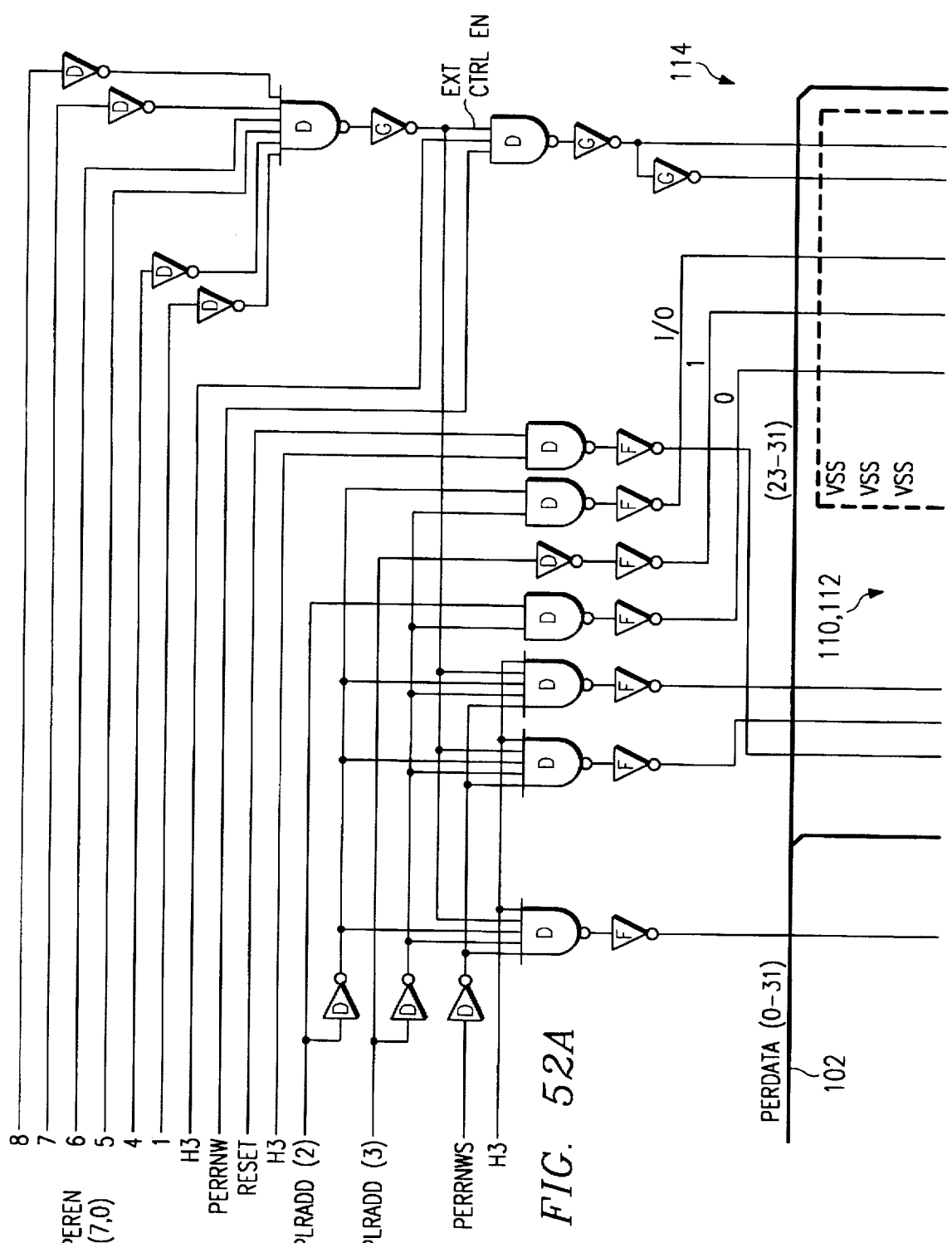
FIG. 52 is a detailed circuit diagram of the circuit shown in FIG. 48.
Figure 52:
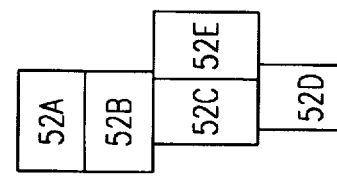
Figure 52B:
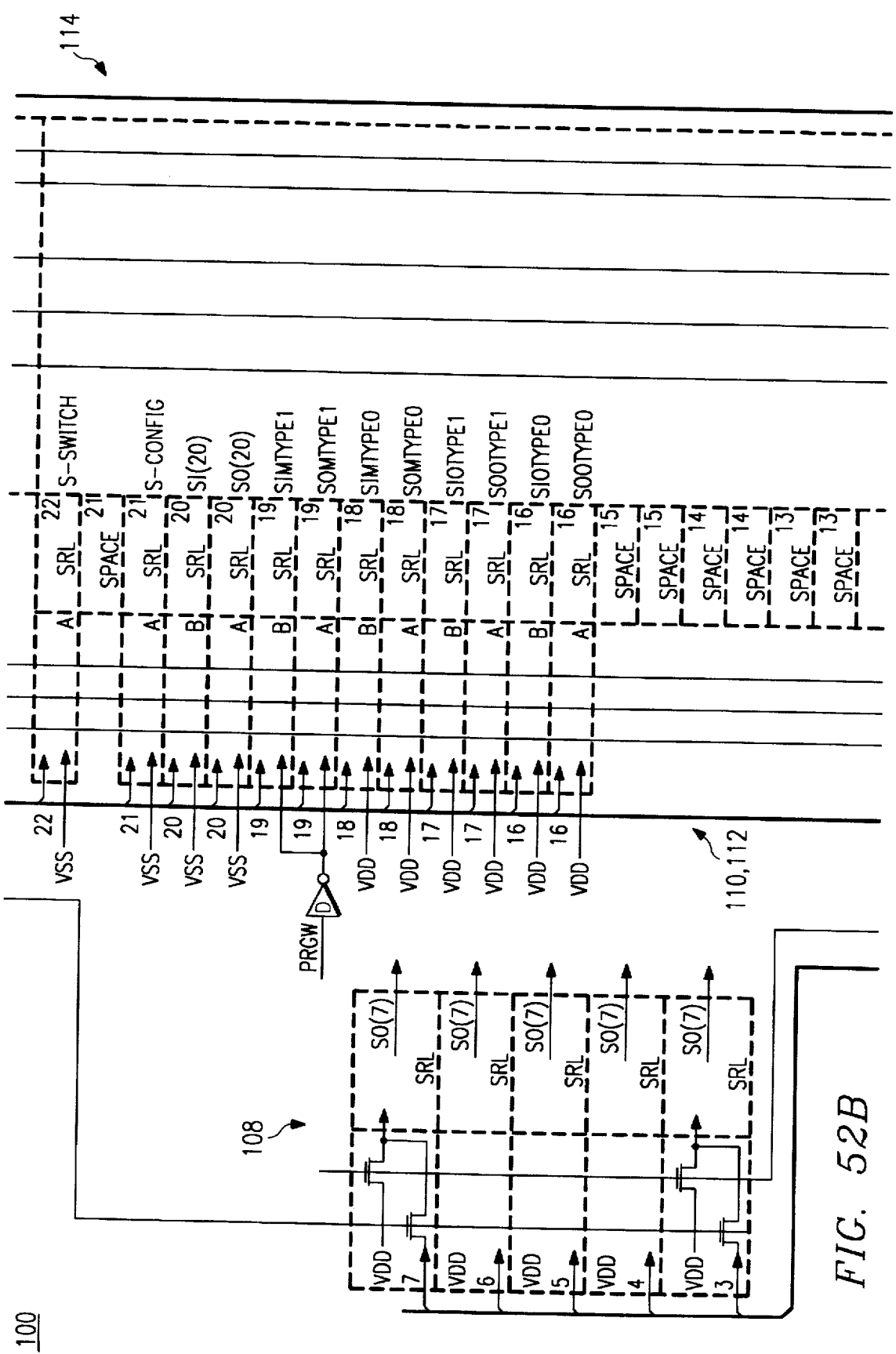
Figure 52C:
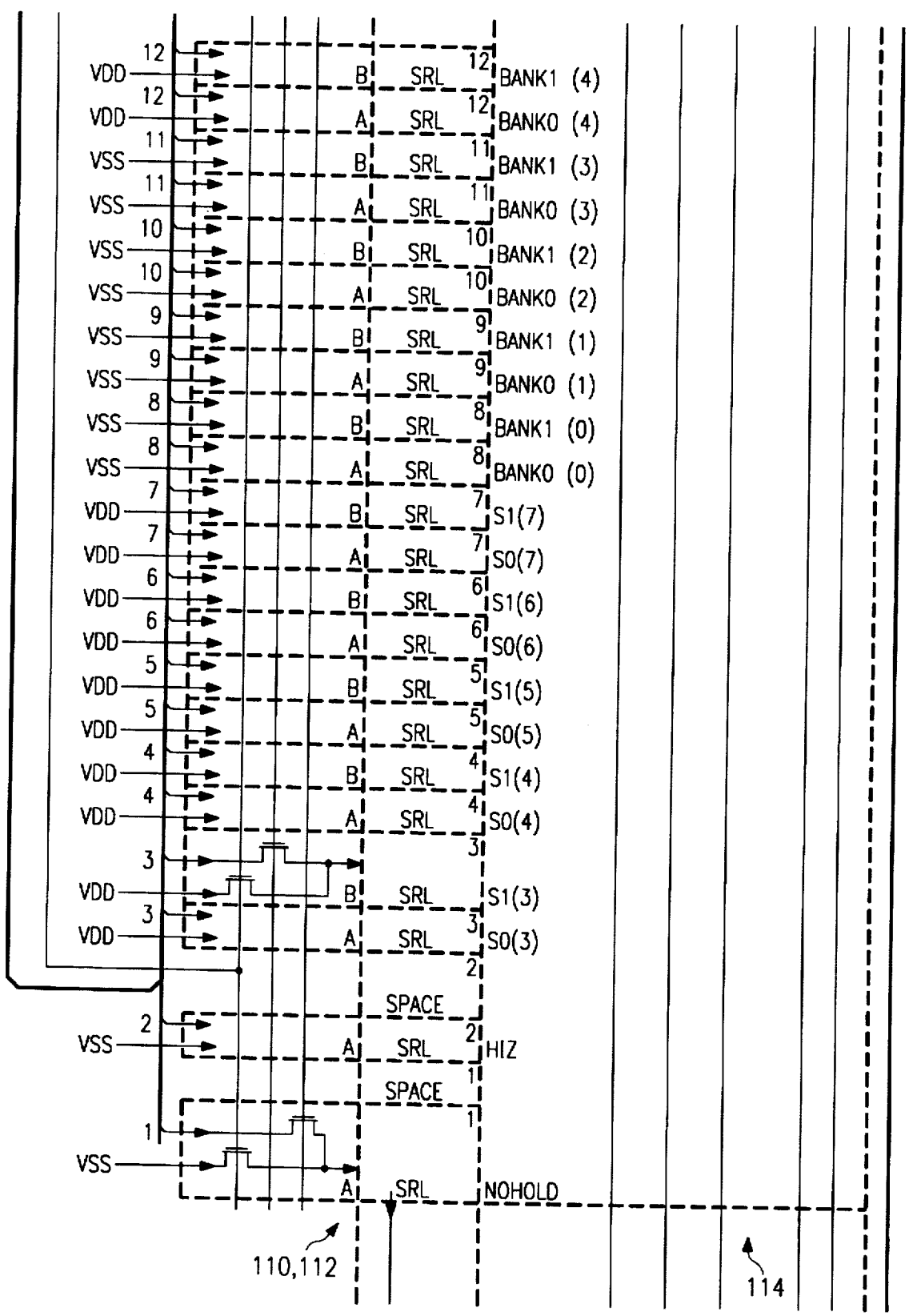
Figure 52D:
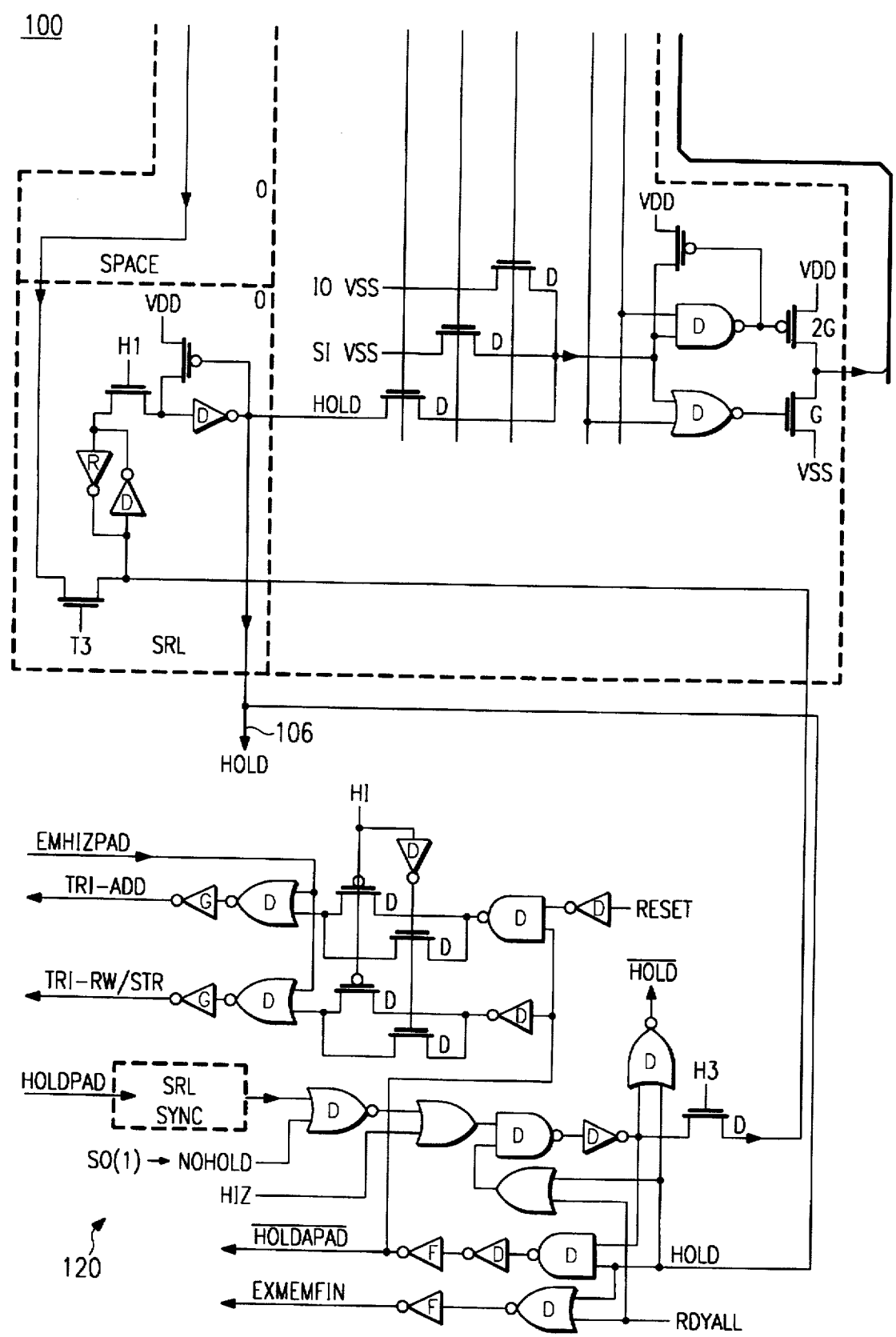
Figure 52E:
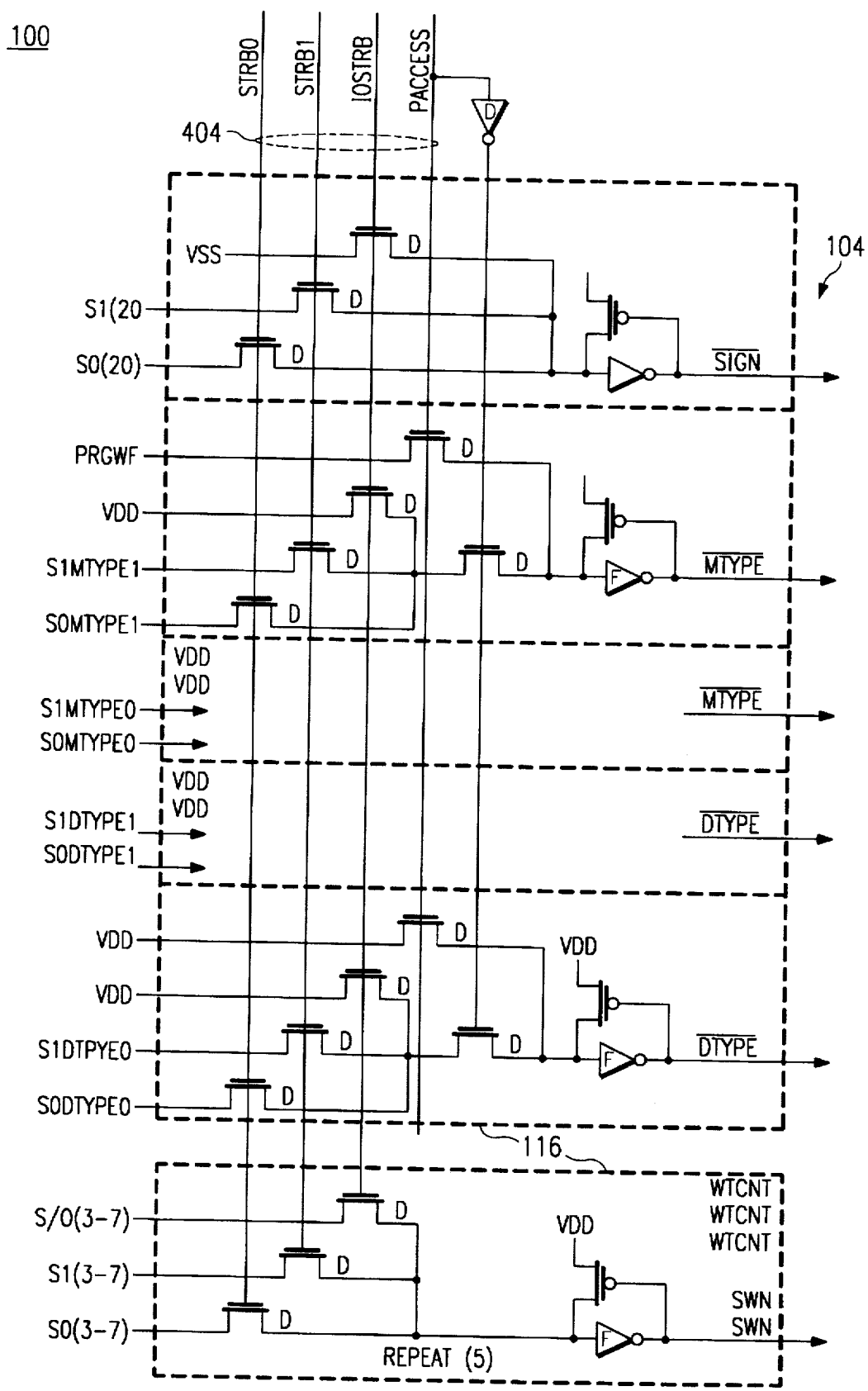
Figure 53A:
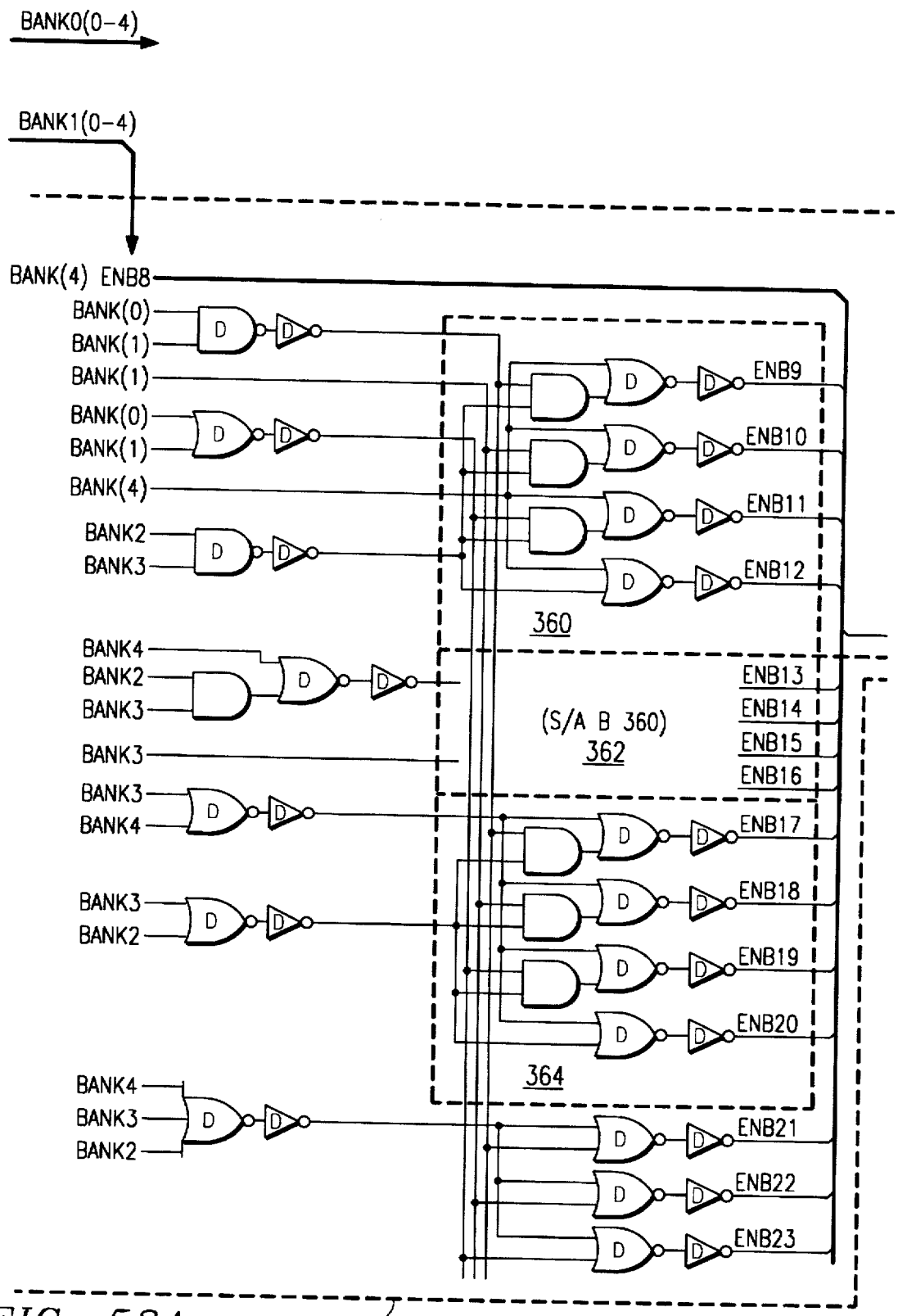
FIG. 53 is a detailed circuit diagram of the circuit shown in FIG. 49.
Figure 53B:
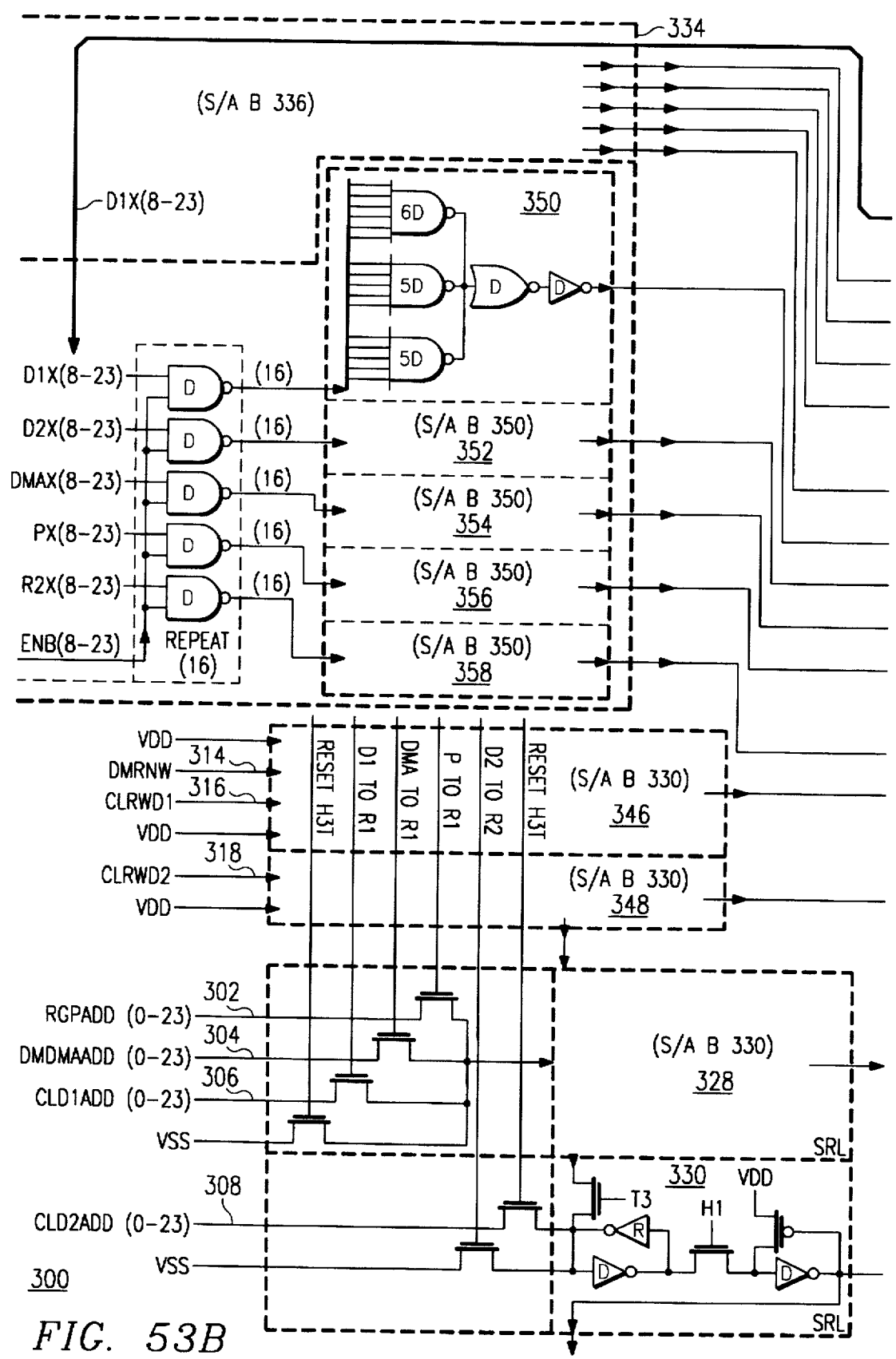
Figure 53C:
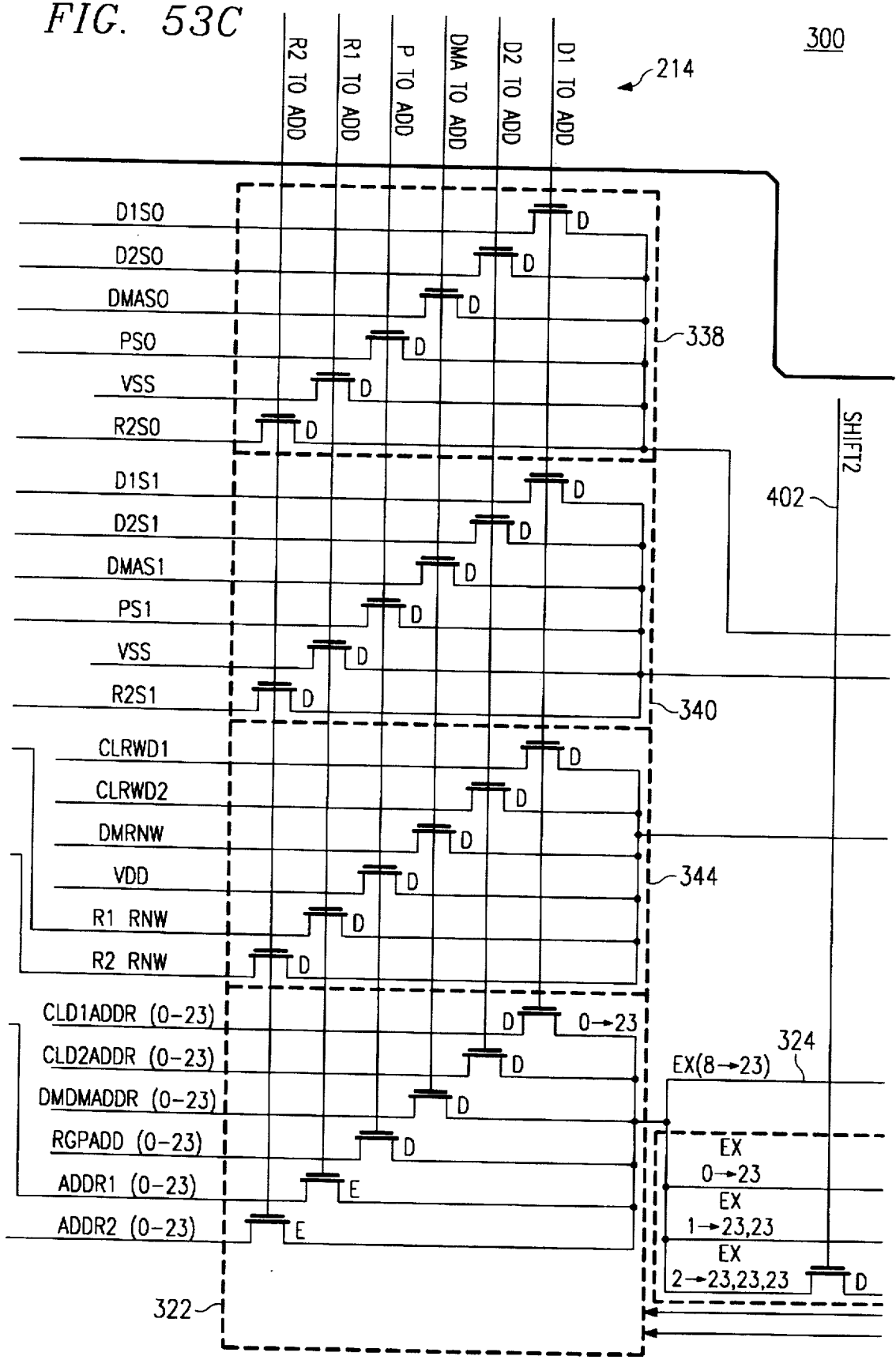
Figure 53:
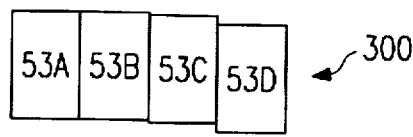
Figure 53D:
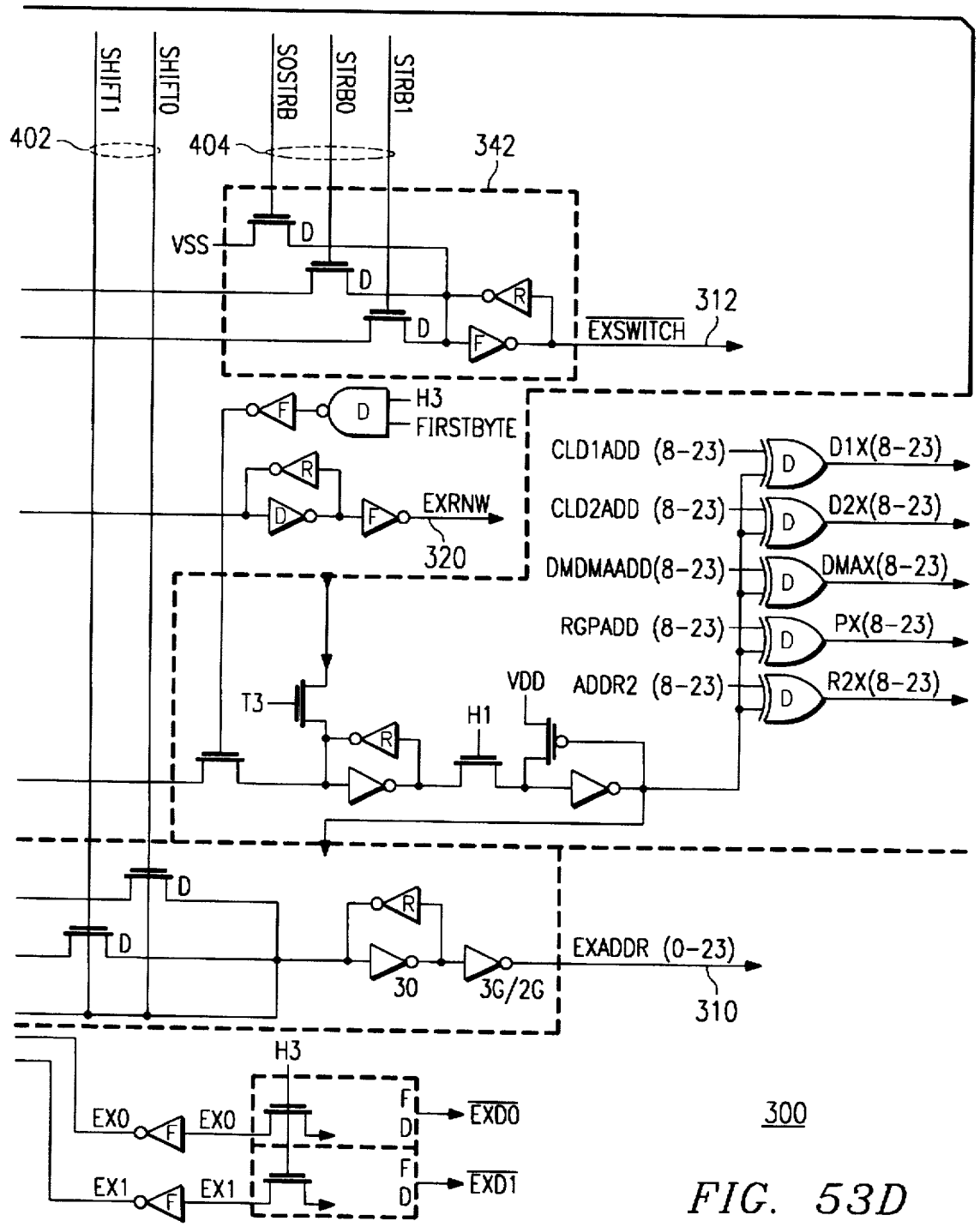
Figure 54A:
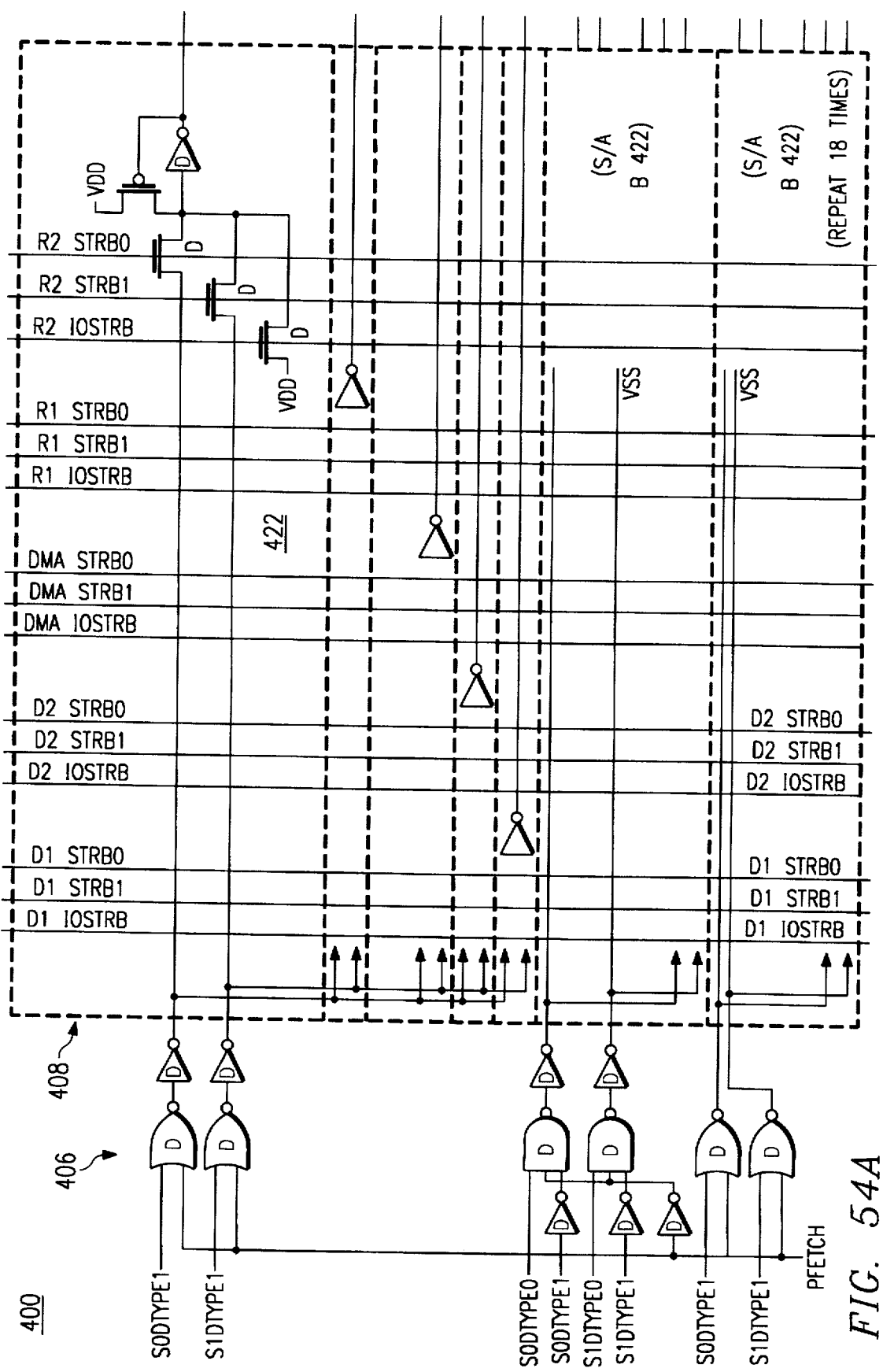
FIG. 54 is a detailed circuit diagram of the circuit shown in FIG. 50.
Figure 54B:
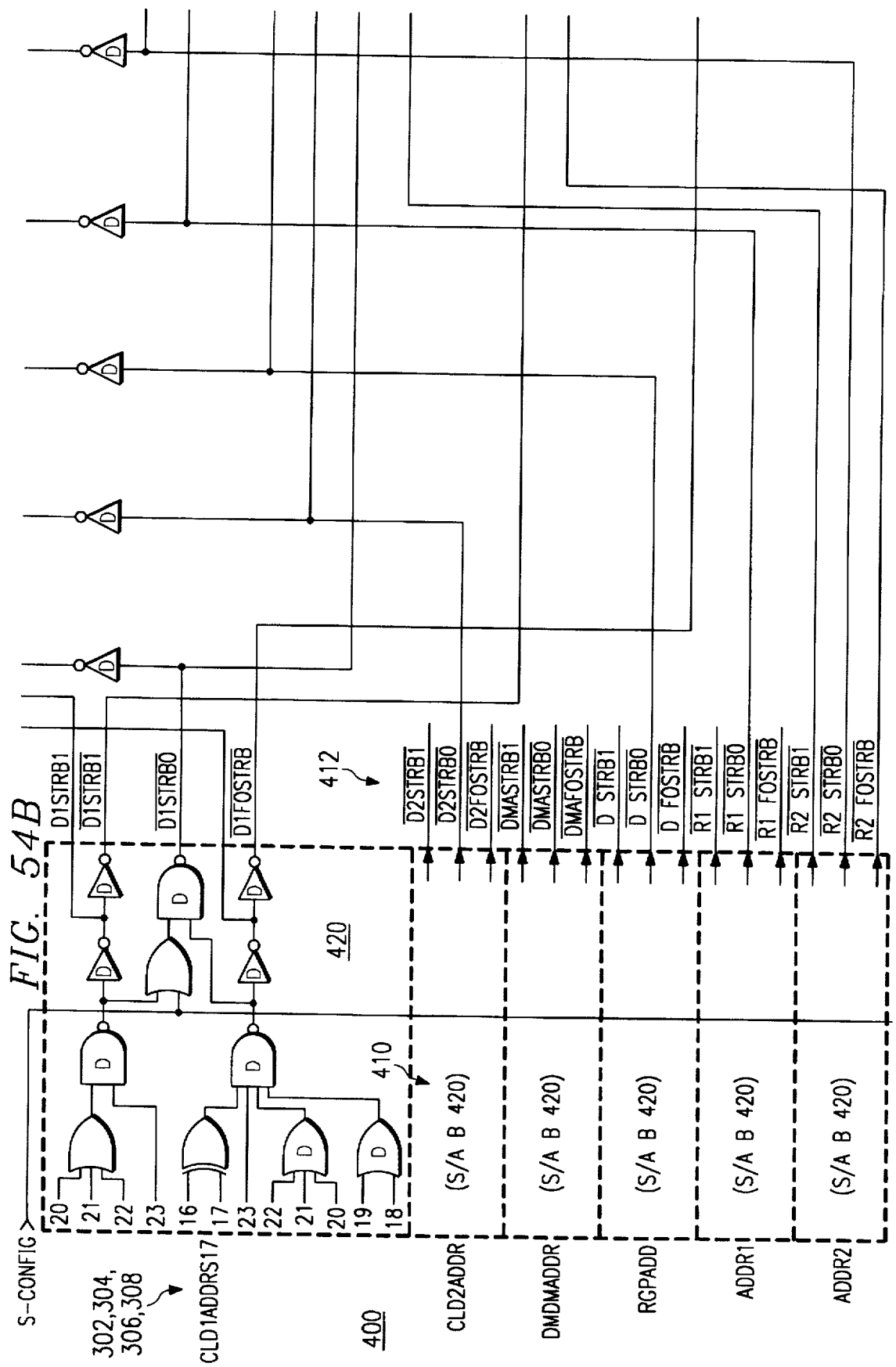
Figure 54D:
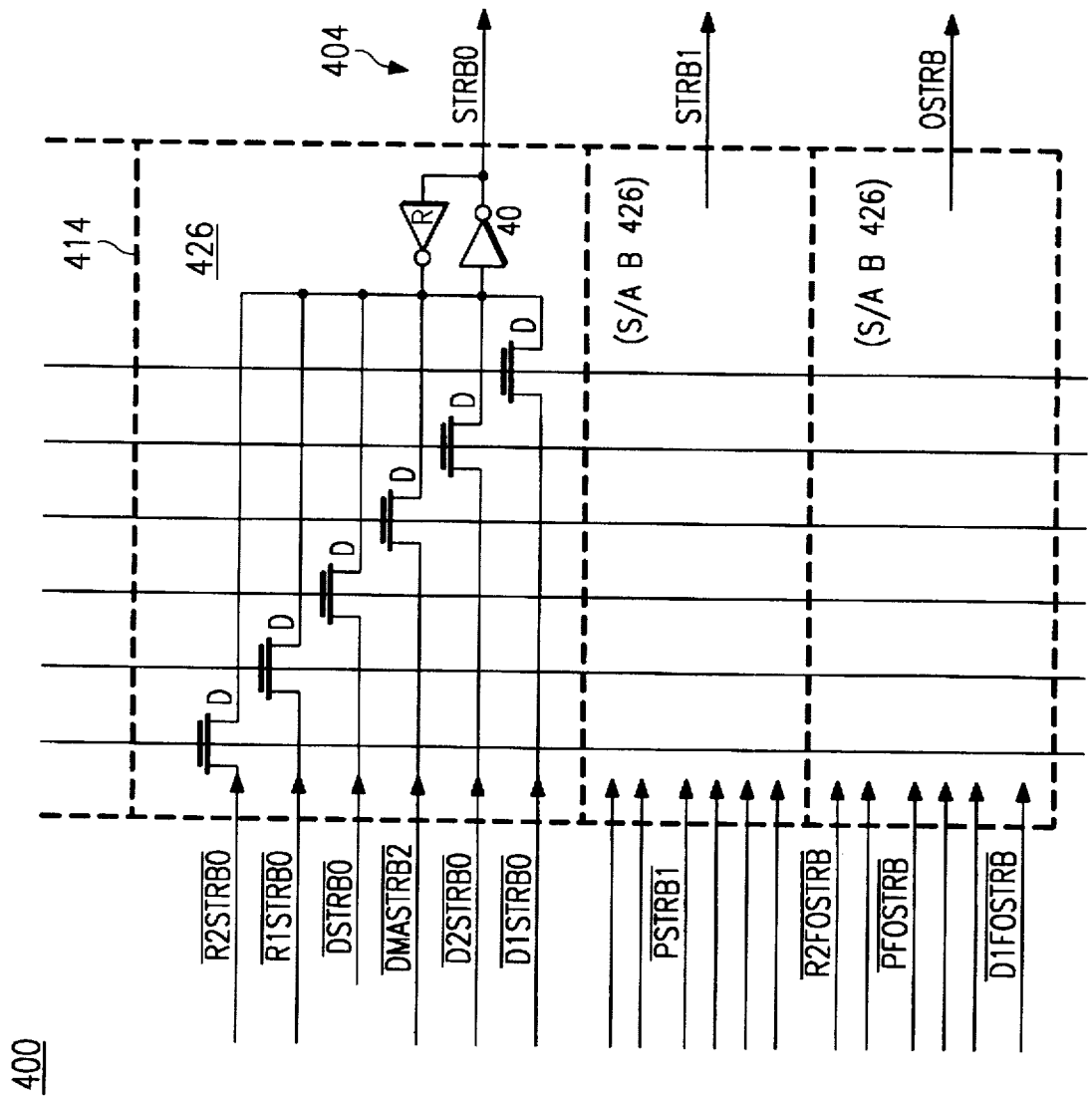
Figure 55A:
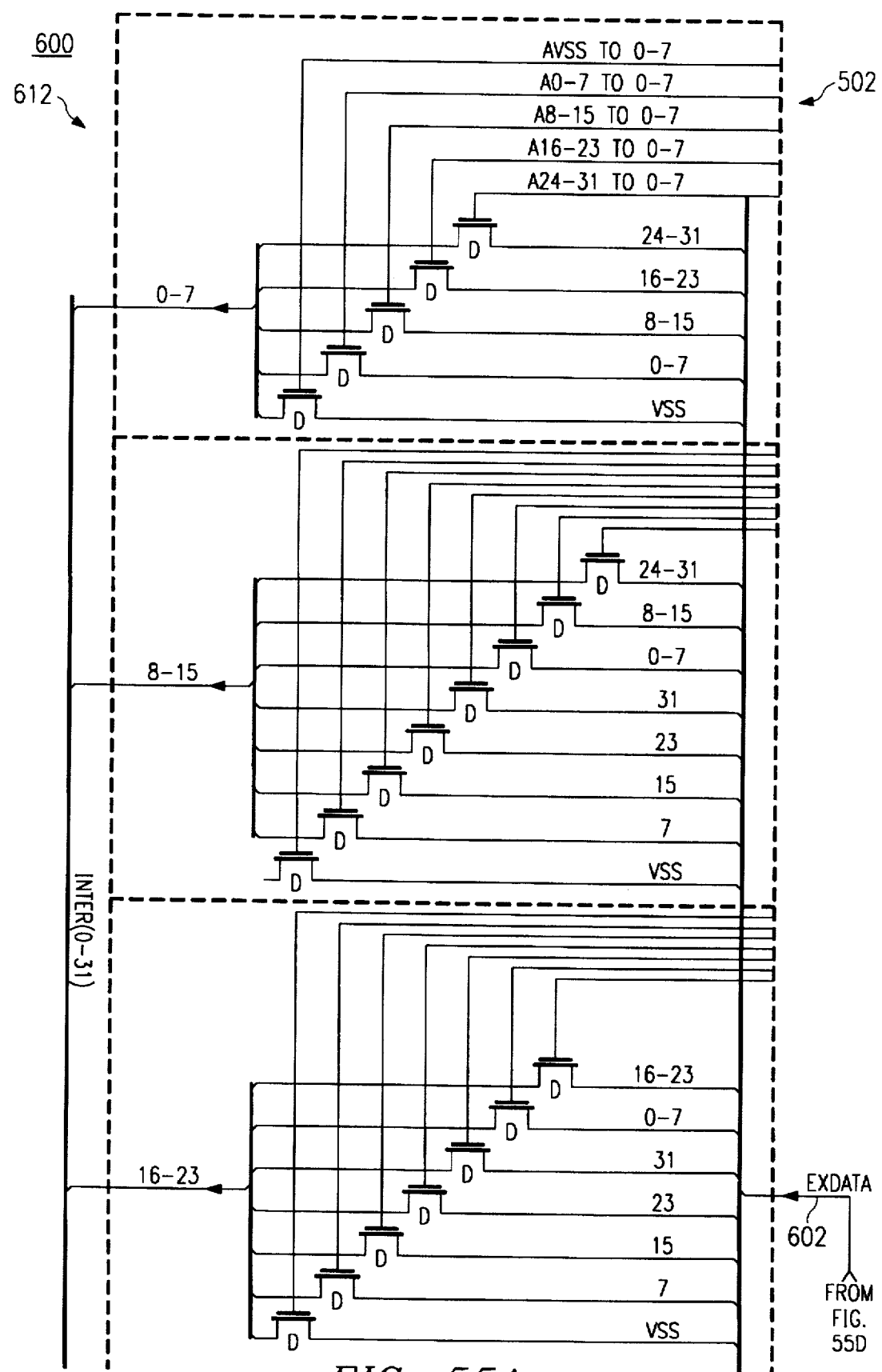
FIG. 55 is a detailed circuit diagram of the circuit shown in FIG. 51.
Figure 55B:
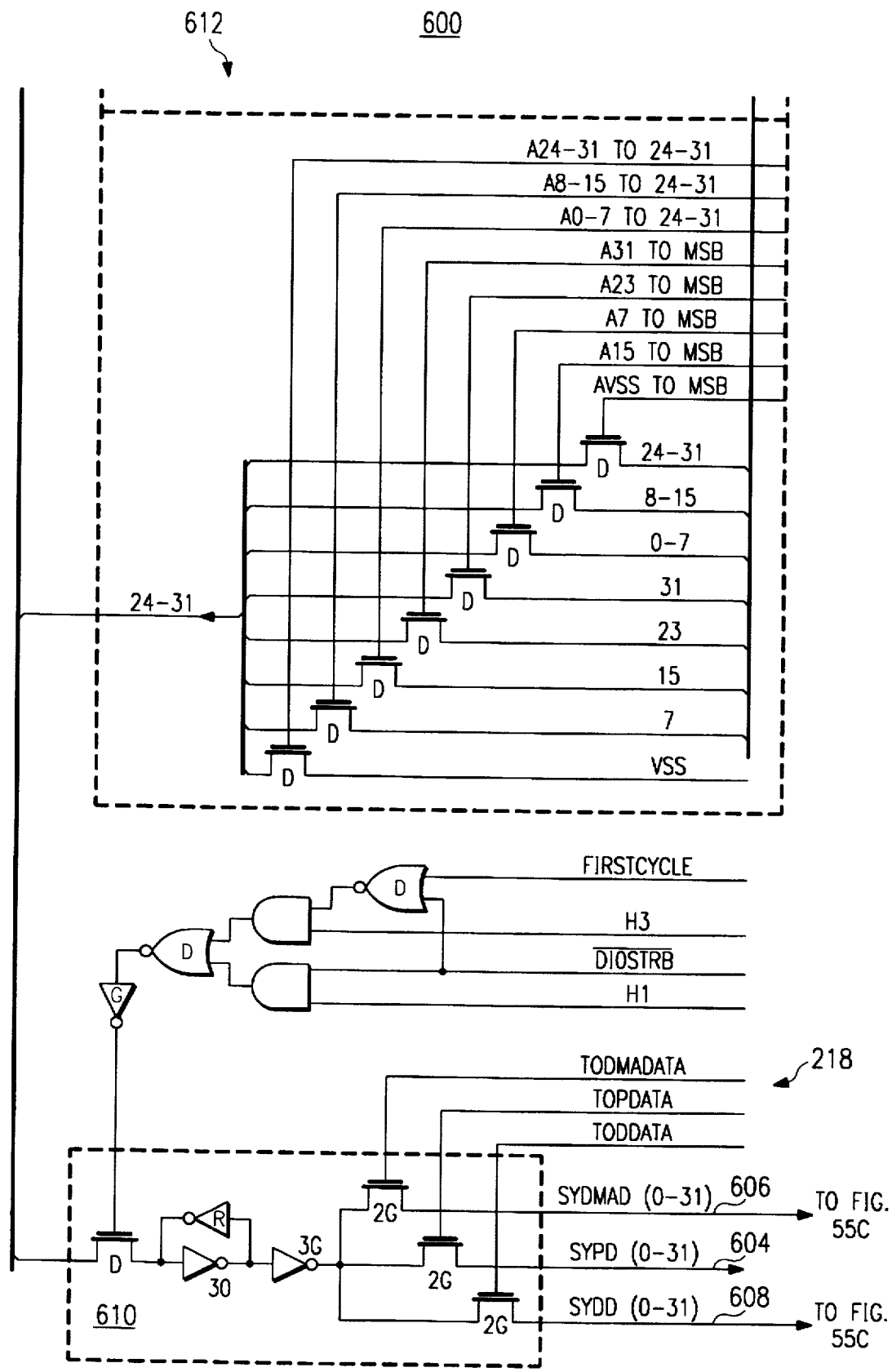
Figure 55D:
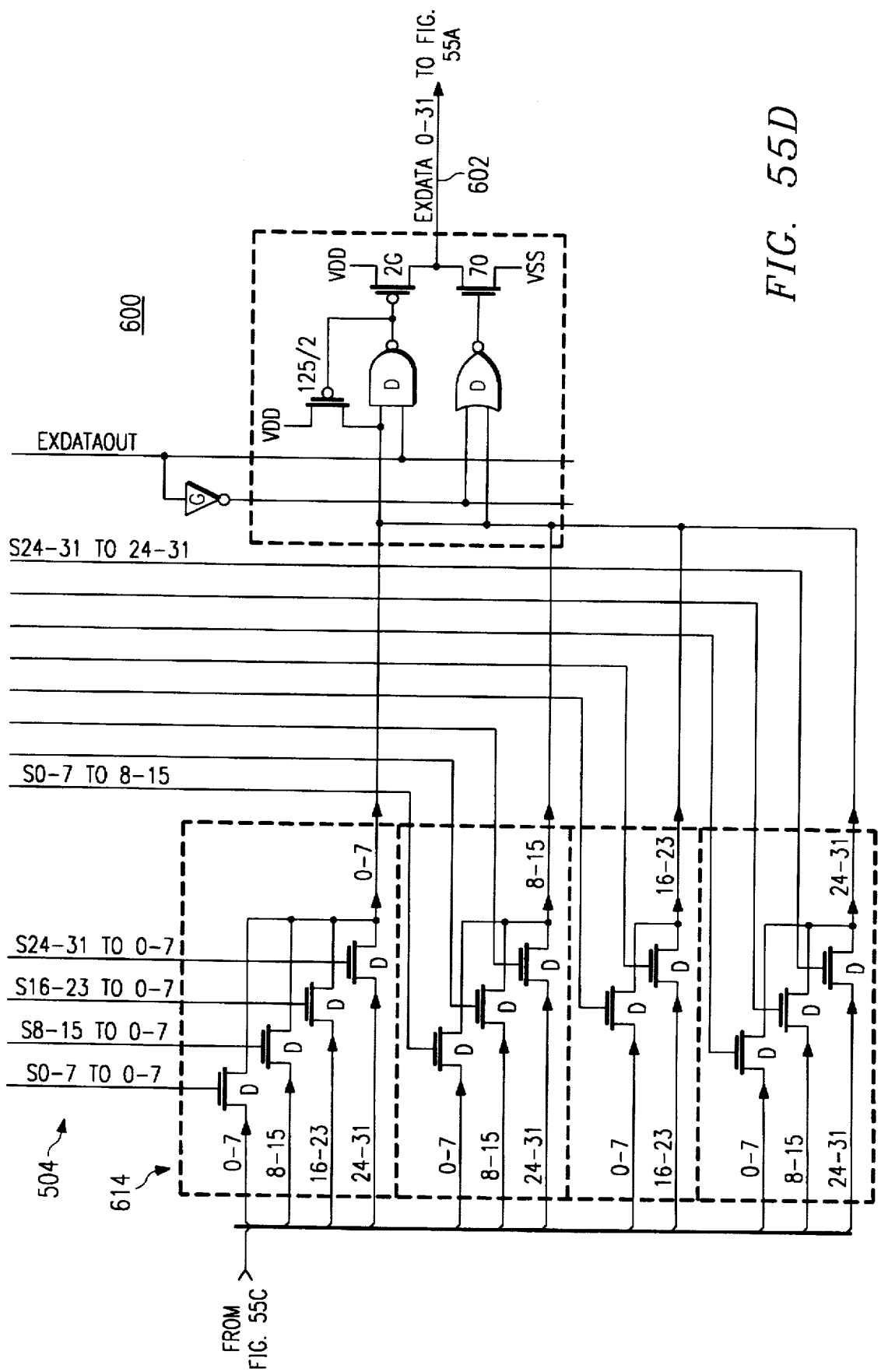
Figure 56A:
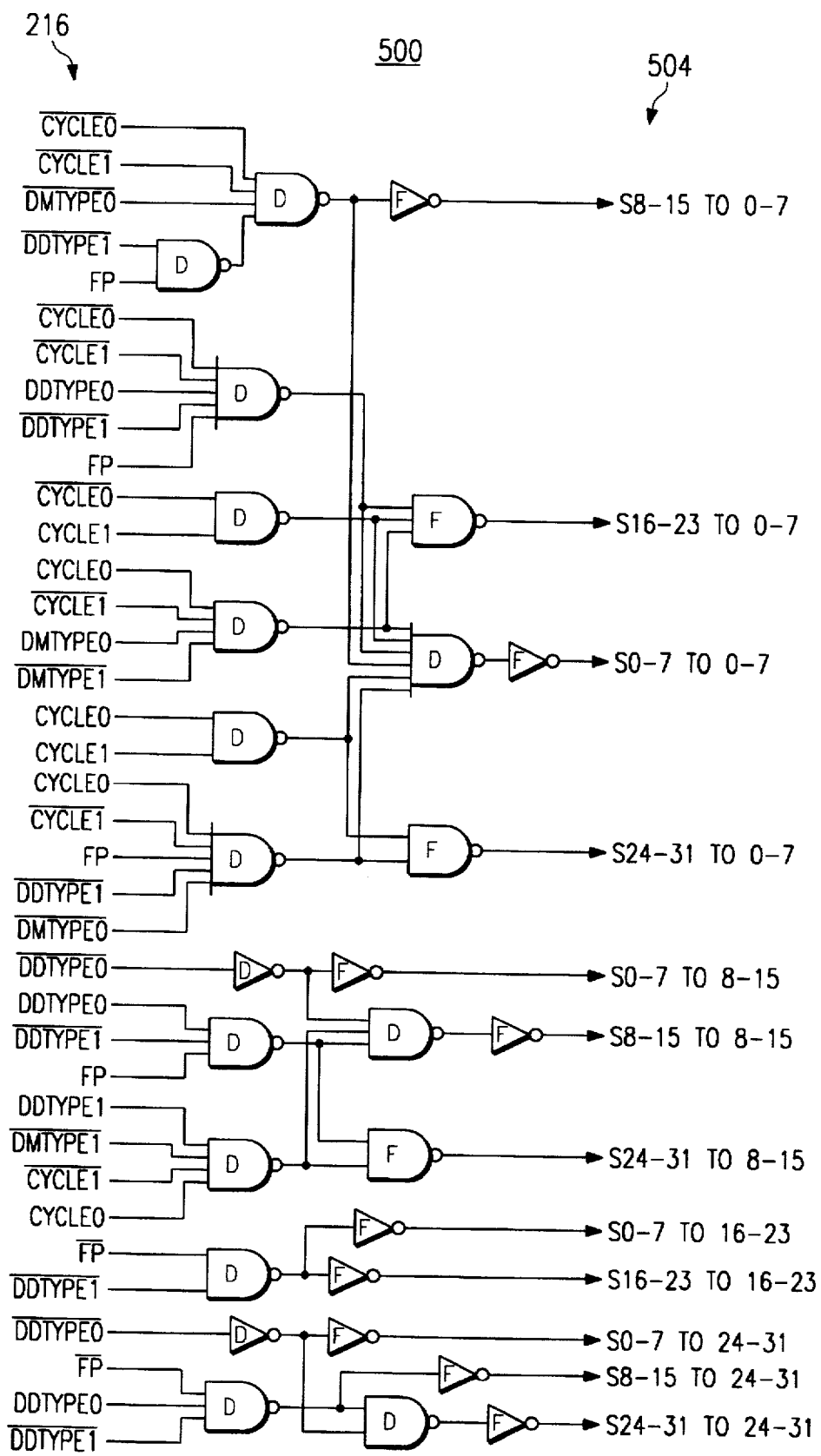
FIG. 56 is a detailed circuit diagram of the data transfer control unit 500 of FIG. 47.
Figure 56B:
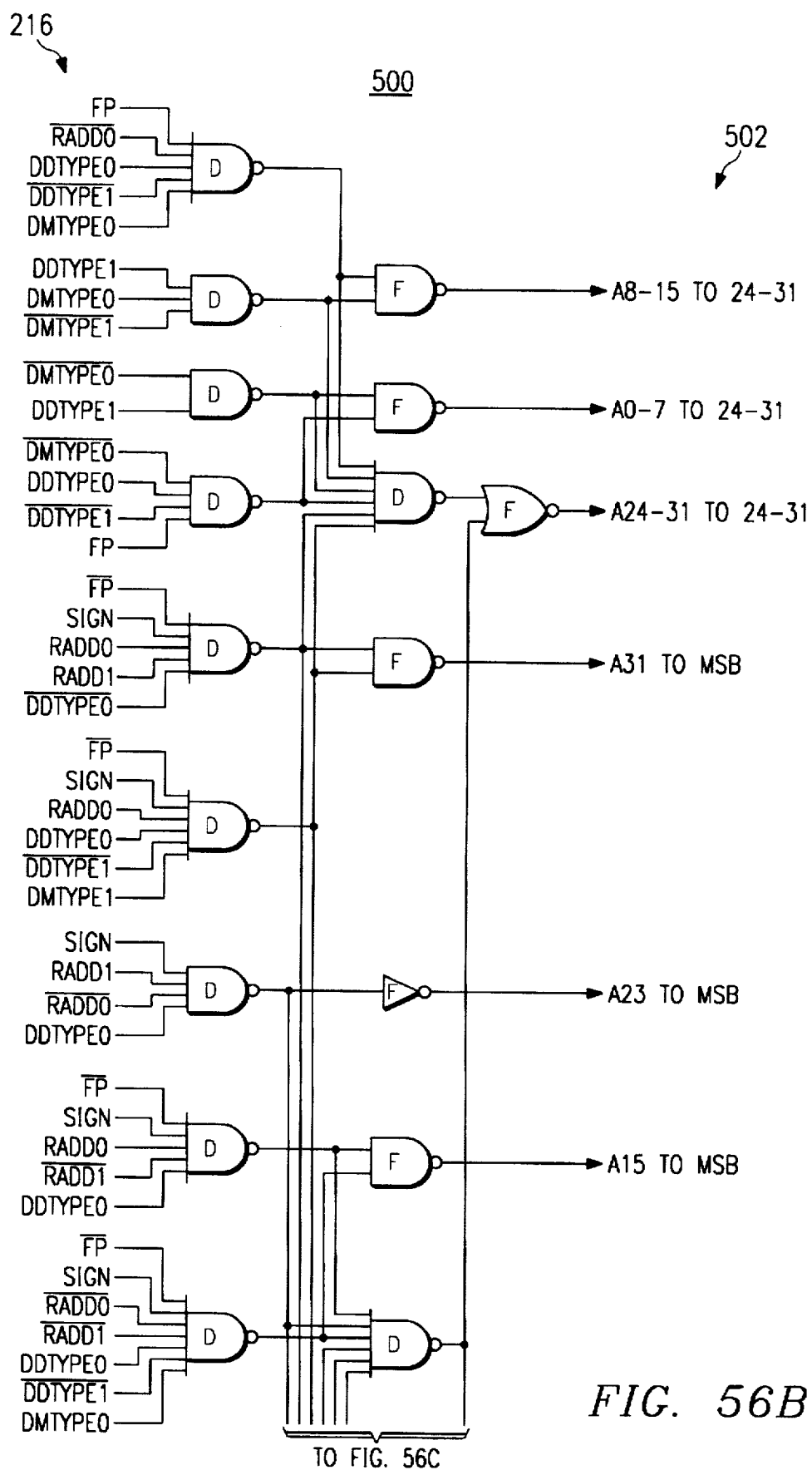
Figure 56C:
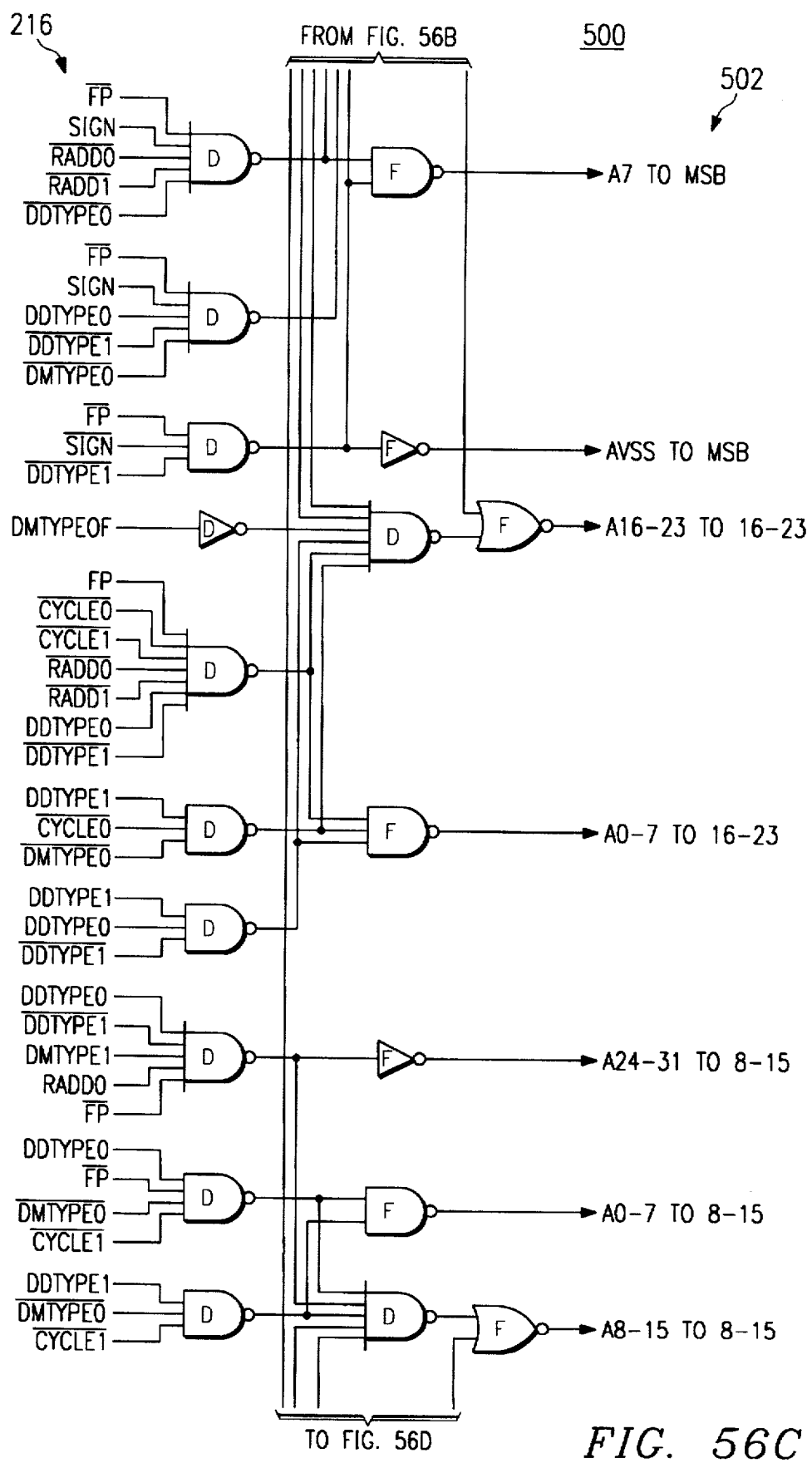
Figure 56D:
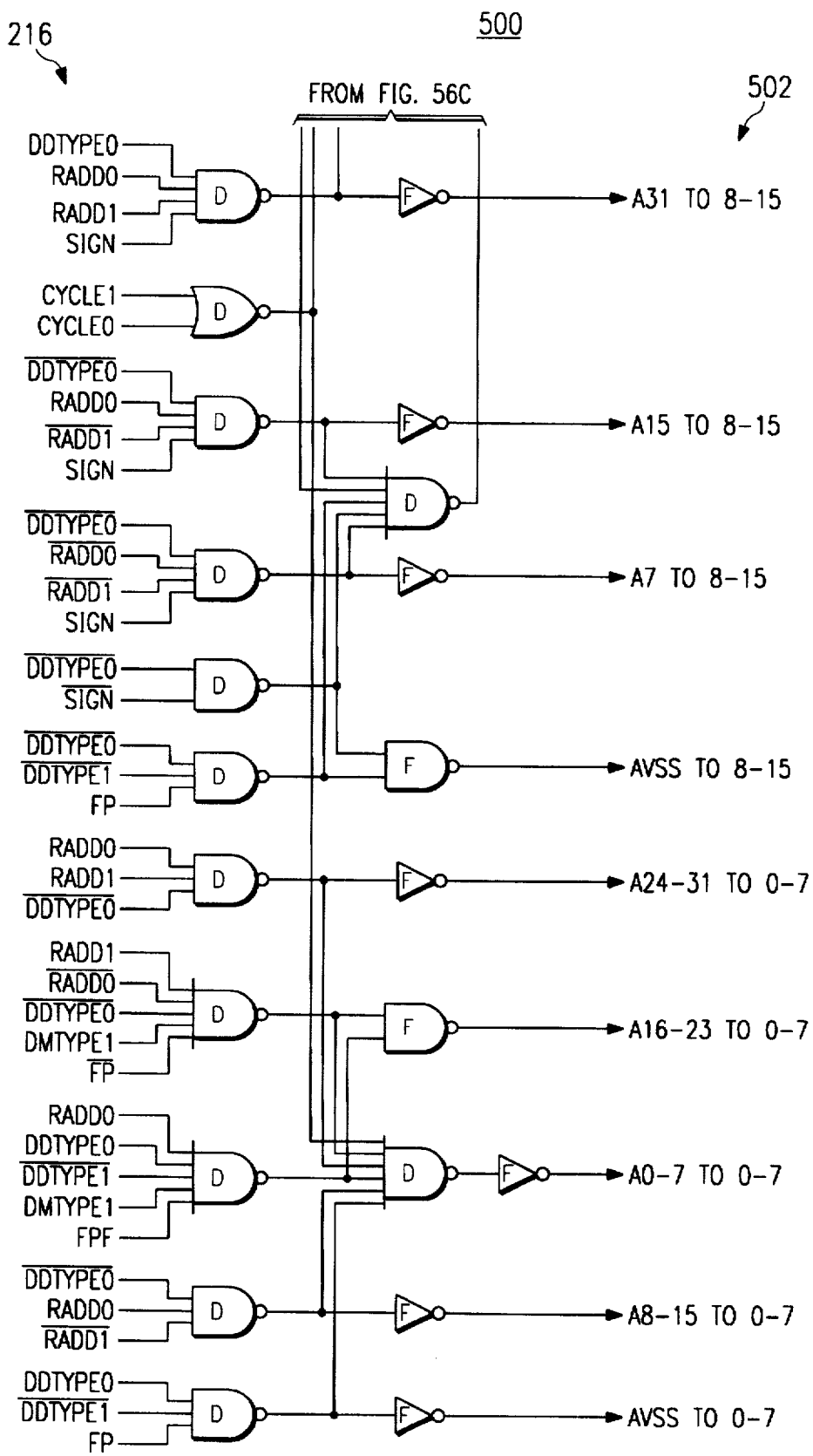
Figure 57A:
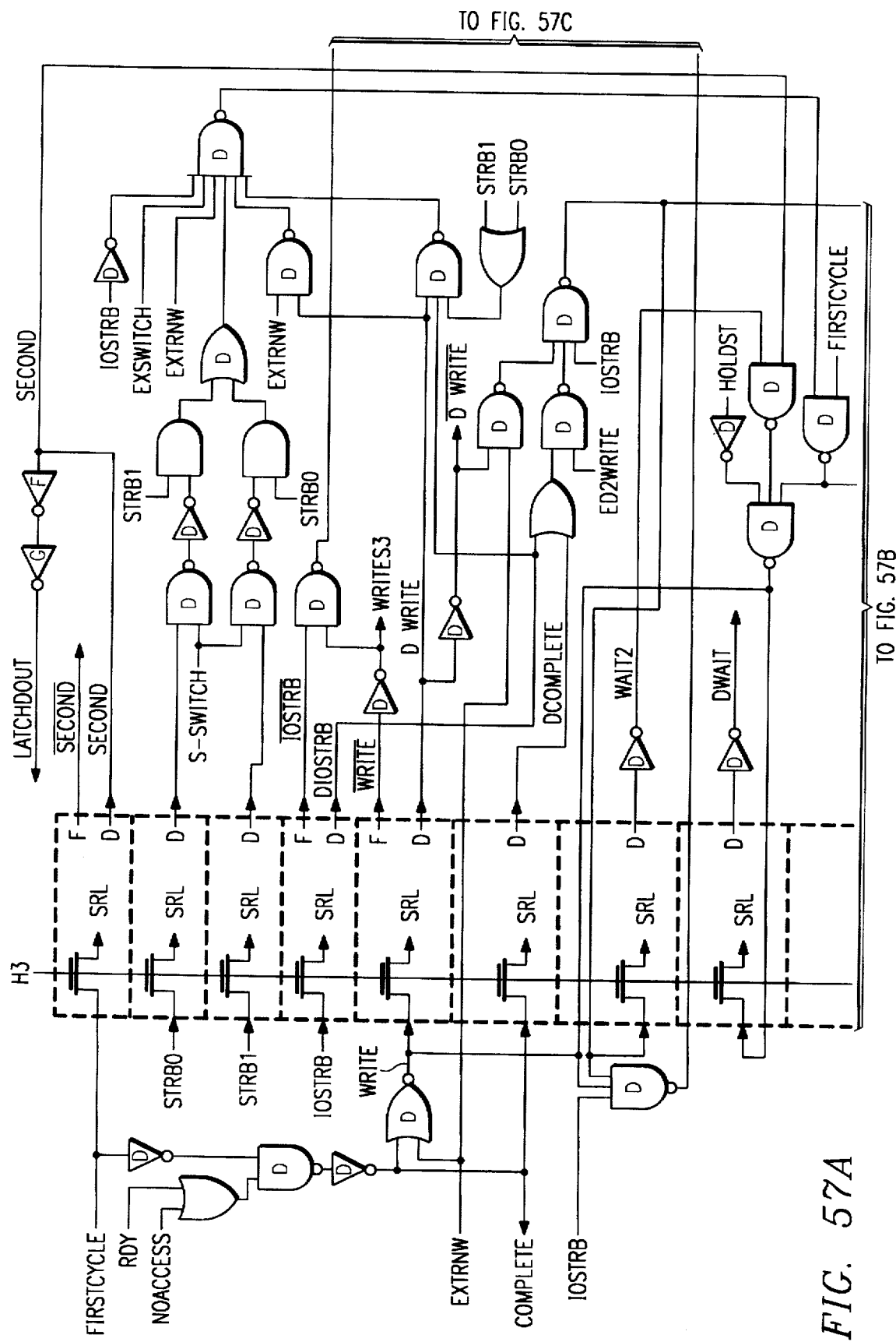
FIGS. 57 and 58 together comprise a detailed circuit diagram of the control logic unit 200 of FIG. 47.
Figure 57B:
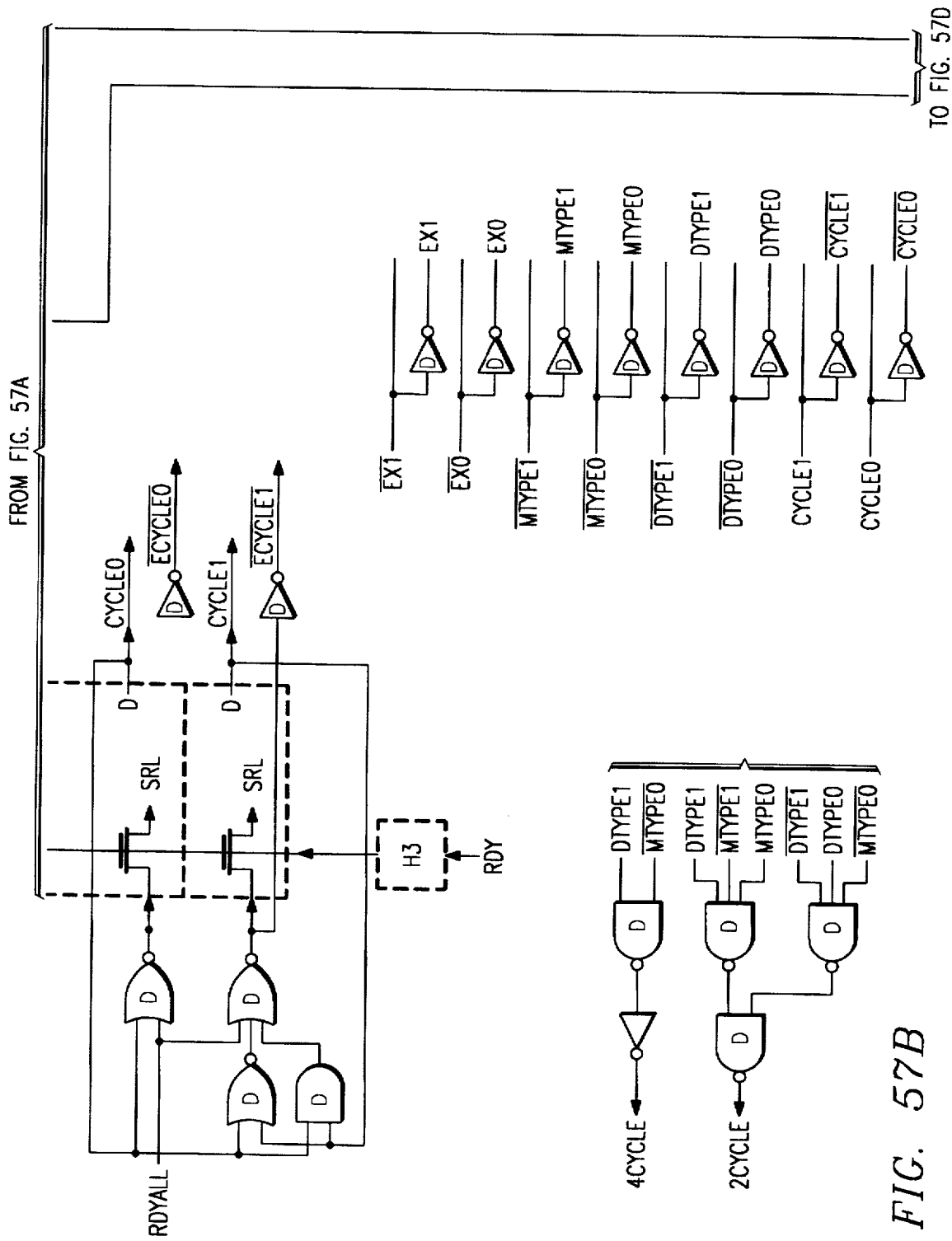
Figure 57C:
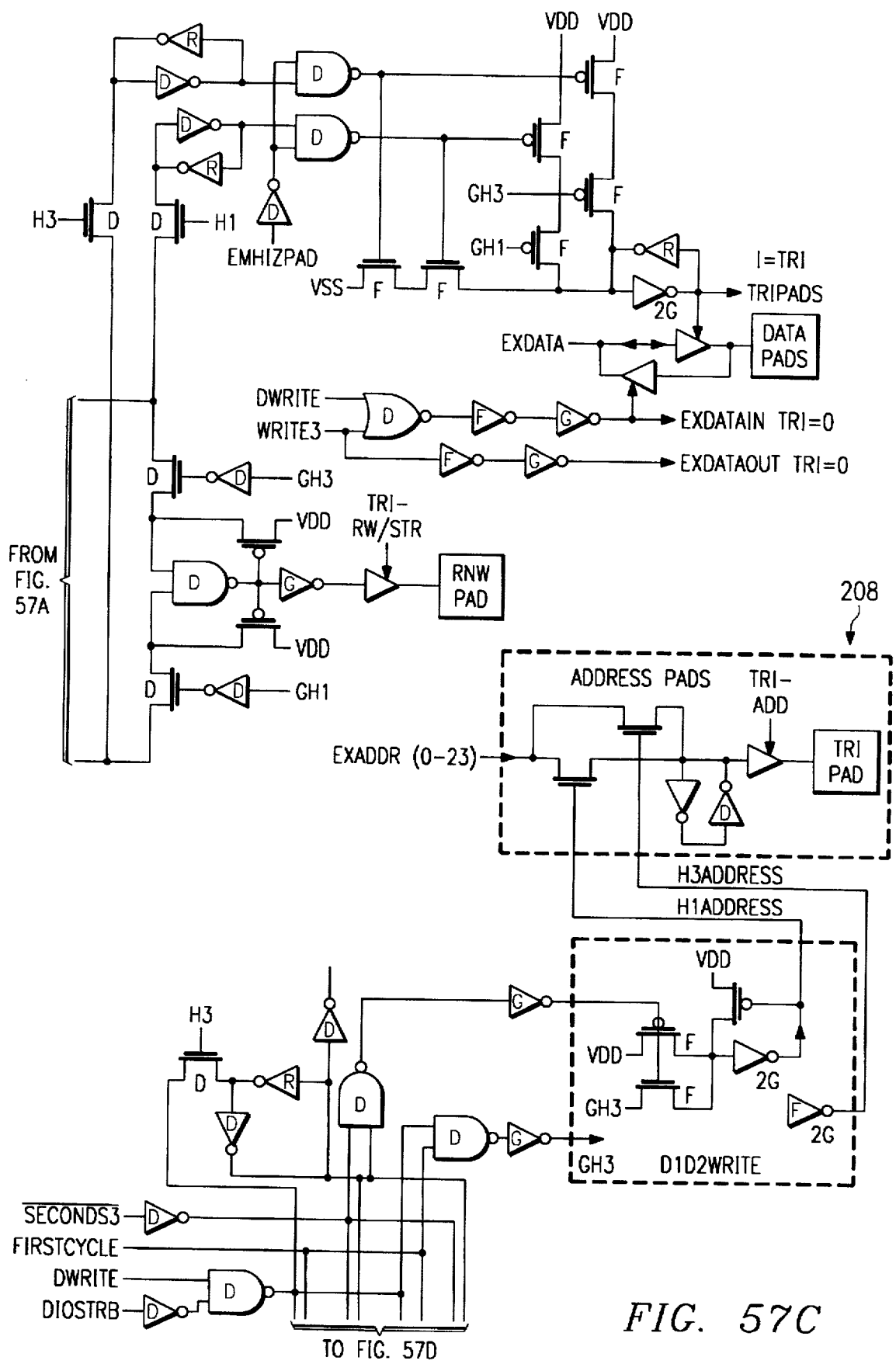
Figure 57D:
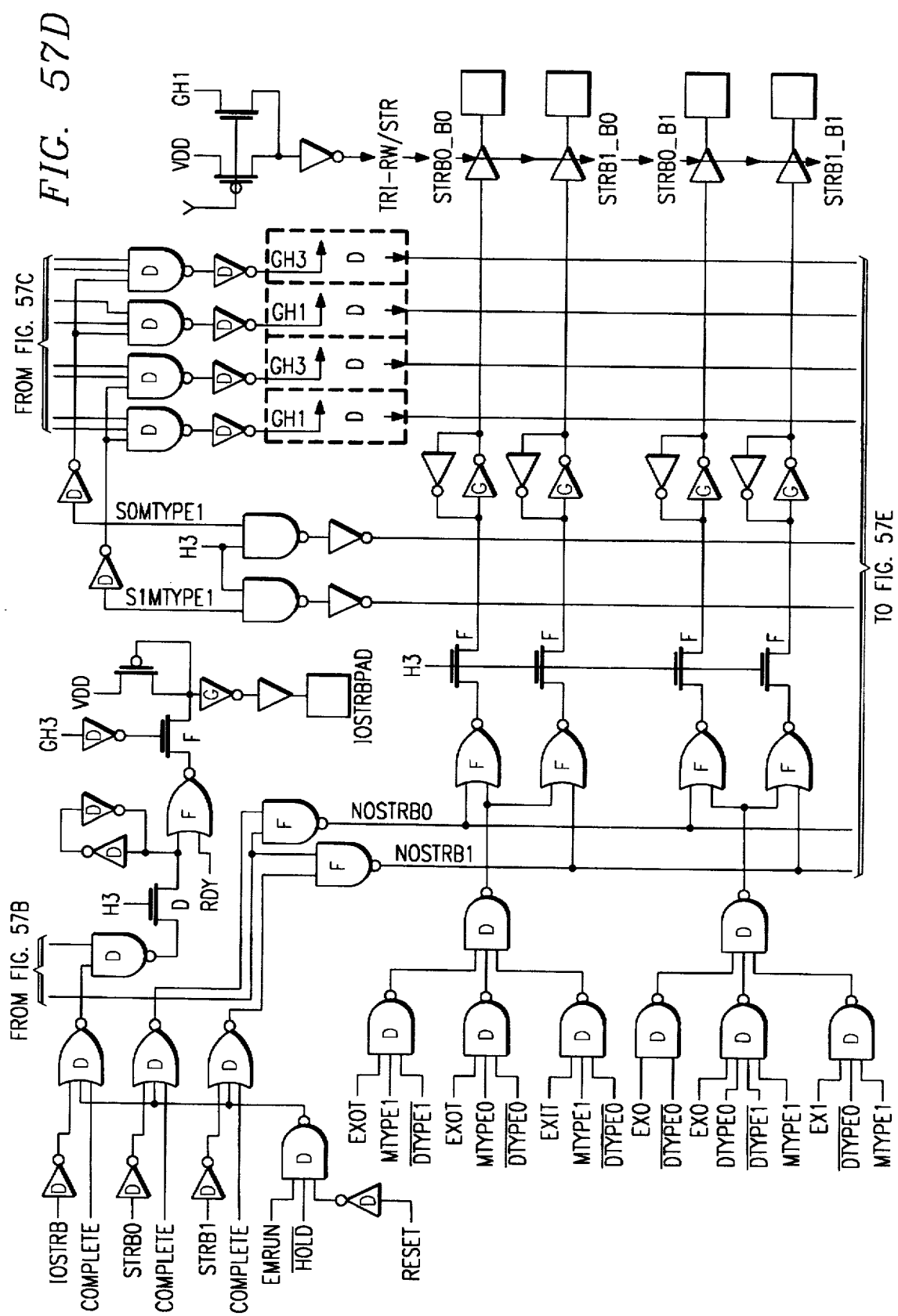
Figure 57E:
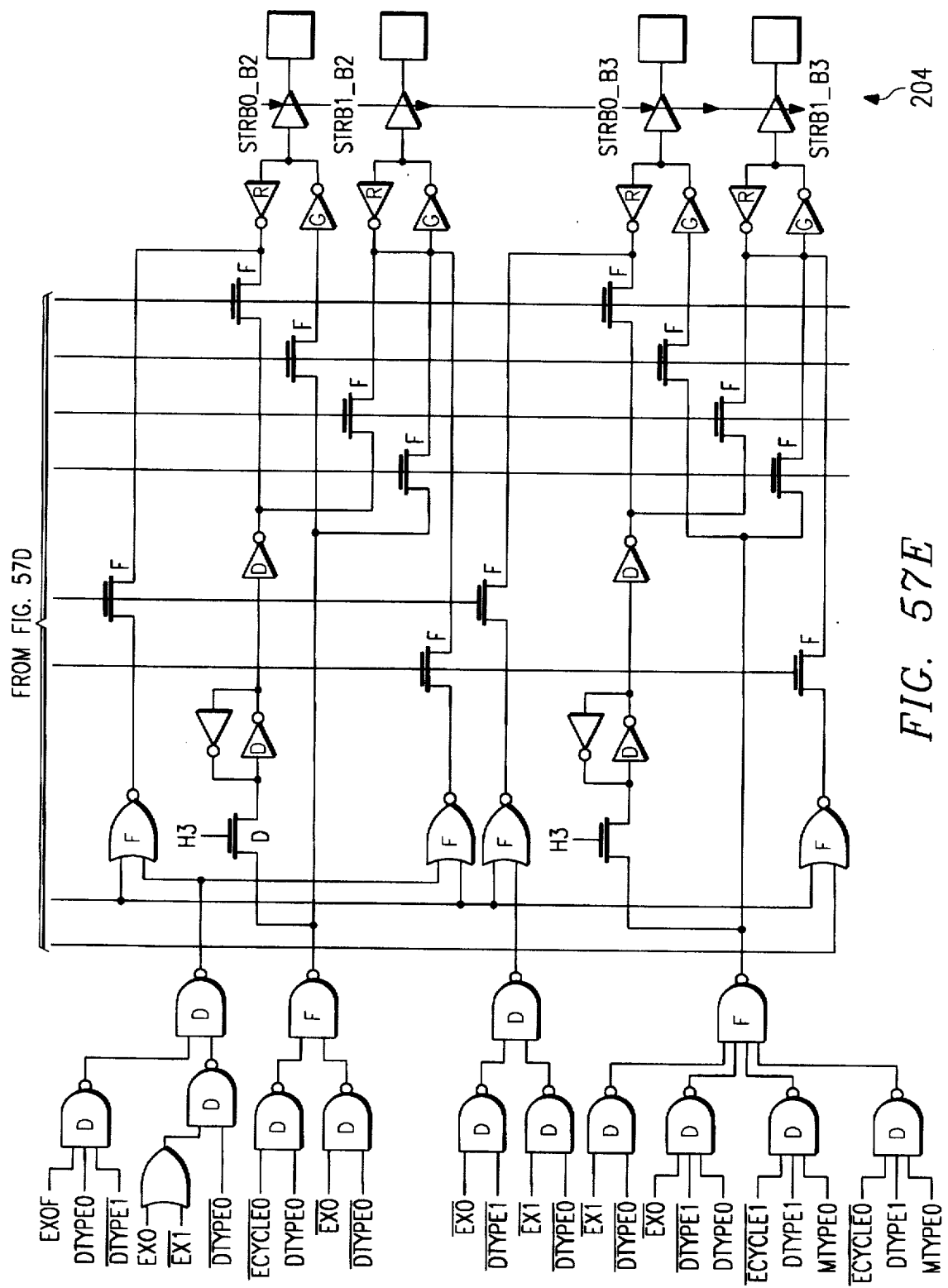
Figure 58A:
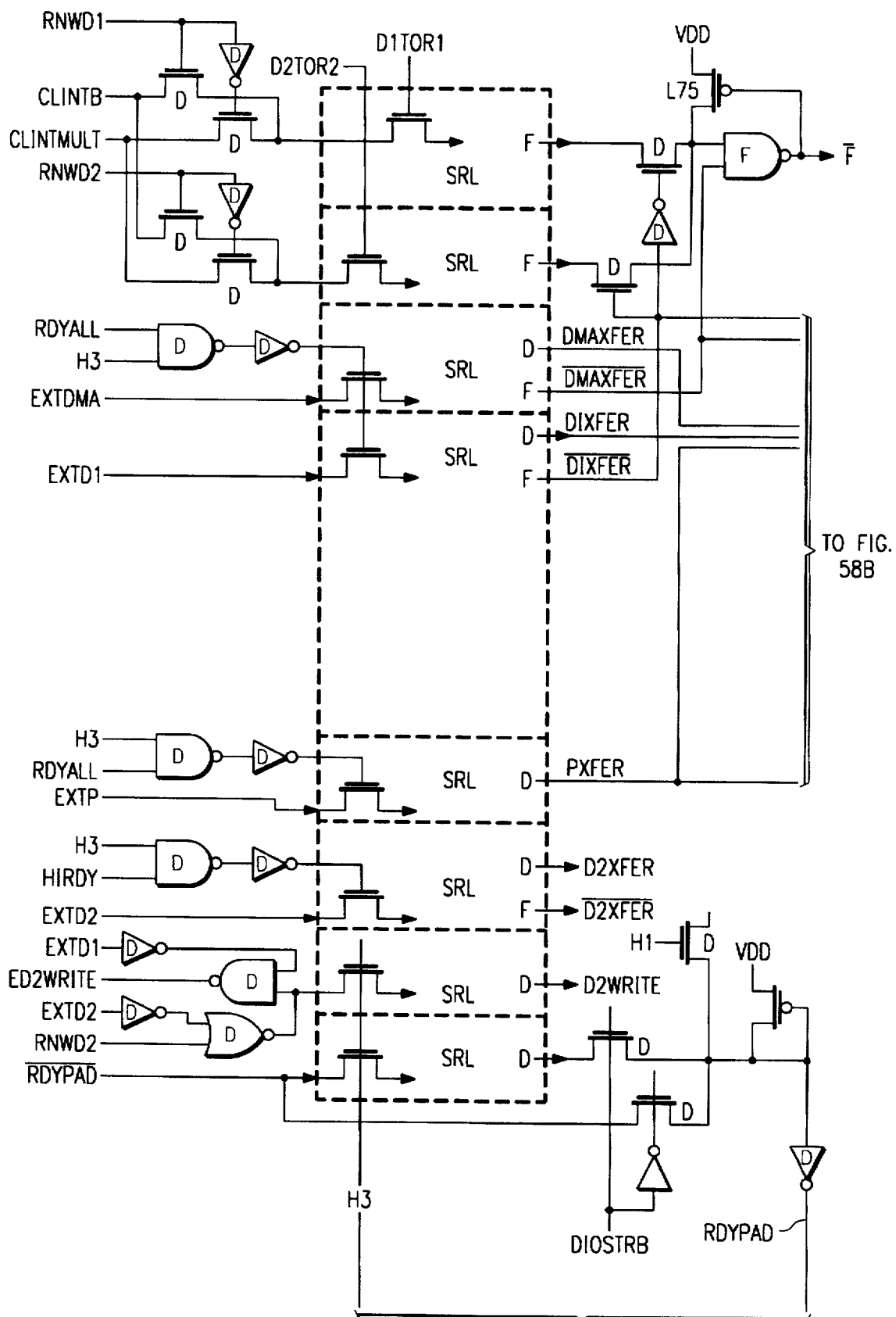
Figure 58B:
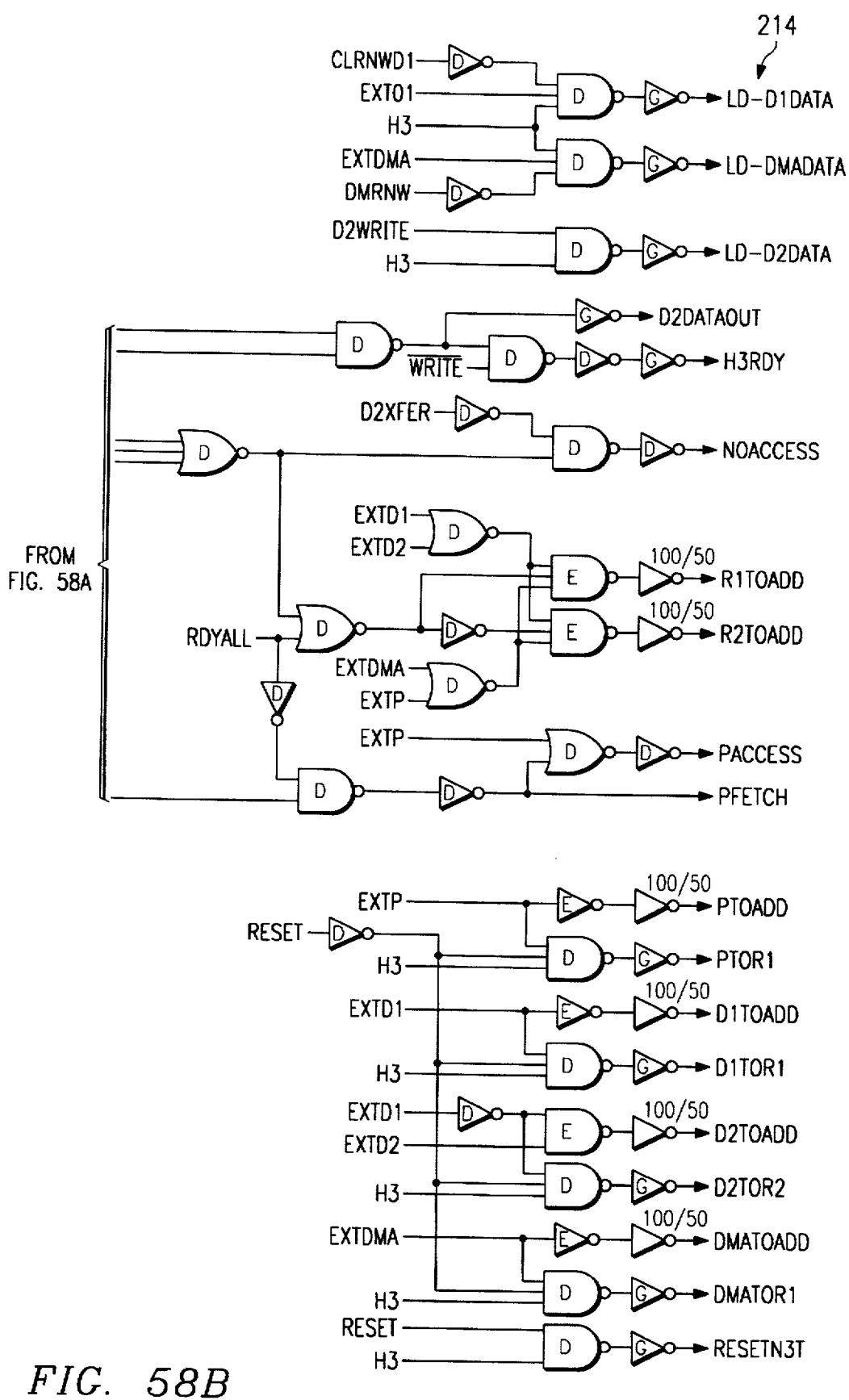
Figure 58C:
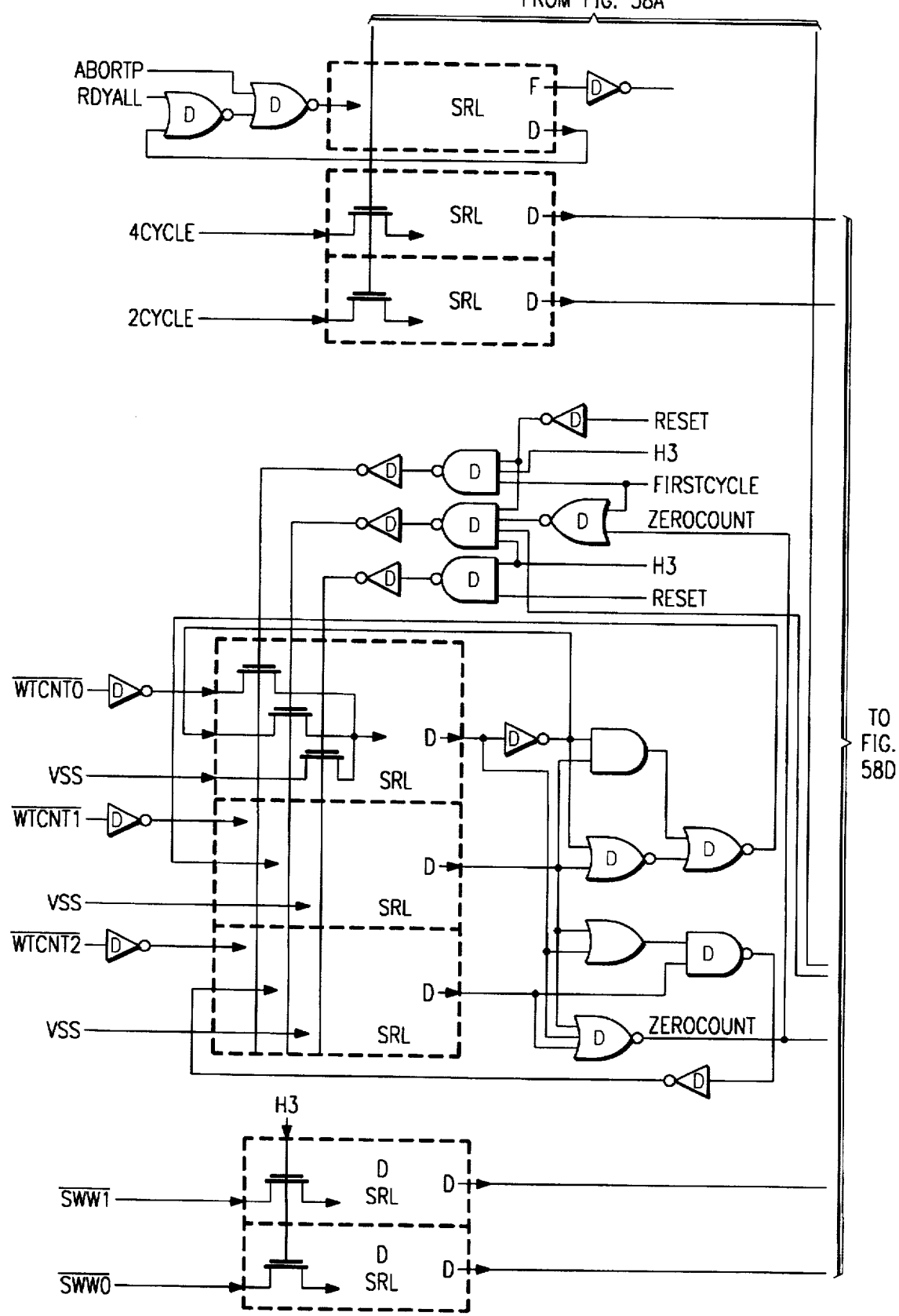
Figure 58D:
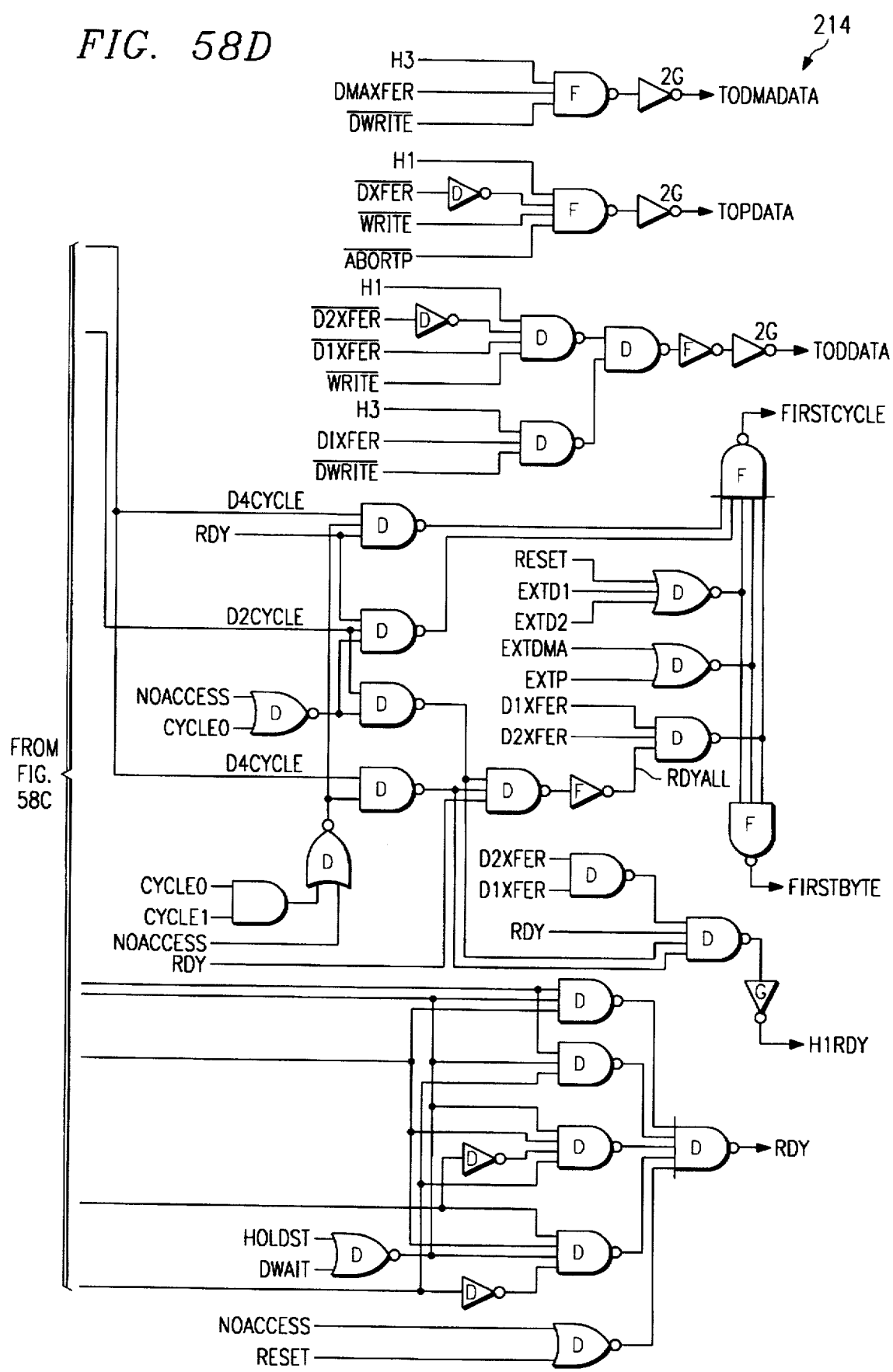

Correspondence of figures is as follows. FIG. 52 shows the details of FIG. 48. FIG. 53 shows the details of FIG. 49. FIG. 54 shows the details of FIG. 50. FIG. 55 shows the details of FIG. 51. FIG. 56 shows the details of the Data Transfer Control Unit 500 of FIG. 47, which was not amenable to block diagramming. FIGS. 57, 58 and 59 show the details of Control Logic Unit 200 of FIG. 47, which also was not amenable to block diagramming.

Note that, in order to avoid confusing clutter in the drawings, where circuitry is duplicated in the same figure sometimes a block will contain only a statement such as "(S/A B n)", meaning "Same as Block n", where the contents of the block containing such statement are identical to the contents of Block n, where n is a reference numeral. For example, referring to FIG. 53, note that Block 334 contains the statement "(S/A B 336)" , which Block 336 appears immediately below Block 334. Block 334 is, therefore, identical to Block 336. Within Block 336 itself, note that the logic structure in Blocks 352, 354, 356 and 358 is the same as that in Block 350.

Also note that in FIG. 52 registers 112 and 110 are interleaved. Also note that in FIG. 52 the simple shift register latch ("SRL") is duplicated so many times in the register that, for this figure only, the designation "SRL" is used, rather than "S/A B n". The configuration of the SRL is shown in detail in Block 122. Spaces identified by the designation "SPACE" are simply blank.

Having thus described one particular embodiment of the invention, various alterations, modifications and improvements will readily occur to those skilled in the art. Such alterations, modifications and improvements as are made obvious by this disclosure are intended to be part of this description though not expressly stated herein, and are intended to be within the spirit and scope of the invention. Accordingly, the foregoing description is by way of example only, and not limiting. The invention is limited only as defined in the following claims and equivalents thereto.

What is claimed is:

1. A memory interface unit for coupling a microprocessor to a memory external to said microprocessor, said memory being utilized for the storage of data therein and the retrieval of data therefrom, and said memory being provided in one or more memory banks, each of said banks being provided with a set of address lines and a byte enable line, data being transferring to and from each of said memory banks on a group of data lines, and said memory banks being provided in one or more banks whereby the group or groups of data lines, as the case may be, provide a memory data path having a physical transfer width for transfer of data to and from said memory, and said data being stored and retrieved over said memory data path in two or more data types, each type having a different size, said memory interface unit being provided with a set of address pins and a set of strobe pins, comprising:

first means for providing an indication of a physical transfer width of a memory coupled to said memory interface unit;

second means for providing an indication of a data type to be transferred to or from said memory;

third means, responsive to said first means and said second means, for, depending on the data type indication, providing to said address pins an address, shifted in position, with at least some of said address lines being for coupling to the address lines of said one or more banks of memory, as the case may be, and with one or more of said address pins being for activation of the byte enable line or lines, as the case may be, for data to be transferred, or, alternatively, providing to said address pins an address, unshifted in position, for coupling to the address lines of said one or more banks of memory, as the case may be, for addressing data to be transferred, and for, depending on the physical transfer width indication, causing one or more of said strobe pins to be used as additional address pins.

* * * * *